United States Patent
Alboszta et al.

(10) Patent No.: US 11,205,132 B2
(45) Date of Patent: Dec. 21, 2021

(54) PERTURBING THE CONTEXTUALIZATION OF A PROPOSITION BY A GROUP OF SUBJECTS CONSIDERED IN A QUANTUM REPRESENTATION BY INJECTING A SUBJECT EXHIBITING AN ANTI-CONSENSUS STATISTIC MODULO THE PROPOSITION

(71) Applicant: Invent.ly LLC, Malibu, CA (US)

(72) Inventors: Marek Alboszta, Montara, CA (US); Stephen J. Brown, Woodside, CA (US)

(73) Assignee: Invent.ly, LLC, Malibu, CA (US)

( * ) Notice: Subject to any disclaimer, the term of this patent is extended or adjusted under 35 U.S.C. 154(b) by 362 days.

(21) Appl. No.: 14/601,227

(22) Filed: Jan. 20, 2015

(65) Prior Publication Data

US 2016/0210560 A1  Jul. 21, 2016
US 2019/0228341 A9  Jul. 25, 2019

Related U.S. Application Data

(63) Continuation-in-part of application No. 14/588,296, filed on Dec. 31, 2014, now abandoned, and a
(Continued)

(51) Int. Cl.
*G06N 10/00* (2019.01)
*G06Q 50/00* (2012.01)
(Continued)

(52) U.S. Cl.
CPC ............. *G06N 10/00* (2019.01); *G06N 3/006* (2013.01); *G06N 5/02* (2013.01); *G06Q 50/01* (2013.01); *H04L 43/062* (2013.01); *H04L 67/22* (2013.01)

(58) Field of Classification Search
None
See application file for complete search history.

(56) References Cited

U.S. PATENT DOCUMENTS 7,653,646 B2  1/2010  Horn et al.
7,664,627 B2  2/2010  Mitsuyoshi
(Continued)

OTHER PUBLICATIONS

Srednicki, Mark. "Chaos and quantum thermalization." Physical Review E50.2 (1994): 888.*
(Continued)

*Primary Examiner* — Daniel T Pellett
(74) *Attorney, Agent, or Firm* — Christopher P. Maiorana, PC

(57) ABSTRACT

The present invention concerns methods and apparatus for perturbing a known contextualization of an underlying proposition adopted by a group of subjects that are considered in a quantum representation. Initially, the subjects belonging to the group exhibit the known contextualization modulo the proposition and also have known measurable indications in the known contextualization. Perturbation is due to injection into the group of a disruptive subject that exhibits a Fermi-Dirac (F-D) anti-consensus statistic modulo the underlying proposition. A monitoring unit and a statistics module are deployed to collect and study subsequent measurable indications from subjects in the group after injection of the disruptive subject and upon re-confronting of the underlying proposition. The perturbation is thus detected and changes in the quantum representation due to it are estimated.

20 Claims, 15 Drawing Sheets

Related U.S. Application Data continuation-in-part of application No. 14/583,712, filed on Dec. 28, 2014, now Pat. No. 9,741,081, and a continuation-in-part of application No. 14/582,056, filed on Dec. 23, 2014, now abandoned, said application No. 14/583,712 is a continuation-in-part of application No. 14/582,056, filed on Dec. 23, 2014, now abandoned, application No. 14/601,227, which is a continuation-in-part of application No. 14/555,478, filed on Nov. 26, 2014, now abandoned, and a continuation-in-part of application No. 14/504,435, filed on Oct. 2, 2014, now abandoned, said application No. 14/555,478 is a continuation-in-part of application No. 14/324,127, filed on Jul. 4, 2014, now Pat. No. 10,007,884, application No. 14/601,227, which is a continuation-in-part of application No. 14/224,041, filed on Mar. 24, 2014, now abandoned, which is a continuation-in-part of application No. 14/182,281, filed on Feb. 17, 2014, now abandoned.

(51) Int. Cl.

| | |
|---|---|
| G06N 3/00 | (2006.01) |
| G06N 5/02 | (2006.01) |
| H04L 12/26 | (2006.01) |
| H04L 29/08 | (2006.01) |

(56) References Cited

U.S. PATENT DOCUMENTS

| | | |
|---|---|---|
| 8,226,417 B2 | 7/2012 | Mitsuyoshi |
| 8,639,702 B2 | 1/2014 | Davis, III |
| 8,744,197 B2 | 6/2014 | Fertik et al. |
| 2010/0119141 A1 | 5/2010 | Weinstein et al. |
| 2012/0071333 A1 | 3/2012 | Kauffmann et al. |

OTHER PUBLICATIONS

Sepulchre, Rodolphe. "Consensus on nonlinear spaces." Annual reviews in control 35.1 (2011): 56-64.*
Benenti, Giuliano, Giulio Casati, and Dima L. Shepelyansky. "Emergence of Fermi-Dirac thermalization in the quantum computer core." The European Physical Journal D-Atomic, Molecular, Optical and Plasma Physics 17.2 (2001): 265-272.*
Javarone, Marco Alberto. Models and frameworks for studying social behaviors. Diss. Universita'degli Studi di Cagliari, 2013.*
Alexander, Gideon. "Bose-Einstein and Fermi-Dirac interferometry in particle physics." Reports on Progress in Physics 66.4 (2003): 481.*
Abramsky, et al., "Introduction to Categories and Categorical Logic", arXiv:1102.1313v1 [math.CT], New Structures for Physics, B. Coecke (ed). Lecture Notes in Physics vol. 813, pp. 3-94, Springer-Verlag 2011.
Abramsky, et al., "Logical Bell Inequalities", arXiv: 1203.1352v6 [quant-ph], Jun. 20, 2012, Digital Object Identifier: 10.1103/PhysRevA.85.062114.
Adali, et al., Predicting Personality with Social Behavior, Aug. 2012, pp. 1-8, Department of Computer Science Rensselaer Polytechnic Institute, Troy, New York.
Aerts, et al., Do We Think and Communicate in Quantum Ways? On the Presence of Quantum Structures in Language, Faculty of Applied Physics and Mathematics, 2005, pp. 1-20, Leo Apostel Centre, Free University of Brussels.
Aerts, et al., "Concepts and Their Dynamics: A Quantum-Theoretic Modeling of Human Thought", Topics in Cognitive Sciences, 2013, pp. 1-36, Cognitive Science Society Inc., Digital Object Identifier: 10.1111/tops.12042.
Aimeur, et al., Quantum Clustering Alogrithms, Proceedings of the 24th Intl. Conference on Machine Learning, 2007, pp. 1-8, ACM, New York, NY, USA.
Alboszta, Marek, A Coherent Emergence of Consensus-Driven Reality, Physics Lectures by Marek Alboszta, 2009, pp. 1-61, Hosted by Entropy Consciousness Institute, http://entropy-consciousness.org, San Francisco, CA, USA.
Atmanspacher, et al., Weak Quantum Theory: Complementarity and Entanglement in Physics and Beyond, Foundations of Physics, 2002, 32, pp. 379-406, Institut fur Grenzgebiete der Psychologie und Psychohygiene.
Bachrach, et al., Personality and Patterns of Facebook Usage, Jun. 2012, pp. 1-9, Microsoft Research.
Blutner, et al., Two qubits for C.G. Jung's theory of personality, Cognitive Systems Research, 2010, pp. 243-259, Elsevier, ILLC, University of Amsterdam, Germany.
Blutner, et al., Two Qubits for C.G. Jung's Theory of Personality, Cognitive Systems Research, Elsevier, vol. 11, 2010, pp. 243-259, http://www.illc.uva.nl/Research/Publications/Reports/PP-2009-03.text.pdf.
Blutner, R., Concepts and Bounded Rationality: An Application of Niestegge's Approach to Conditional Quantum Probabilities, 2009, pp. 1-9, Universiteit van Amsterdam, ILLC, Nieuwe Doelenstraat 15, 1012 CP Amsterdam, The Netherlands.
Bohm, Quantum Theory, 1951, pp. 169-172, Dover Publications.
Brandenburger, et al., "An Impossibility Theorem on Belief in Games", Studia Logica, vol. 84, Issue: 2, pp. 211-240, 2006, Digital Object Identifier: 10.1007/s11225-006-9011-z.
Bruza et al., Is There Something Quantum-Like About the Human Mental Lexicon?, NIH Public Access Author Manuscript, Oct. 2009, pp. 1-40, National Institutes of Health.
Busemeyer, et al., "Quantum dynamics of human decision-making", Journal of Mathematical Psychology, 2006, 50, pp. 220-241; Indiana University, USA.
Caves, et al., Quantum Probabilities as Bayesian Probabilities, arXiv:quant-ph/0106133, Nov. 2001, pp. 1-6, Phys. Rev. A 65, 022305 , Cornell University Libarary, USA.
Celli, Mining User Personality in Twitter, Sep. 2011, pp. 1-5, CLIC-CIMeC, University of Trento Italy.
Celli, Unsupervised Personality Recognition for Social Network Sites, The Sixth International Conference on Digital Society, 2012, pp. 1-4, University of Trento, Italy.
Chittaranjan, et al., Who's Who with Big-Five: Analyzing and Classifying Personality Traits with Smartphones, Jun. 2012, pp. 1-8, Idiap Research Institute, Switzerland.
Cohen-Tannoudji, et al., Quantum Mechanics, John Wiley & Sons, 1977.
Dirac, The Principles of Quantum Mechanics, Oxford University Press, 4th Edition, 1958.
Franco, R., Quantum mechanics and rational ignorance, Arxiv preprint physics/0702163, 2007, Dipartimento di Fisica and U.d.R. I.N.F.M., Politecnico di Torino C.so Duca degli Abruzzi 24, I-10129 Torino, Italia.
Gabora,et al., Toward an ecological theory of concepts, Ecological Psychology, 2008, pp. 84-116, Department of Psychology, University of British Columbia.
Garman, "A Heuristic Review of Quantum Neural Networks", Dissertation, Imperial College London, Dept. of Physics, Oct. 6, 2011.
Glanville, "A (Cybernetic) Musing: Design and Cybernetics", Virus, N. 3, São Carlos: Nomads.usp, 2010.
Globus, "Quantum Consciousness is Cybernetic", Psyche, 2(12), Aug. 1995.
Hu, et al., A Generalized Quantum-Inspired Decision Making Model for Intelligent Agent, The Scientific World Journal, Mar. 2014, pp. 1-9, vol. 2014, Article ID 240983, http://dx.doi.org/10.1155/2014/240983.
Khrennikov, Quantum-like formalism for cognitive measurements, BioSystems, 2003, vol. 70, pp. 211-233 International Center for Mathematical Modeling in Physics and Cognitive Sciences, MSI, University of Vaxjo, S-35195, Sweden.
Klusch, M., Toward quantum computational agents, In: Nickles, M., Rovatsos, M. and Weiss, G., eds. Agents and Computational Autonomy:

(56) References Cited

OTHER PUBLICATIONS

Potential, Risks, and Solutions. 2004, vol. 2969. , pp. 170-186. (Lecture Notes in Computer Science).
Komisin, et al., Identifying Pesonality Types Using Document Classification Methods, Proceedings of the 25th International Florida Artificial Intelligene Research Society Conference, pp. 1-6, University of North Carolina, 2012, USA.
Lefebvre, "An Algebraic Model of Ethical Cognition", Journal of Mathematical Psychology, vol. 22, No. 2, Oct. 1980, Academic Press, New York.
Lefebvre, "Modelling of Quantum-Mechanical Phenomena With the Help of the Algebraic Model of Ethical Cognition", Mathematical Modelling, vol. 4, pp. 361-366, 1983, Pergamon Press, USA.
Markovikj, et al., Mining Facebook Data for Predictive Personality Modeling, 2013, pp. 1-4, Faculty of Computer Science and Engineering, Ss Cyril and Methodius University.
Mielnik, Geometry of Quantum States, Institue of Theoretical Physics, Warsaw University, 1968, pp. 1-26, ul. Hoza 69, Warsaw, Poland.
Pask, "Conversation Theory: Applications in Education and Epistemology", Elsevier Scientific Publishing Company, 1976, Amsterdam, The Netherlands.
Pothos, et al., A quantum probability explanation for violations of 'rational' decision theory, Proceedings of the Royal Society B: Biological Sciences, 2009, pp. 276, rspb.royalsocietypublishing.org.
Preskill, Quantum Information and Computation, Lecture Notes Ph219/CS219, Chapters 2&3, California Institute of Technology, 2013.
Schwartz, et al., Personality, Gender, and Age in the Language of Social Media: The Open-Vocabulary Approach, Sep. 2013, pp. 1-16.
Srednicki, M., Quantum Field Theory, 2006, http://www.physics,ucsb.edu/~mark/qft.html, pp. 1-616, University of California, Santa Barbara, USA.
Summers, Thought and the Uncertainty Principle, Sep. 28, 2013, pp. 3-6, http://www.jasonsummers.org/thought-and-the-uncertainty-principle/.
Trueblood, et al., A Quantum Probability Model of Causal Reasoning, Hypothesis and Theory Article, May 2012, pp. 1-13, Frontiers in Psychology | Cognitive Science, www.frontiersin.org, USA.
Trueblood, et al., Quantum Probability Theory as a Common Framework for Reasoning and Similarity, Opinion Article, Apr. 2014, pp. 1-4, Frontiers in Psychology | Cognitive Science, www.frontiersin.org, USA.
Verhoeven, Ensemble Methods for Personality Recognition, AAAI Technical Report WS-13-01, 2000, pp. 35-38, CLiPS, University of Antwerp, Antwerp, Belgium.
Wang, et al., "Context effects produced by question orders reveal quantum nature of human judgments", PNAS, vol. 111, Issue: 26, pp. 9431-9436, 2014, Digital Object Identifier: 10.1073/pnas.1407756111.
Wang, et al., "A Quantum Question Order Model Supported by Empirical Tests of an A Priori and Precise Prediction", Topics in Cognitive Sciences, 5, pp. 689-710, 2013, Digital Object Identifier: 10.1111/tops.12040.
Yepez, "Lecture Notes: Qubit Representations and Rotations", Lecture Notes, Department of Physics and Astronomy, University of Hawaii at Manoa, Phys 711, Topics in Particles & Fields, Lecture 1, v.03, Spring 2013, Jan. 9, 2013, Honolulu.
Zurek, "Decoherence and the Transition from Quantum to Classical—Revisited", Los Alamos Science, vol. 27, Publisher: Springer, pp. 2-25, 2002, Digital Object Identifier: 10.1063/1.881293.

\* cited by examiner

PERTURBING THE CONTEXTUALIZATION OF A PROPOSITION BY A GROUP OF SUBJECTS CONSIDERED IN A QUANTUM REPRESENTATION BY INJECTING A SUBJECT EXHIBITING AN ANTI-CONSENSUS STATISTIC MODULO THE PROPOSITION

RELATED APPLICATIONS

This application is related to U.S. patent application Ser. No. 14/182,281 entitled "Method and Apparatus for Predicting Subject Responses to a Proposition based on a Quantum Representation of the Subject's Internal State and of the Proposition", filed on Feb. 17, 2014, and to U.S. patent application Ser. No. 14/224,041 entitled "Method and Apparatus for Predicting Joint Quantum States of Subjects modulo an Underlying Proposition based on a Quantum Representation", filed on Mar. 24, 2014, and to U.S. patent application Ser. No. 14/324,127 entitled "Quantum State Dynamics in a Community of Subjects assigned Quantum States modulo a Proposition perceived in a Social Value Context", filed on Jul. 4, 2014, and to U.S. patent application Ser. No. 14/504,435 entitled "Renormalization-Related Deployment of Quantum Representations for Tracking Measurable Indications Generated by Test Subjects while Contextualizing Propositions", filed on Oct. 2, 2014, and to U.S. patent application Ser. No. 14/555,478 entitled "Marketing to a Community of Subjects assigned Quantum States modulo a Proposition perceived in a Social Value Context", filed on Nov. 26, 2014, and to U.S. patent application Ser. No. 14/582,056 entitled "Biasing effects on the contextualization of a proposition by like-minded subjects considered in a quantum representation", filed on Dec. 23, 2014, and to U.S. patent application Ser. No. 14/583,712 entitled "Perturbing a subject's contextualization of a proposition about an item considered in a quantum representation by altering the item", filed on Dec. 28, 2014, and to U.S. patent application Ser. No. 14/588,296 entitled "Freezing a subject's contextualization of a proposition considered in a quantum representation by using a Quantum Zeno effect", filed on Dec. 31, 2014. All eight enumerated related applications are incorporated herein by reference in their entirety.

FIELD OF THE INVENTION

The present invention relates to a method and an apparatus for perturbing the contextualization or the manner of apprehending a proposition that is adopted by a group of subjects by adding to the group of subjects a disruptive subject that exhibits a Fermi-Dirac (F-D) or anti-consensus statistic modulo the proposition, the method and apparatus being applicable in conjunction with a quantum representation of all the subjects and their contextualizations of the proposition.

BACKGROUND OF THE INVENTION

1. Preliminary Overview

Fundamental and new insights into the workings of nature at micro-scale were captured by quantum mechanics over a century ago. The realizations derived from these insights have forced several drastic revisions to our picture of reality at that scale. A particularly difficult to accept adjustment in thinking had to do with quantum's inherently statistical rather than predictive description of events.

Many centuries of progress in the western world were rooted in logical and positivist extensions of the ideas of materialism. This paradigm suggested that the underpinnings of reality involve elements that are separable and interact in deterministic ways. Short of such classical triumph, one might have at least presumed that reality is explainable in terms of distinguishable elements that are stable, coherent and consistent. These expectations biased the human mind against theories of nature that did not offer simple, certain and perpetually applicable rules for categorizing and quantifying things.

Quantum mechanics flagrantly violated these expectations. Moreover, reality sided with quantum mechanics by supporting all of its predictions with experimentally verifiable facts. This unceremonious breaking of western premises and of the classical worldview presented scientists and modern thinkers with a conundrum of epic proportions.

As often happens in such situations, western culture at large chose the coping mechanism of avoidance and/or denial. In other words, for the most part it kept marching on without worrying about the implications of quantum theory on human lives and endeavors. The few that paid attention to the sound of death knells for cherished notions such as the western concepts of ontology and epistemology, determinism, realism and causality found some solace in three principles. The application of these principles helped to convince them to sequester any conceivable effects of the novel and "weird" ideas in the domain of the very small.

First was the correspondence principle, which requires that quantum mechanics reduce to classical physics at macro-scale. Second was decoherence, the accepted mechanism for explaining the emergence of classical order at macro-scale. Third were the tools officially devised by the Copenhagen Interpretation, and more specifically the classical measurement apparatus deemed fundamental to performing any legitimate quantum measurements and explaining the experiment. (It should be remarked, however, that even the biggest proponent of using the classical-sized measurement apparatus, Niels Bohr, did not preclude the possibility of treating large-scale systems quantum mechanically, provided a suitable "classical apparatus" could be found for making the required measurements.) The above concepts along with several additional arguments permitted even those perturbed by the new science to safely disregard its most radical aspects in most practical settings.

In most people's minds "weird" revolutionary ideas became a curiosity confined to the atomic and sub-atomic realms as well as esoteric fields presumed devoid of any practical importance. Despite many attempts to export the new teachings to wider circles, including many academic disciplines, the actual and unadulterated discoveries did not percolate into general western consciousness. Rather than achieving the stature it deserved, the new fundamental theory of nature became a silent explosion in a niche domain with a recognized ability to amuse and perplex. Of course, the inherent difficulty of the subject and the high level of skill required of its practitioners were never helpful in efforts at wider dissemination.

In fields more closely affected by the quantum, many responded by adopting strong notions about the existence of as-yet-undiscovered and more fundamental predictive description(s) of microscopic phenomena that would explain the same facts more fully. In following such classical intuitions, some have spent considerable efforts in unsuccessful attempts to attribute the statistical nature of quantum mechanics to its incompleteness. Others tried to interpret or reconcile it with entrenched classical intuitions rooted in Newtonian physics. However, the deep desire to contextualize quantum mechanics within a larger and more "intuitive" or even quasi-classical framework has resulted in few works of practical significance. On the other hand, it has bred many philosophical discussions that are ongoing.

Meanwhile, as human tools enable us to probe nature at incredible resolutions, quantum mechanics continues to exhibit exceptional levels of agreement with all measurable aspects of reality. Its explanatory power within legitimately applicable realms remains unchallenged as it continues to defy all struggles at classical reinterpretations. Today, quantum mechanics and the consequent quantum theory of fields (its extension and partial integration with relativity theory) have proven to be humanity's best fundamental theories of nature. Sub-atomic, atomic as well as many molecular and even higher-level phenomena are now studied with quantum or at least quasi-quantum models.

In a radical departure from the classical assumption of perpetually existing and measurable quantities, the quantum representation of reality posits new entities called wavefunctions or state vectors. These unobservable components of the new model of reality are prior to the emergence of measured quantities (a.k.a. observables) or facts. More precisely, state vectors are related to distributions of probabilities for observing any one of a range of possible experimental results. A telltale sign of the "non-physical" status of a state vector is captured in the language of mathematics, where typical state vectors are expressed as imaginary-valued objects. Further, the space spanned by such state vectors is not classical (i.e., it is not our familiar Euclidean space or even any classical configuration space such as phase space). Instead, state vectors inhabit a Hilbert space of square-integrable functions.

Given that state vectors actually represent complex probability amplitudes, it is uncanny that their behavior is rather easily reconciled with previously developed physics formalisms. Indeed, after some revisions the tools of Lagrangian and Hamiltonian mechanics as well as many long-standing physical principles, such as the Principle of Least Action, are found to apply directly to state vectors and their evolution. The stark difference, of course, is that state vectors themselves represent relative propensities for observing certain measurable values associated with the objects of study, rather than these measurable quantities themselves. In other words, whereas the classical formulations, including Hamiltonian or Lagrangian mechanics, were originally devised to describe the evolution of "real" entities, their quantum mechanical equivalents apply to the evolution of probability amplitudes in a "pre-emerged reality". Apart from that jarring fact, when left unobserved the state vectors prove to be rather well behaved. Their continuous and unitary evolution in Hilbert space is not entirely unlike propagation of real waves in plain Euclidean space. Hence, some of our intuitions about classical wave mechanics are useful in grasping the behavior of quantum waves.

Of course, our intuitive notions about wave mechanics ultimately falter because quantum waves are not physical waves. This becomes abundantly clear when considering superpositions of two or more such complex-valued objects. Indeed, such superpositions help to bring out several unexpected aspects of quantum mechanics.

For example, quantum wave interference predicts the emergence of probability interference patterns that lead to unexpected distributions of measureable entities in real space. This is true, albeit not noticeable at macro-scales, even when dealing with familiar particles and their trajectories. The interference effect is probably best illustrated by the famous Young's double slit experiment. Here, the complex phase differences between quantum mechanical waves propagating from different space points, namely the two slits where the particle wave was forced to "bifurcate", manifest in a measurable effect on the path followed by the physical particle. Specifically, the particle is predicted to exhibit a type of self-interference that prevents it from reaching certain places that lie manifestly along classically computed particle trajectories. These startling quantum effects are confirmed by fact.

Although surprising, wave superpositions and interference patterns in probability distributions are ultimately not the novel aspects that challenged human intuition most. Far more mysterious is the nature of measurement during which a real value of an observable attribute or of an element of reality is actually observed. While the underlying model of pre-emerged reality constructed of quantum waves governed by differential wave equations (e.g., by the Schroedinger equation) and boundary conditions may be at least partly intuitive, measurement defies all attempts at non-probabilistic description.

According to quantum theory, the act of measurement forces the full state vector or wave packet of all possibilities to "collapse" or choose just one of the possibilities. In other words, measurement forces the normally compound wave function (i.e., a superposition of possible wave solutions to the governing differential equation) to transition discontinuously and manifest as just one of its constituents. Still differently put, measurement reduces the wave packet and selects only one component wave from the full packet that represents the superposition of all component waves contained in the state vector.

In order to properly evaluate the state of the prior art and to contextualize the contributions of the present invention, it will be necessary to review a number of important concepts from quantum mechanics, quantum information theory (e.g., the quantum version of bits also called "qubits" by skilled artisans) and several related fields. For the sake of brevity, only the most pertinent issues will be presented herein. A more thorough review of quantum information theory is found in course materials by John P. Preskill, "Quantum Information and Computation", Lecture Notes Ph219/CS219, Chapters 2&3, California Institute of Technology, 2013 and references cited therein and in lecture notes of Jeffrey Yepez, "Topics in Particles & Fields", Lectures 1&2 Phys711, Department of Physics and Astronomy of the University of Hawaii, Spring 2013 and the references cited therein as well. Excellent reviews of the fundamentals of quantum mechanics are found in standard textbooks starting with P. A. M. Dirac, "The Principles of Quantum Mechanics", Oxford University Press, $4^{th}$ Edition, 1958; L. D. Landau and E. M. Lifshitz, "Quantum Mechanics (Non-relativistic Theory)", Institute of Physical Problems, USSR Academy of Sciences, Butterworth Heinemann, $3^{rd}$ Edition, 1962; Cohen-Tannoudji et al., "Quantum Mechanics", John Wiley & Sons, 1977, and many others including the more modern and experiment-based treatments such as J. J. Sakurai, "Modern Quantum Mechanics", Addison-Wesley, 2011.

2. A Brief Review of Quantum Mechanics Fundamentals

In most practical applications of quantum models, the process of measurement is succinctly and elegantly described in the language of linear algebra or matrix mechanics (frequently referred to as the Heisenberg picture). Since all those skilled in the art are familiar with linear algebra, many of its fundamental theorems and corollaries will not be reviewed herein. In the language of linear algebra, a quantum wave $\psi$ is represented in a suitable eigenvector basis by a state vector $|\psi\rangle$. To provide a more rigorous definition, we will take advantage of the formal bra-ket notation introduced by Dirac and routinely used in the art.

In the bra-ket convention a column vector $\psi$ is written as $|\psi\rangle$ and its corresponding row vector (dual vector) is written as $\langle\psi|$. Additionally, because of the complex-valuedness of quantum state vectors, flipping any bra vector to its dual ket vector and vice versa implicitly includes the step of complex conjugation. After initial introduction, most textbooks do not expressly call out this step (i.e., $\langle\psi|$ is really $\langle\psi^*|$ where the asterisk denotes complex conjugation). The reader is cautioned that many simple errors can be avoided by recalling this fundamental rule of complex conjugation.

We now recall that a measure of norm or the dot product (which is related to a measure of length and is a scalar quantity) for a standard vector $\vec{x}$ is normally represented as a multiplication of its row vector form by its column vector form as follows: $d = \vec{x}^T\vec{x}$. This way of determining norm carries over to the bra-ket formulation. In fact, the norm of any state vector carries a special significance in quantum mechanics.

Expressed by the bra-ket $\langle\psi|\psi\rangle$, we note that this formulation of the norm is always positive definite and real-valued for any non-zero state vector. That condition is assured by the step of complex conjugation when switching between bra and ket vectors. State vectors describe probability amplitudes while their norms correspond to probabilities. The latter are real-valued and by convention mapped to a range between 0 and 1 (with 1 representing a probability of 1 or 100% certainty). Correspondingly, all state vectors are typically normalized such that their inner product (a generalization of the dot product) is equal to one, or simply put: $\langle\psi|\psi\rangle = \langle\chi|\chi\rangle = \ldots = 1$. This normalization enforces conservation of probability on objects composed of quantum mechanical state vectors.

Using the above notation, we can represent any state vector $|\psi\rangle$ in its ket form as a sum of basis ket vectors $|\varepsilon\rangle$ that span the Hilbert space $\mathcal{H}$ of state vector $|\psi\rangle$. In this expansion, the basis ket vectors $|\varepsilon\rangle$ are multiplied by their correspondent complex coefficients $c_j$. In other words, state vector $|\psi\rangle$ decomposes into a linear combination as follows:

$$|\psi\rangle = \Sigma_{j=1}^n c_j |\varepsilon_j\rangle \quad \text{Eq. 1}$$

where n is the number of vectors in the chosen basis. This type of decomposition of state vector $|\psi\rangle$ is sometimes referred to as its spectral decomposition by those skilled in the art.

Of course, any given state vector $|\psi\rangle$ can be composed from a linear combination of vectors in different bases thus yielding different spectra. However, the normalization of state vector $|\psi\rangle$ is equal to one irrespective of its spectral decomposition. In other words, bra-ket $\langle\psi|\psi\rangle = 1$ in any basis. From this condition we learn that the complex coefficients $c_j$ of any expansion have to satisfy:

$$p_{tot} = 1 = \Sigma_{j=1}^n c_j^* c_j \quad \text{Eq. 2}$$

where $p_{tot}$ is the total probability. This ensures the conservation of probability, as already mentioned above. Furthermore, it indicates that the probability $p_j$ associated with any given eigenvector $|\varepsilon_j\rangle$ in the decomposition of $|\psi\rangle$ is the norm of the complex coefficient $c_j$, or simply put:

$$p_j = c_j^* c_j. \quad \text{Eq. 3}$$

In view of the above, it is not accidental that undisturbed evolution of any state vector $|\psi\rangle$ in time is found to be unitary or norm preserving. In other words, the evolution is such that the norms $c_j^* c_j$ do not change with time.

To better understand the last point, we use the polar representation of complex numbers by their modulus r and phase angle $\theta$. Thus, we rewrite complex coefficient $c_j$ as:

$$c_j = r_j e^{i\theta_j}, \quad \text{Eq. 4a}$$

where $i = \sqrt{-1}$ (we will use i rather than j for the imaginary number). In this form, complex conjugate of complex coefficient $c_j^*$ is just:

$$c_j^* = r_j e^{-i\theta_j}, \quad \text{Eq. 4b}$$

and the norm becomes:

$$c_j^* c_j = r_j e^{-i\theta_j} r_j e^{-i\theta_j} = r_j^2. \quad \text{Eq. 4c}$$

The step of complex conjugation thus makes the complex phase angle drop out of the product (since $e^{-i\theta}e^{i\theta} = e^{i(\theta-\theta)} = e^0 = 1$). This means that the complex phase of coefficient $c_j$ does not have any measurable effect on the real-valued probability $p_j$ associated with the corresponding eigenvector $|\varepsilon_j\rangle$. Note, however, that relative phases between different components of the decomposition will introduce measurable effects (e.g., when measuring in a different basis).

Given the above insight about complex phases, it should not be a surprise that temporal evolution of state vector $|\psi\rangle$ corresponds to the evolution of phase angles of complex coefficients $c_j$ in its spectral decomposition (see Eq. 1). In other words, evolution of state vector $|\psi\rangle$ in time is associated with a time-dependence of angles $\theta_j$ of each complex coefficient $c_j$. The complex phase thus exhibits a time dependence $e^{i\theta_j} = e^{i\omega_j t}$, where the j-th angular frequency $\omega_j$ is associated with the j-th eigenvector $|\varepsilon\rangle$ and t stands for time. For completeness, it should be pointed out that $\omega_j$ is related to the energy level of the correspondent eigenvector $|\varepsilon\rangle$ by the famous Planck relation:

$$E_j = \hbar \omega_j, \quad \text{Eq. 5}$$

where $\hbar$ stands for the reduced Planck's constant h, namely:

$$\hbar = \frac{h}{2\pi}.$$

Correspondingly, evolution of state vector $|\psi\rangle$ is encoded in a unitary matrix U that acts on state vector $|\psi\rangle$ in such a way that it only affects the complex phases of the eigenvectors in its spectral decomposition. The unitary nature of evolution of state vectors ensures the fundamental conservation of probability. Of course, this rule applies when there are no disturbances to the overall system and states exhibiting this type of evolution are often called stationary states.

In contrast to the unitary evolution of state vectors that affects the complex phases of all eigenvectors of the state vector's spectral decomposition, the act of measurement picks out just one of the eigenvectors. Differently put, the act of measurement is related to a projection of the full state vector $|\psi\rangle$ onto the subspace defined by just one of eigenvectors $|\varepsilon\rangle$ in the vector's spectral decomposition (see Eq.

1). Based on the laws of quantum mechanics, the projection obeys the laws of probability. More precisely, each eigenvector $|\varepsilon\rangle$ has the probability $p_j$ dictated by the norm $c_j^* c_j$ (see Eq. 3) of being picked for the projection induced by the act of measurement. Besides the rules of probability, there are no hidden variables or any other constructs involved in predicting the projection. This situation is reminiscent of a probabilistic game such as a toss of a coin or the throw of a die. It is also the reason why Einstein felt uncomfortable with quantum mechanics and proclaimed that he did not believe that God would "play dice with the universe".

No experiments to date have been able to validate Einstein's position by discovering hidden variables or other deterministic mechanisms behind the choice. In fact, experiments based on the famous Bell inequality and many other investigations have confirmed that the above understanding encapsulated in the projection postulate of quantum mechanics is complete. Furthermore, once the projection occurs due to the act of measurement, the emergent element of reality that is observed, i.e., the measurable quantity, is the eigenvalue $\lambda_j$ associated with eigenvector $|\varepsilon\rangle$ selected by the projection.

Projection is a linear operation represented by a projection matrix P that can be derived from knowledge of the basis vectors. The simplest state vectors decompose into just two distinct eigenvectors in any given basis. These vectors describe the spin states of spin ½ particles such as electrons and other spinors. The quantum states of twistors, such as photons, also decompose into just two eigenvectors. In the present case, we will refer to spinors for reasons of convenience.

It is customary to define the state space of a spinor by eigenvectors of spin along the z-axis. The first, $|\varepsilon_{z+}\rangle$ is aligned along the positive z-axis and the second, $|\varepsilon_{z-}\rangle$ is aligned along the negative z-axis. Thus, from standard rules of linear algebra, the projection along the positive z-axis (z+) can be obtained from constructing the projection matrix or, in the language of quantum mechanics the projection operator $P_{z+}$ from the z+ eigenvector $|\varepsilon_{z+}\rangle$ as follows:

$$P_{z+} = |\varepsilon_{z+}\rangle\langle\varepsilon_{z+}| = [{}_0^1][1\ 0]^* = [{}_0^1{}_0^0],\qquad \text{Eq. 6}$$

where the asterisk denotes complex conjugation, as above (no change here because vector components of $|\varepsilon_{z+}\rangle$ are not complex in this example). Note that in Dirac notation obtaining the projection operator is analogous to performing an outer product in standard linear algebra. There, for a vector $\vec{x}$ we get the projection matrix onto it through the outer product, namely: $P_x = \vec{x}\vec{x}^T$.

3. A Brief Introduction to Qubits

We have just seen that the simplest quantum state vector $|\psi\rangle$ corresponds to a pre-emerged quantum entity that can yield one of two distinct observables under measurement. These measures are the two eigenvalues $\lambda_1$, $\lambda_2$ of the correspondent two eigenvectors $|\varepsilon_1\rangle$, $|\varepsilon_2\rangle$ in the chosen spectral decomposition. The relative occurrence of the eigenvalues will obey the probabilistic rule laid down by the projection postulate. In particular, eigenvalue $\lambda_1$ will be observed with probability $p_1$ (see Eq. 3) equal to the probability of projection onto eigenvector $|\varepsilon_1\rangle$. Eigenvalue $\lambda_2$ will be seen with probability $p_2$ equal to the probability of projection onto eigenvector $|\varepsilon_2\rangle$.

Because of the simplicity of the two-state quantum system represented by such two-state vector $|\psi\rangle$, it has been selected in the field of quantum information theory and quantum computation as the fundamental unit of information. In analogy to the choice made in computer science, this system is commonly referred to as a qubit and so the two-state vector becomes the qubit: $|qb\rangle = |\psi\rangle$. Operations on one or more qubits are of great interest in the field of quantum information theory and its practical applications. Since the detailed description will rely extensively on qubits and their behavior, we will now introduce them with a certain amount of rigor.

From the above preliminary introduction it is perhaps not surprising to find that the simplest two-state qubit, just like a simple spinor or twistor on which it is based, can be conveniently described in 2-dimensional complex space called $\mathbb{C}^2$. The description finds a more intuitive translation to our 3-dimensional space, $\mathbb{R}^3$, with the aid of the Bloch or Poincare Sphere. This concept is introduced by FIG. 1A, in which the Bloch Sphere 10 is shown centered on the origin of orthogonal coordinates indicated by axes X, Y, Z.

Before allowing oneself to formulate an intuitive view of qubits by looking at Bloch sphere 10, the reader is cautioned that the representation of qubits inhabiting $\mathbb{C}^2$ by mapping them to a ball in $\mathbb{R}^3$ is a useful tool. The actual mapping is not one-to-one. Formally, the representation of spinors by the group of transformations defined by SO(3) (Special Orthogonal matrices in $\mathbb{R}^3$) is double-covered by the group of transformations defined by SU(2) (Special Unitary matrices in $\mathbb{C}^2$).

In the Bloch representation, a qubit 12 represented by a ray in $\mathbb{C}^2$ is spectrally decomposed into the two z-basis eigenvectors. These eigenvectors include the z-up or $|+\rangle_z$ eigenvector, and the z-down or $|-\rangle_z$ eigenvector. The spectral decomposition theorem assures us that any state of qubit 12 can be decomposed in the z-basis as long as we use the appropriate complex coefficients. In other words, any state of qubit 12 can be described in the z-basis by:

$$|\psi\rangle_z = |qb\rangle_z = \alpha|+\rangle_z + \beta|-\rangle_z,\qquad \text{Eq. 7}$$

where $\alpha$ and $\beta$ are the corresponding complex coefficients. In quantum information theory, basis state $|+\rangle_z$ is frequently mapped to logical "yes" or to the value "1", while basis state $|-\rangle_z$ is frequently mapped to logical "no" or to the value "0".

In FIG. 1A basis states $|+\rangle_z$ and $|-\rangle_z$ are shown as vectors and are written out in full form for clarity of explanation. (It is worth remarking that although basis states $|+\rangle_z$ and $|-\rangle_z$ are indeed orthogonal in $\mathbb{C}^2$, they fall on the same axis (Z axis) in the Bloch sphere representation in $\mathbb{R}^3$. That is because the mapping is not one-to-one but rather homomorphic, as already mentioned above.) Further, in our chosen representation of qubit 12 in the z-basis, the X axis corresponds to the real axis and is thus also labeled by Re. Meanwhile, the Y axis corresponds to the imaginary axis and is additionally labeled by Im.

To appreciate why complex coefficients $\alpha$ and $\beta$ contain sufficient information to encode qubit 12 pointed anywhere within Bloch sphere 10 we now refer to FIG. 1B. Here the complex plane 14 spanned by real and imaginary axes Re, Im that are orthogonal to the Z axis and thus orthogonal to eigenvectors $|+\rangle_z$ and $|-\rangle_z$ of our chosen z-basis is hatched for better visualization. Note that eigenvectors for the x-basis $|+\rangle_x$, $|-\rangle_x$ as well as eigenvectors for the y-basis $|+\rangle_y$, $|-\rangle_y$ are in complex plane 14. Most importantly, note that each one of the alternative basis vectors in the two alternative basis choices we could have made finds a representation using the eigenvectors in the chosen z-basis. As shown in FIG. 1B, the following linear combinations of eigenvectors $|+\rangle_z$ and $|-\rangle_z$ describe vectors $|\sim\rangle_x$, $|-\rangle_x$ and $|+\rangle_y$, $|-\rangle_y$:

$$|+\rangle_x = \frac{1}{\sqrt{2}}|+\rangle_z + \frac{1}{\sqrt{2}}|-\rangle_z, \quad \text{Eq. 8a}$$

$$|-\rangle_x = \frac{1}{\sqrt{2}}|+\rangle_z - \frac{1}{\sqrt{2}}|-\rangle_z, \quad \text{Eq. 8b}$$

$$|+\rangle_y = \frac{1}{\sqrt{2}}|+\rangle_z + \frac{i}{\sqrt{2}}|-\rangle_z, \quad \text{Eq. 8c}$$

$$|-\rangle_y = \frac{1}{\sqrt{2}}|+\rangle_z - \frac{i}{\sqrt{2}}|-\rangle_z. \quad \text{Eq. 8d}$$

Clearly, admission of complex coefficients α and β permits a complete description of qubit 12 anywhere within Bloch sphere 10 thus furnishing the desired map from $\mathbb{C}^2$ to $\mathbb{R}^3$ for this representation. The representation is compact and leads directly to the introduction of Pauli matrices.

FIG. 1C shows the three Pauli matrices $\sigma_1$, $\sigma_2$, $\sigma_3$ (sometimes also referred to as $\sigma_x$, $\sigma_y$, $\sigma_z$) that represent the matrices corresponding to three different measurements that can be performed on spinors. Specifically, Pauli matrix $\sigma_1$ corresponds to measurement of spin along the X axis (or the real axis Re). Pauli matrix $\sigma_2$ corresponds to measurement of spin along the Y axis (or the imaginary axis Im). Finally, Pauli matrix $\sigma_3$ corresponds to measurement of spin along the Z axis (which coincides with measurements in the z-basis that we have selected). The measurement of spin along any of these three orthogonal axes will force projection of qubit 12 to one of the eigenvectors of the corresponding Pauli matrix. The measurable value will be the eigenvalue that is associated with the eigenvector.

To appreciate the possible outcomes of measurement we notice that all Pauli matrices $\sigma_1$, $\sigma_2$, $\sigma_3$ share the same two orthogonal eigenvectors, namely $|\varepsilon_1\rangle=[1,0]$ and $|\varepsilon_2\rangle=[0,1]$. Further, Pauli matrices are Hermitian (an analogue of real-valued symmetric matrices) such that:

$$\sigma_k = \sigma_k^\dagger, \quad \text{Eq. 9}$$

for k=1, 2, 3 (for all Pauli matrices). These properties ensure that the eigenvalues $\lambda_1$, $\lambda_2$, $\lambda_3$ of Pauli matrices $\sigma_1$, $\sigma_2$, $\sigma_3$ are real and the same for each matrix. In particular, for spin ½ particles such as electrons, the Pauli matrices are multiplied by a factor of $\hbar/2$ to obtain the corresponding spin angular momentum matrices $S_k$. Hence, the eigenvalues are shifted to $$\lambda_1 = \frac{\hbar}{2} \text{ and } \lambda_2 = -\frac{\hbar}{2}$$

(where $\hbar$ is the reduced Planck's constant already defined above). Here we also notice that Pauli matrices $\sigma_1$, $\sigma_2$, $\sigma_3$ are constructed to apply to spinors, which change their sign under a $2\pi$ rotation and require a rotation by $4\pi$ to return to initial state (formally, an operator S is a spinor if $S(\theta+2\pi)=-S(\theta)$).

As previously pointed out, in quantum information theory and its applications the physical aspect of spinors becomes unimportant and thus the multiplying factor of $\hbar/2$ is dropped. Pauli matrices $\sigma_1$, $\sigma_2$, $\sigma_3$ are used in unmodified form with corresponded eigenvalues $\lambda_1=1$ and $\lambda_2=-1$ mapped to two opposite logical values, such as "yes" and "no". For the sake of rigor and completeness, one should state that the Pauli matrices are traceless, each of them squares to the Identity matrix I, their determinants are −1 and they are involutory. A more thorough introduction to their importance and properties can be found in the many foundational texts on Quantum Mechanics, including the above mentioned textbook by P. A. M. Dirac, "The Principles of Quantum Mechanics", Oxford University Press, 4$^{th}$ Edition, 1958 in the section on the spin of the electron.

Based on these preliminaries, the probabilistic aspect of quantum mechanics encoded in qubit 12 can be re-stated more precisely. In particular, we have already remarked that the probability of projecting onto an eigenvector of a measurement operator is proportional to the norm of the complex coefficient multiplying that eigenvector in the spectral decomposition of the full state vector. This rather abstract statement can now be recast as a complex linear algebra prescription for computing an expectation value $\langle O \rangle$ of an operator matrix O for a given quantum state $|\psi\rangle$ as follows:

$$\langle O \rangle_\psi = \langle \psi|O|\psi \rangle, \quad \text{Eq. 10a}$$

where the reader is reminded of the implicit complex conjugation between the bra vector $\langle\psi|$ and the dual ket vector $|\psi\rangle$. The expectation value $\langle O \rangle_\psi$ is a number that corresponds to the average result of the measurement obtained by operating with matrix O on a system described by state vector $|\psi\rangle$. For better understanding, FIG. 1C visualizes the expectation value $\langle \sigma_3 \rangle$ for qubit 12 whose ket in the z-basis is written as $|qb\rangle_z$ for a measurement along the Z axis represented by Pauli matrix $\sigma_3$ (note that the subscript on the expectation value is left out, since we know what state vector is being measured).

Although the drawing may suggest that expectation value $\langle \sigma_3 \rangle$ is a projection of qubit 12 onto the Z axis, the value of this projection is not the observable. Instead, the value $\langle \sigma_3 \rangle$ is the expectation value of collapse of qubit 12 represented by ket vector $|qb\rangle_z$, in other words, a value that can range anywhere between 1 and −1 ("yes" and "no") and will be found upon collecting the results of a large number of actual measurements.

In the present case, since operator $\sigma_3$ has a complete set of eigenvectors (namely $|+\rangle_z$ and $|-\rangle_z$) and since the qubit $|qb\rangle_z$ we are interested in is described in the same z-basis, the probabilities are easy to compute. The expression follows directly from Eq. 10a:

$$\langle \sigma_3 \rangle_\psi = \Sigma_j \lambda_j |\langle \psi|\varepsilon_j\rangle|^2, \quad \text{Eq. 10b}$$

where $\lambda_j$ are the eigenvalues (or the "yes" and "no" outcomes of the experiment) and the norms $|\langle \psi|\varepsilon_j\rangle|^2$ are the probabilities that these outcomes will occur. Eq. 10b is thus more useful for elucidating how the expectation value of an operator brings out the probabilities of collapse to respective eigenvectors $|\varepsilon\rangle$ that will obtain when a large number of measurements are performed in practice.

For the specific case in FIG. 1C, we show the probabilities from Eq. 10b can be found explicitly in terms of the complex coefficients α and β. Their values are computed from the definition of quantum mechanical probabilities already introduced above (see Eqs. 2 and 3):

$$p_1 = p_{\text{"yes"}} = |\langle qb|\varepsilon_1 \rangle|^2 = |(\alpha^* \langle +| + \beta^* \langle -|)|+\rangle_z|^2 = \alpha^*\alpha$$

$$p_2 = p_{\text{"no"}} = |\langle qb|\varepsilon_2 \rangle|^2 = |(\alpha^* \langle +| + \beta^* \langle -|)|-\rangle_z|^2 = \beta^*\beta$$

$$p_1 + p_2 = p_{\text{"yes"}} + p_{\text{"no"}} = \alpha^*\alpha + \beta^*\beta = 1$$

These two probabilities are indicated by visual aids at the antipodes of Bloch sphere 10 for clarification. The sizes of the circles that indicate them denote their relative values. In the present case $p_{"yes"} > p_{"no"}$ given the exemplary orientation of qubit 12.

Representation of qubit 12 in Bloch sphere 10 brings out an additional and very useful aspect to the study, namely a more intuitive polar representation. This representation will also make it easier to point out several important aspects of quantum mechanical states that will be pertinent to the present invention.

FIG. 1D illustrates qubit 12 by deploying polar angle θ and azimuthal angle φ routinely used to parameterize the surface of a sphere in $\mathbb{R}^3$. Qubit 12 described by state vector $|qb\rangle_z$ has the property that its vector representation in Bloch sphere 10 intersects the sphere's surface at point 16. That is apparent from the fact that the norm of state vector $|qb\rangle_z$ is equal to one and the radius of Bloch sphere 10 is also one. Still differently put, qubit 12 is represented by quantum state $|qb\rangle_z$ that is pure; i.e., it is considered in isolation from the environment and from any other qubits for the time being. Pure state $|qb\rangle_z$ is represented with polar and azimuth angles θ, φ of the Bloch representation as follows:

$$|qb\rangle_z = \cos\frac{\theta}{2}|+\rangle_z + e^{i\phi}\sin\frac{\theta}{2}|-\rangle_z, \quad \text{Eq. 11}$$

where the half-angles are due to the state being a spinor (see definition above). The advantage of this description becomes even more clear in comparing the form of Eq. 11 with Eq. 7. State $|qb\rangle_z$ is insensitive to any overall phase or overall sign thus permitting several alternative formulations.

Additionally, we note that the Bloch representation of qubit 12 provides for an easy parameterization of point 16 in terms of {x,y,z} coordinates directly from polar and azimuth angles θ, φ. In particular, the coordinates of point 16 are just:

$$\{x,y,z\}=\{\sin\theta\cos\phi, \sin\theta\sin\phi, \cos\theta\}, \quad \text{Eq. 12}$$

in agreement with standard transformation between polar and Cartesian coordinates.

We now return to the question of measurement equipped with some basic tools and a useful representation of qubit 12 as a unit vector terminating at the surface of Bloch sphere 10 at point 16 (whose coordinates {x,y,z} are found from Eq. 12) and pointing in some direction characterized by angles θ, φ. The three Pauli matrices $\sigma_1$, $\sigma_2$, $\sigma_3$ can be seen as associating with measurements along the three orthogonal axes X, Y, Z in real 3-dimensional space $\mathbb{R}^3$.

A measurement represented by a direction in $\mathbb{R}^3$ can be constructed from the Pauli matrices. This is done with the aid of a unit vector û pointing along a proposed measurement direction, as shown in FIG. 1D. Using the dot-product rule, we now compose the desired operator $\sigma_u$ using unit vector û and the Pauli matrices as follows:

$$\sigma_u = \hat{u}\cdot\vec{\sigma} = u_x\sigma_1 + u_y\sigma_2 + u_z\sigma_3. \quad \text{Eq. 13}$$

Having thus built up a representation of quantum mechanical state vectors, we are in a position to understand a few facts about the pure state of qubit 12. Namely, an ideal or pure state of qubit 12 is represented by a Bloch vector of unit norm pointing along a well-defined direction. It can also be expressed by Cartesian coordinates {x,y,z} of point 16. Unit vector û defining any desired direction of measurement can also be defined in Cartesian coordinates {x,y,z} of its point of intersection 18 with Bloch sphere 10.

When the direction of measurement coincides with the direction of the state vector of qubit 12, or rather when the Bloch vector is aligned with unit vector û, the result of the quantum measurement will not be probabilistic. In other words, the measurement will yield the result $|+\rangle_u$ with certainty (probability equal to 1 as may be confirmed by applying Eq. 10b), where the subscript u here indicates the basis vector along unit vector û. Progressive misalignment between the direction of measurement and qubit 12 will result in an increasing probability of measuring the opposite state, $|-\rangle_u$.

The realization that it is possible to predict the value of qubit 12 with certainty under above-mentioned circumstances suggests we ask the opposite question. When do we encounter the least certainty about the outcome of measuring qubit 12? With the aid of FIG. 1E, we see that in the Bloch representation this occurs when we pick a direction of measurement along a unit vector v̂ that is in a plane 20 perpendicular to unit vector û after establishing the state $|+\rangle_u$ (or the state $|-\rangle_u$) by measuring qubit 12 eigenvalue "yes" along û (or "no" opposite to û). Note that establishing a certain state in this manner is frequently called "preparing the state" by those skilled in the art. After preparation in state $|+\rangle_u$ or in state $|-\rangle_u$, measurement of qubit 12 along vector v̂ will produce outcomes $|+\rangle_v$ and $|-\rangle_v$ with equal probabilities (50/50).

Indeed, we see that this same condition holds among all three orthogonal measurements encoded in the Pauli matrices. To wit, preparing a certain measurement along Z by application of matrix $\sigma_3$ to qubit 12 makes its subsequent measurement along X or Y axes maximally uncertain (see also plane 14 in FIG. 1B). This suggests some underlying relationship between Pauli matrices $\sigma_1$, $\sigma_2$, $\sigma_3$ that encodes for this indeterminacy. Even based on standard linear algebra we expect that since the order of application of matrix operations usually matters (since any two matrices A and B typically do not commute) the lack of commutation between Pauli matrices could be signaling a fundamental limit to the simultaneous observation of multiple orthogonal components of spin or, by extension, of qubit 12.

In fact, we find that the commutation relations for the Pauli matrices, here explicitly rewritten with the x,y,z indices rather than 1, 2, 3, are as follows:

$$[\sigma_x,\sigma_y]=i\sigma_z; [\sigma_y,\sigma_z]=i\sigma_x; [\sigma_z,\sigma_x]=i\sigma_y. \quad \text{Eq. 14}$$

The square brackets denote the traditional commutator defined between any two matrices A and B as [A,B]=AB−BA. When actual quantities rather than qubits are the subject of investigation, this relationship leads directly to the famous Heisenberg Uncertainty Principle. This fundamental limitation on the emergence of elements of reality prevents the simultaneous measurement of incompatible observables and places a bound related to Planck's constant h (and more precisely to the reduced Planck's constant $\hbar$) on the commutator. This happens because matrices encoding real observables bring in a factor of Planck's constant and the commutator thus acquires this familiar bound.

The above finding is general and extends beyond the commutation relations between Pauli matrices. According to quantum mechanics, the measurement of two or more incompatible observables is always associated with matrices that do not commute. Another way to understand this new limitation on our ability to simultaneously discern separate elements of reality, is to note that the matrices for incompatible elements of reality cannot be simultaneously diagonalized. Differently still, matrices for incompatible elements of reality do not share the same eigenvectors. Given this fact of nature, it is clear why modern day applications strive to classify quantum systems with as many commuting observables as possible up to the famous Complete Set of Commuting Observables (CSCO).

Whenever the matrices used in the quantum description of a system do commute, then they correspond to physical quantities of the system that are simultaneously measurable. A particularly important example is the matrix that corresponds to the total energy of the system known as the Hamiltonian H. When an observable is described by a matrix M that commutes with Hamiltonian H, and the system is not subject to varying external conditions, (i.e., there is no explicit time dependence) then that physical quantity that corresponds to operator M is a constant of motion.

4. A Basic Measurement Arrangement

In practice, pure states are rare due to interactions between individual qubits as well as their coupling to the environment. All such interactions lead to a loss of quantum state coherency, also referred to as decoherence, and the consequent emergence of "classical" statistics. Thus, many additional tools have been devised for practical applications of quantum models under typical conditions. However, under conditions where the experimenter has access to entities exhibiting relatively pure quantum states many aspects of the quantum mechanical description can be recovered from appropriately devised measurements.

To recover the desired quantum state information it is important to start with collections of states that are large. This situation is illustrated by FIG. 1F, where an experimental apparatus 22 is set up to perform a measurement of spin along the Z axis. Apparatus 22 has two magnets 24A, 24B for separating a stream of quantum systems 26 (e.g., electrons) according to spin. The spin states of systems 26 are treated as qubits $12a, 12b, \ldots, 12n$ for the purposes of the experiment. The eigenvectors and eigenvalues are as before, but the subscript "z" that was there to remind us of the z-basis decomposition, which is now implicitly assumed, has been dropped.

Apparatus 22 has detectors 28A, 28B that intercept systems 26 after separation to measure and amplify the readings. It is important to realize that the act of measurement is performed during the interaction between the field created between magnets 24A, 24B and systems 26. Therefore, detectors 28A, 28B are merely providing the ability to amplify and record the measurements for human use. These operations remain consistent with the original result of quantum measurements. Hence, their operation can be treated classically. (The careful reader will discover a more in-depth explanation of how measurement can be understood as entanglement that preserves consistency between measured events given an already completed micro-level measurement. By contrast, the naïve interpretation allowing amplification to lead to macro-level superpositions and quantum interference, to with the Schroedinger's Cat paradox, is incompatible with the consistency requirement. A detailed analysis of these fine points is found in any of the previously mentioned foundational texts on quantum mechanics.)

For systems 26 prepared in various pure states that are unknown to the experimenter, the measurements along Z will not be sufficient to deduce these original states. Consider that each system 26 is described by Eq. 7. Thus, each system 26 passing through apparatus 22 will be deflected according to its own distinct probabilities $p_{|+\rangle}=\alpha^*\alpha$ (or $p_{\text{``yes''}}$) and $p_{|-\rangle}=\beta^*\beta$ (or $p_{\text{``no''}}$). Hence, other than knowing the state of each system 26 with certainty after its measurement, general information about the preparation of systems 26 prior to measurement will be very difficult to deduce.

FIG. 1G shows the more common situation, where systems 26 are all prepared in the same, albeit unknown pure state (for "state preparation" see section 3 above). Under these circumstances, apparatus 22 can be used to deduce more about the original pure state that is unknown to the experimenter. In particular, a large number of measurements of $|+\rangle$ ("yes") and $|-\rangle$ ("no") outcomes, for example N such measurements assuming all qubits $12a$ through $12n$ are properly measured, can be analyzed probabilistically. Thus, the number $n_{|+\rangle}$ of $|+\rangle$ measurements divided by the total number of qubits 12 that were measured, namely N, has to equal $\alpha^*\alpha$. Similarly, the number $n_{|-\rangle}$ of $|-\rangle$ measurements divided by N has to equal $\beta^*\beta$. From this information the experimenter can recover the projection of the unknown pure state onto the Z axis. In FIG. 1G this projection 26' is shown as an orbit on which the state vector can be surmised to lie. Without any additional measurements, this is all the information that can be easily gleaned from a pure Z axis measurement with apparatus 22.

5. Overview of Practical Cases

By now it will have become apparent to the reader that the quantum mechanical underpinnings of qubits are considerably more complicated than the physics of regular bits. Regular bits can be treated in a manner that is completely divorced from their physicality. A computer scientist dealing with a bit does not need to know what the physical system embodying the bit happens to be, as long as it satisfies the typical criteria of performance (e.g., low probability of bit errors and containment of other failure modes). Unfortunately, as already remarked and further based on the reviews found in the patent applications enumerated in the section on related applications, the same is not true for qubits.

To deal with quantum systems exhibiting interactions between themselves and with the environment that has degrees of freedom inaccessible to an observer a more practical representation had to be adopted. That is because in such open systems states are typically not rays in Hilbert space and measurements are not obtained by applying simple projections operators. Moreover, the evolution of the states is usually not unitary. A suitable representation in view of these real-life limitations is embodied by the density matrix, which was devised in the first half of the 20th century and is usually attributed to John von Neumann (also sometimes to Lev Landau and Felix Bloch). We have previously discussed this matrix in U.S. patent application Ser. No. 14/182,281. Here we want to focus more on how this matrix accommodates mixed states and pure states that include coherent superpositions.

Let us start by looking at coherent superpositions. From Eq. 8a we know a pure state of up along X axis, or $|+\rangle_x$, can be expressed in terms of the up- and down-states along Z axis, i.e., by using the z-basis eigenvectors $|+\rangle_z$ and $|-\rangle_z$. Recall that the required superposition is actually:

$$|+\rangle_x = \frac{1}{\sqrt{2}}|+\rangle_z + \frac{1}{\sqrt{2}}|-\rangle_z.$$

This means that if we were to measure the z-component of spin (using the $\sigma_3$ operator or equivalently experimental apparatus 22 introduced in FIG. 1F) over a statistical sample of quantum systems 26 prepared as $|+\rangle_x$ then we would find states $|+\rangle_z$ and $|-\rangle_z$ to be equally likely (50/50). After all, the superposition has $c_1=\alpha=1/\sqrt{2}$ and thus probability $p_1=(1/\sqrt{2})^2=\frac{1}{2}$ for state $|+\rangle_z$ and $c_2=\beta=1/\sqrt{2}$ leading to probability $p_2=(1/\sqrt{2})^2=\frac{1}{2}$ for state $|-\rangle_z$. If we were to measure the x-component of spin for this superposition via the $\sigma_1$ operator, however, we would find $|+\rangle_x$ with certainty every time (100% chance). (Of course, we would not actually observe the states, but rather their eigenvalues.)

Now consider a case in which we have a statistical sample or, what those skilled in the art refer to as an ensemble, of quantum systems 26 in which half of the states are $|+\rangle_z$ and the other half of the states are $|-\rangle_z$. Once again, by applying the $\sigma_3$ operator instantiated by experimental apparatus 22 we would find these states to be equally likely (50/50). Yet, a measurement along X axis represented by the $\sigma_1$ operator (we would obviously have to rotate apparatus 22 to perform this measurement) on the same ensemble would now discover state $|+\rangle_x$ only half of the time. The other half of the time the state along X axis would be down or $|-\rangle_x$. In other words, the ensemble exhibits an equiprobable distribution (50/50 chance) of states $|+\rangle_x$ and $|-\rangle_x$!

We have just uncovered a fundamental inability of measurements along just one single axis to determine the difference between a coherent superposition and a statistical ensemble. Needless to say, a proper description of the superposition and the statistical ensemble (sometimes referred to as "Gemisch" (German for "mixture" or "mixed state") by those skilled in the art) should take account of this. The density matrix is the right description and can be used in either case.

Let us examine its representation of the pure state expressed by the coherent superposition of Eq. 8a first. We construct the density matrix for this pure state by forming a projection onto it and then multiplying it by the probability of occurrence of this pure state. In our case the probability of occurrence of state $|+\rangle_z$ is 100% or 1. It must clearly be so, since we are not dealing with a mixture of different states but a coherent superposition. The density operator thus has only one component (i=1) and is computed using the outer product (introduced in conjunction with projection operators) as follows:

$$\hat{\rho}=\Sigma_i p_i |\psi_i\rangle\langle\psi_i|, \quad \text{Eq. 15}$$

yielding in our case:

$$\hat{\rho} = \left(\frac{1}{\sqrt{2}}|+\rangle_z + \frac{1}{\sqrt{2}}|-\rangle_z\right)\left(\frac{1}{\sqrt{2}}{}_z\langle+| + \frac{1}{\sqrt{2}}{}_z\langle-|\right) = \begin{bmatrix} \frac{1}{2} & \frac{1}{2} \\ \frac{1}{2} & \frac{1}{2} \end{bmatrix}.$$

The trace class density operator $\hat{\rho}$ thus obtained encodes pure state $|+\rangle_x$ computed from its traditional z-basis decomposition. (We note here that the basis in which the computation is done turns out to be unimportant.)

Matrix $\hat{\rho}$ for pure state $|+\rangle_z$ looks a bit unwieldy and it may not be immediately apparent that it encodes a coherent superposition. Of course, it is idempotent and thus a good candidate density operator for representing a pure state (a state whose point 16 in the Bloch representation is on the surface of the Bloch ball—also see here the background section of U.S. patent application Ser. No. 14/182,281 and FIG. 1J in particular for an additional refresher on the properties of density matrices). However, we can compute the average value of observable $\sigma_1$ corresponding to the X axis measurement of spin for a reliable cross-check. The computation is performed by tracing over the product of two matrices. The first matrix is the observable of interest, represented here by operator matrix O, and the second one is just matrix $\hat{\rho}$ as follows:

$$\overline{O}=Tr\hat{\rho}O, \quad \text{Eq. 16}$$

where the over-bar denotes average value. It is worth recalling that the trace operation will yield the same answer irrespective of matrix order whether or not the matrices commute. Now, to deploy Eq. 16 for our cross-check we set $O=\sigma_1$ and obtain:

$$\overline{\sigma_1} = Tr\left(\begin{bmatrix} \frac{1}{2} & \frac{1}{2} \\ \frac{1}{2} & \frac{1}{2} \end{bmatrix}\begin{bmatrix} 0 & 1 \\ 1 & 0 \end{bmatrix}\right) = 1.$$

This means that the average value for a measurement along X axis is 1, or spin up. In fact, for the pure state under consideration this is exactly the expectation value which is written as $\langle\sigma_1\rangle$ and whose prescription we have already introduced above (see Eqs. 10a & 10b). Spin up along X axis for sure indicates state $|+\rangle_x$. We have thus confirmed that the more general density matrix formalism correctly reproduces the expectation value.

We turn now to the mixed state introduced above. It is an ensemble of states $|+\rangle_z$ and $|-\rangle_z$ occurring with equal probabilities. Clearly, this is not a coherent superposition of the two states, but rather a stream of these states with 50/50 probability. The density operator applied from Eq. 15 now yields:

$$\hat{\rho} = \frac{1}{2}(|+\rangle_{zz}\langle+| + |-\rangle_{zz}\langle-|) = \begin{bmatrix} \frac{1}{2} & 0 \\ 0 & \frac{1}{2} \end{bmatrix} = \frac{1}{2}I,$$

where I is the 2×2 identity matrix. The application of Eq. 16 to find the average value of spin along any one of the three axes X, Y and Z (and indeed along any arbitrary direction indicated by unit vector $\hat{u}$) will yield zero. We further note that the Von Neumann Entropy, which is defined as $S=-Tr(\rho \ln(\rho))$, is maximum for our mixed state and minimum (zero) for the coherent superposition. Given perfect knowledge of our pure state versus the equiprobable statistics of our mixture this is the expected result. We also note that the same density operator was obtained when describing the Einstein Podolsky Rosen (EPR) states in U.S. patent application Ser. No. 14/182,281 (see Eq. 18).

The density matrix becomes an especially useful tool when dealing with entangled states. Such states may include entangled states that obey either Bose-Einstein or Fermi-Dirac statistics. These types of states are not found in classical information theory, but are of great interest in quantum information theory. Using the z-basis decomposition implicitly, the two possible two-qubit states that exhibit entanglement are:

$$|\phi^\pm\rangle = \frac{1}{\sqrt{2}}(|-,-\rangle \pm |+,+\rangle) = \frac{1}{\sqrt{2}}(|00\rangle \pm |11\rangle), \quad \text{Eq. 17a}$$

-continued $$|\psi^{\pm}\rangle = \frac{1}{\sqrt{2}}(|-,+\rangle \pm |+,-\rangle) = \frac{1}{\sqrt{2}}(|01\rangle \pm |10\rangle). \quad \text{Eq. 17b}$$

We use here the convention that wave functions φ denote entities that obey Bose-Einstein statistics (they are correlated). Wave functions ψ denote entities that obey Fermi-Dirac statistics and are subject to the Pauli Exclusion Principle (they are anti-correlated). The latter cannot occupy the same quantum state, as evident from inspecting Eq. 17b. Maximally entangled states of Eqs. 17a&17b are also sometimes called Bell states by those skilled in the art.

Applying unitary evolution operators to pure and to entangled states, including the maximally entangled Bell states, is at the foundation of quantum computing. In fact, quantum logic gates are implementations of exactly such operators. Therefore, the ability to translate an algorithm into a form that can be "programmed" in quantum logic is of great interest. Considerable resources have been allocated to quantum computing. The algorithm of Peter Shor for prime number factoring is one of the promising applications for such quantum logic gates when finally developed. To date the largest prime number that has been factored by adiabatic quantum computation (AQC) is 143.

Still, despite the excitement and massive resources allocated to the development of quantum computers, many challenges and open questions remain. These include the number of quantum gates that can be made to cooperate reliably in the given physical instantiation, generation of entangled states, the overall physical system and conditions under which the gates are implemented, types of gates (e.g., Hadamard gate, Pauli gates, Phase shift gates, Toffoli gate etc.), quantum error correction codes and their practical efficacy as well as many others. Early ideas in this subject can be found in Feynman, Richard P., "Simulating Physics with Computers", International Journal of Theoretical Physics 21 (6-7), pp. 467-488, 1982. Subsequent development is found in textbooks such as Nielsen, Michael A. and Chuang, Isaac L., "Quantum Computation and Quantum Information", Cambridge University Press, 2000. Finally, current literature should be consulted for the progress being made in this exciting subject.

6. Prior Art Applications of Quantum Theory to Subject States

Since the advent of quantum mechanics, many have realized that some of its non-classical features may better reflect the state of affairs at the human grade of existence. In particular, the fact that state vectors inherently encode incompatible measurement outcomes and the probabilistic nature of measurement do seem quite intuitive upon contemplation. Thus, many of the fathers of quantum mechanics did speculate on the meaning and applicability of quantum mechanics to human existence. Of course, the fact that rampant quantum decoherence above microscopic levels tends to destroy any underlying traces of coherent quantum states was never helpful. Based on the conclusion of the prior section, one can immediately surmise that such extension of quantum mechanical models in a rigorous manner during the early days of quantum mechanics could not even be legitimately contemplated.

Nevertheless, among the more notable early attempts at applying quantum techniques to characterize human states are those of C. G. Jung and Wolfgang Pauli. Although they did not meet with success, their bold move to export quantum formalisms to large scale realms without too much concern for justifying such procedures paved the way others. More recently, the textbook by physicist David Bohm, "Quantum Theory", Prentice Hall, 1979 ISBN 0-486-65969-0, pp. 169-172 also indicates a motivation for exporting quantum mechanical concepts to applications on human subjects. More specifically, Bohm speculates about employing aspects of the quantum description to characterize human thoughts and feelings.

In a review article published online by J. Summers, "Thought and the Uncertainty Principle", http://www.jasonsummers.org/thought-and-the-uncertainty-principle/, 2013 the author suggests that a number of close analogies between quantum processes and our inner experience and through processes could be more than mere coincidence. The author shows that this suggestion is in line with certain thoughts on the subject expressed by Niels Bohr, one of the fathers of quantum mechanics. Bohr's suggestion involves the idea that certain key points controlling the mechanism in the brain are so sensitive and delicately balanced that they must be described in an essentially quantum-mechanical way. Still, Summers recognizes that the absence of any experimental data on these issues prevents the establishment of any formal mapping between quantum mechanics and human subject states.

The early attempts at lifting quantum mechanics from their micro-scale realm to describe human states cast new light on the already known problem with standard classical logic, typically expressed by Bayesian models. In particular, it had long been known that Bayesian models are not sufficient or even incompatible with properties observed in human decision-making. The mathematical nature of these properties, which are quite different from Bayesian probabilities, were later investigated in quantum information science by Vedral, V., "Introduction to quantum information science", New York: Oxford University Press 2006.

Taking the early attempts and more recent related motivations into account, it is perhaps not surprising that an increasing number of authors argue that the basic framework of quantum theory can be somehow extrapolated from the micro-domain to find useful applications in the cognitive domain. Some of the most notable contributions are found in: Aerts, D., Czachor, M., & D'Hooghe, B. (2005), "Do we think and communicate in quantum ways? On the presence of quantum structures in language", In N. Gontier, J. P. V. Bendegem, & D. Aerts (Eds.), Evolutionary epistemology, language and culture. Studies in language, companion series. Amsterdam: John Benjamins Publishing Company; Atmanspacher, H., Roemer, H., & Walach, H. (2002), "Weak quantum theory: Complementarity and entanglement in physics and beyond", Foundations of Physics, 32, pp. 379-406; Blutner, R. (2009), "Concepts and bounded rationality: An application of Niestegge's approach to conditional quantum probabilities", In Accardi, L. et al. (Eds.), Foundations of probability and physics-5, American institute of physics conference proceedings, New York (pp. 302-310); Busemeyer, J. R., Wang, Z., & Townsend, J. T. (2006), "Quantum dynamics of human decision-making", Journal of Mathematical Psychology, 50, pp. 220-241; Franco, R. (2007), "Quantum mechanics and rational ignorance", Arxiv preprint physics/0702163; Khrennikov, A. Y., "Quantum-like formalism for cognitive measurements", BioSystems, 2003, Vol. 70, pp. 211-233; Pothos, E. M., & Busemeyer, J. R. (2009), "A quantum probability explanation for violations of 'rational' decision theory", Proceedings of the Royal Society B: Biological Sciences, 276. Recently, Gabora, L., Rosch, E., & Aerts, D. (2008), "Toward an ecological theory of concepts", Ecological Psychology, 20, pp. 84-116 have even demonstrated how this framework can account for the creative, context-sensitive manner in which concepts are used, and they have discussed empirical data supporting their view.

An exciting direction for the application of quantum theory to the modeling of inner states of subjects was provided by the paper of R. Blutner and E. Hochnadel, "Two qubits for C. G. Jung's theory of personality", Cognitive Systems Research, Elsevier, Vol. 11, 2010, pp. 243-259. The authors propose a formalization of C. G. Jung's theory of personality using a four-dimensional Hilbert space for representation of two qubits. This approach makes a certain assumption about the relationship of the first qubit assigned to psychological functions (Thinking, Feeling, Sensing and iNtuiting) and the second qubit representing the two perspectives (Introversion and Extroversion). The mapping of the psychological functions and perspectives presumes certain relationships between incompatible observables as well as the state of entanglement between the qubits that does not appear to be borne out in practice, as admitted by the authors. Despite this insufficiency, the paper is of great value and marks an important contribution to techniques for mapping problems regarding the behaviors and states of human subjects to qubits using standard tools and models afforded by quantum mechanics.

Thus, attempts at applying quantum mechanics to phenomena involving subjects at macro-levels have been mostly unsuccessful. A main and admitted source of problems lies in the translation of quantum mechanical models to human situations. More precisely, it is not at all clear how and under what conditions to map subject states as well as subject actions or reactions to quantum states. It is not even apparent in what realms the mappings may be valid.

Finally, the prior art does not provide for a quantum informed approach to gathering data. Instead, the state of the art for development of predictive personality models based on "big data" collected on the web is ostensibly limited to classical data collection and classification approaches. Some of the most representative descriptions of these are provided by: D. Markvikj et al., "Mining Facebook Data for Predictive Personality Modeling", Association for the Advancement of Artificial Intelligence, www.aaai.org, 2013; G. Chittaranjan et al., "Who's Who with Big-Five: Analyzing and Classifying Personality Traits with Smartphones", Idiap Research Institute, 2011, pp. 1-8; B. Verhoeven et al., "Ensemble Methods for Personality Recognition", CLiPS, University of Antwerp, Association for the Advancement of Artificial Intelligence, Technical Report WS-13-01, www.aaai.org, 2013; M. Komisin et al., "Identifying Personality Types Using Document Classification Methods", Dept. of Computer Science, Proceedings of the Twenty-Fifth International Florida Artificial Intelligence Research Society Conference, 2012, pp. 232-237.

OBJECTS AND ADVANTAGES

In view of the shortcomings of the prior art, it is an object of the present invention to provide computer implemented methods and computer systems for perturbing the contextualization chosen by a group of subjects considered in a quantum representation through addition of another subject.

These and other objects and advantages of the invention will become apparent upon reading the detailed specification and reviewing the accompanying drawing figures.

SUMMARY OF THE INVENTION

The present invention relates to computer implemented methods and computer systems that are designed to perturb a contextualization adopted by a group of subjects in contextualizing an underlying proposition. The methods and systems extend to tracking or detecting the perturbation to the contextualization that the subjects in the group experience. The present methods and computer system rely on collecting initial and subsequent measurable indications from the subjects that are members of the group. Any subject confronted by underlying propositions is free to contextualize them, i.e., apprehend, perceive, understand or value them in different and personal ways. The kind of subjects we are interested in here, are ones that adopt a known contextualization and exhibit a certain initial measurable indication in that contextualization of the underlying proposition, which is typically about some item. The item at the core of the underling proposition is usually selected from the group consisting of a subject, an object and an experience, as well as any combination of one or more such items.

In general, the confrontation of the subject by an underlying proposition and the subject's choice about what value to use in making sense of the underlying proposition will be referred to herein as a contextualization of the underlying proposition by that subject. Many different contextualizations of the same underlying proposition are available to a subject. Some of the available contextualizations are incompatible. These are represented by non-commuting quantum mechanical operators. Some other available contextualizations are compatible. These, on the other hand, are represented by commuting quantum mechanical operators.

The computer implemented method for perturbing a contextualization adopted by a group of subjects modulo the underlying proposition involves selecting the group with the aid of a mapping module. There should be at least one subject in the group thus chosen. All subjects in the group should exhibit the known contextualization when confronted by the underlying proposition in question. Further, the at least one subject in the group should exhibit a known measurable indication in the known contextualization. The requisite prior knowledge about the subjects to ensure they are members of the group can be obtained from historical data, for example.

The method calls for assigning a subject value matrix $PR_V$ that is used by the group in the known contextualization of the underlying proposition. The subject value matrix $PR_V$ is assigned by an assignment module and it is a quantum mechanical operator in accordance with the quantum representation. Consequently, the known measurable indication corresponds to an eigenvalue of the subject value matrix $PR_V$, as required by the quantum representation.

The method further calls for injecting into the group, e.g., by direct introduction via a network, a social network or even in real life (e.g., at an event) of a disruptive subject. In the interpretation adopted herein, the subject qualifies as disruptive because they exhibit an anti-consensus statistic modulo the underlying proposition. In other words, in the quantum representation, the subject that is injected into the group exhibits a Fermi-Dirac (F-D) anti-consensus statistic modulo the underlying proposition in question.

According to the method, a collecting step is performed by a network monitoring unit that has access to information about all subjects, i.e., the at least one subject in the group and the disruptive subject. Specifically, the network monitoring unit collects from the group the known measurable indication as well as the at least one subsequent measurable indication. The subsequent measurable indication or indications are collected after injecting the disruptive subject and upon re-confronting the subject(s) of the group with the underlying proposition.

A statistics module is used for detecting a perturbation to the known contextualization of the underlying proposition as originally exhibited by the group. To accomplish this, the statistics module compares the known measurable indication originally obtained prior to injection of the disruptive subject with the at least one subsequent measurable indication. Preferably, the statistics module proceeds further and estimates a change in the quantum representation of the group due to the perturbation created by the disruptive subject that exhibits the F-D anti-consensus statistic. Often, in the process of estimating the change in the quantum representation it is desirable to present the group with at least one additional proposition. When doing so, it is particularly advantageous to select any given additional proposition to be incompatible with the underlying proposition in the quantum sense. In other words, the additional proposition should induce in the group a secondary subject value matrix $PR_{SV}$ that does not commute with the subject value matrix $PR_V$ adopted in the known contextualization.

Typically, the quantum representation of the subjects in the group made by the assignment module will involve a density matrix. In the case of reasonably pure states a state vector representation can be deployed.

In the preferred embodiment of the invention, the subject exhibiting the F-D anti-consensus statistic modulo the underlying proposition is introduced or exposed to the group within a network. Alternatively, the subject exhibiting the F-D anti-consensus statistic modulo the underlying proposition is introduced or exposed to the group is real life, i.e., at an event held at a predetermined venue and time.

A computer system according to the invention is designed for detecting the perturbation to the known contextualization of the underlying proposition. The proposition is typically about a given item that includes one or more subjects, objects and/or experiences. The system uses a mapping module to select the group of subjects that practice or exhibit the known contextualization and yield the known measurable indication in the known contextualization. The computer system is equipped with an assignment module for assigning the subject value matrix $PR_V$ that is used by the group in that known contextualization. The known measurable indication that the subjects in the group manifest modulo the underlying proposition corresponds to an eigenvalue of the subject value matrix $PR_V$.

The computer system further includes a subject that is ascertained to exhibit an anti-consensus statistic, also referred to as a F-D anti-consensus statistic, modulo the underlying proposition. Such subject is also referred to herein as the disruptive subject. In some embodiments of the invention, the disruptive subject can be selected by the computer system using any appropriate selection mechanism and/or any one or more of its modules.

The computer system has a network monitoring unit for collecting the known measurable indication as well as at least one subsequent measurable indication from the at least one subject that is in the group. The one or more subsequent measurable indications are collected after the group has been exposed to the disruptive subject. In certain embodiments the computer system has suitable resources, e.g., visualization component(s) and/or venue scheduling coordination functions, for injecting the disruptive subject into the group. Whatever the injection mechanism used by the computer system, it has to perform its task in a manner that ensures that the group accepts the disruptive subject as part of the group. The reason for this is that the perturbation we are interested in herein results when the group actually recognizes or becomes convinced that the disruptive subject is one of its members.

Furthermore, the computer system includes a statistics module for ascertaining or detecting the perturbation to the known contextualization of the underlying proposition by the group. For this purpose, statistics module compares the known measurable indication from before disruptive subject injection to the at least one subsequent measurable indication obtained after disruptive subject injection. In advantageous embodiments of the invention the disruptive subject is one selected from a group of leaders recognized by the group of subjects selected by the mapping module. A leader, in the sense of the present invention, is to be understood broadly as a subject that is noticeable to the group such that their injection affects the group. For example, the disruptive subject is a leader in a known endeavor and may include a sports figure, a celebrity, a media personage, an opinion leader, a thought leader, a market leader, a political leader or a spiritual leader.

In a preferred embodiment, the computer system is implemented in a network. Suitable networks include the Internet, the World Wide Web, a Wide Area Network (WAN) and a Local Area Network (LAN) as well as any other private or public networks capable of affording suitable communications channels between subjects. In the most preferred embodiment the group of subjects is further predefined with the aid of one or more social groups. In the simplest case, the mapping module uses as one of its selection criteria the membership or affiliation with a particular social group. Suitable social groups include Facebook, LinkedIn, Google+, MySpace, Instagram, Tumblr, YouTube and any other social group or socializing platform that aids in explicitly or implicitly segmenting its members. For example, the social group can manifest by an affiliation with one or more product sites on the network. These could be Amazon.com, Walmart.com, bestbuy.com, Groupon.com, Netflix.com, iTunes, Pandora, Spotify or any analogous product site.

The present invention, including the preferred embodiment, will now be described in detail in the below detailed description with reference to the attached drawing figures.

BRIEF DESCRIPTION OF THE DRAWING FIGURES

DETAILED DESCRIPTION

Figure 1A:
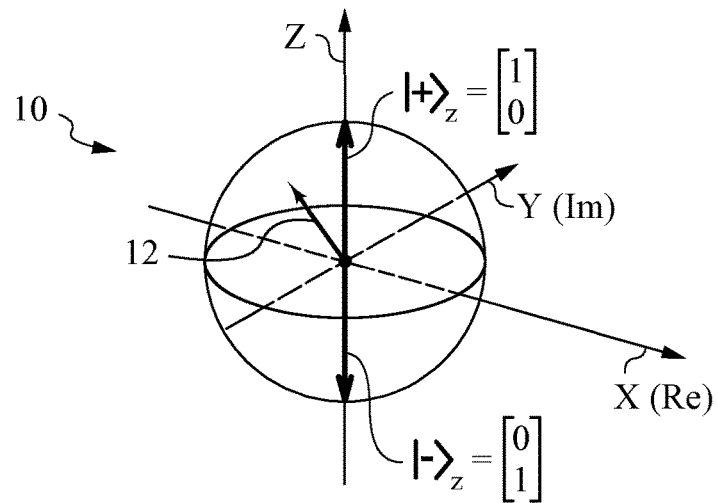
FIG. 1A (Prior Art) is a diagram illustrating the basic aspects of a quantum bit or qubit.

The drawing figures and the following description relate to preferred embodiments of the present invention by way of illustration only. It should be noted that from the following discussion many alternative embodiments of the methods and systems disclosed herein will be readily recognized as viable options. These may be employed without straying from the principles of the claimed invention. Likewise, the figures depict embodiments of the present invention for purposes of illustration only.

Prior to describing the embodiments of the apparatus or computer systems and methods of the present invention it is important to articulate what this invention is not attempting to imply or teach. This invention does not take any ideological positions on the nature of the human mind or the mind of any subject that may qualify as a sentient subject or being, thus falling within the meaning of the term subject, test subject or observer as used in the present invention. This invention also does not try to answer any philosophical questions related to epistemology or ontology. The instant invention does not attempt, nor does it presume to be able to follow up on the suggestions of Niels Bohr and actually find which particular processes or mechanisms in the brain of a subject need or should be modeled with the tools of quantum mechanics. This work is also not a formalization of the theory of personality based on a correspondent quantum representation. Such formalization may someday follow, but would require a full formal motivation of the transition from Bayesian probability models to quantum mechanical ones. Formal arguments would also require a justification of the mapping between non-classical portions of subject/human emotional and thought spaces/processes and their quantum representation. The latter would include a description of the correspondent Hilbert space, including a proper basis, support, rules for unitary evolution, formal commutation and anti-commutation relations between observables as well as explanation of which aspects are subject to entanglement with each other and the environment (decoherence).

Instead, the present invention takes a highly data-driven approach to tracking selected subjects, which may herein be sometimes referred to as test subjects. The quantum states will be assigned to these subjects modulo or with respect to underlying propositions using pragmatic state vector assignments. In some implementations, the state vectors can be represented by quantum bits or qubits. In more robust approaches, the quantum representation may deploy density matrices instead of state vectors. Such transition in description will be clearly justified to those skilled in the art when the state of the subject is not reasonably pure.

The availability of "big data" that documents online life, and in particular online as well as real-life responses of subjects to various propositions including simple "yes/no" type questions, has made extremely large amounts of subject data ubiquitous. The test subjects can thus be isolated out of the large numbers of potentially available subjects based on measured data. Quantum mechanical tests require large numbers of identically or at least similarly prepared states to examine in order to ascertain any quantum effects. For the first time, these practical developments in "big data" and the capture of massive numbers of measurements permit one to apply the tools of quantum mechanics to uncover such quantum aspects of test subject behaviors or measureable indications as they manifest when confronted by underlying propositions, i.e., as a result of contextualizations. Specifically, it is finally feasible to set up a quantum mechanical model of test subject states and check for signs of quantum mechanical relationships and quantum mechanical statistics in the context of certain propositions that the test subjects perceive.

Thus, rather than postulating any a priori relationships between different states, e.g., the Jungian categories, we only assume that self-reported or otherwise obtained/derived data about test subjects and their contextualizations of underlying propositions of interest is reasonably accurate. In particular, we rely on the data to be sufficiently accurate to permit the assignment of state vectors or qubits to the test subjects. We also assume that the states suffer relatively limited perturbation and that they do not evolve quickly enough over time-frames of measurement(s) (long decoherence time) to affect the model. Additional qualifications as to the regimes or realms of validity of the model will be presented below as required.

No a priori relationships between different state vectors or qubits representing test subjects and their contextualizations of propositions is presumed. Thus, the assignment of state vectors or qubits in the present invention is performed in the most agnostic manner possible. This is done prior to testing for any complicated relationships. Preferably, the subject state assignments with respect to the underlying proposition are first tested empirically based on historical data available for the subjects. In this manner the correct set of test subjects can be isolated. Curation of relevant metrics is performed to aid in the process of discovering quantum mechanical relationships in the data. The curation step preferably includes a final review by human experts or expert curators that may have direct experience of relevant state(s) as well as well as experience(s) when confronted by the underlying propositions under investigation. Specifically, the human curator should have a "personal understanding" of the various ways in which the underlying proposition may be contextualized by the different test subjects that are being selected in accordance with the invention.

Figure 2:
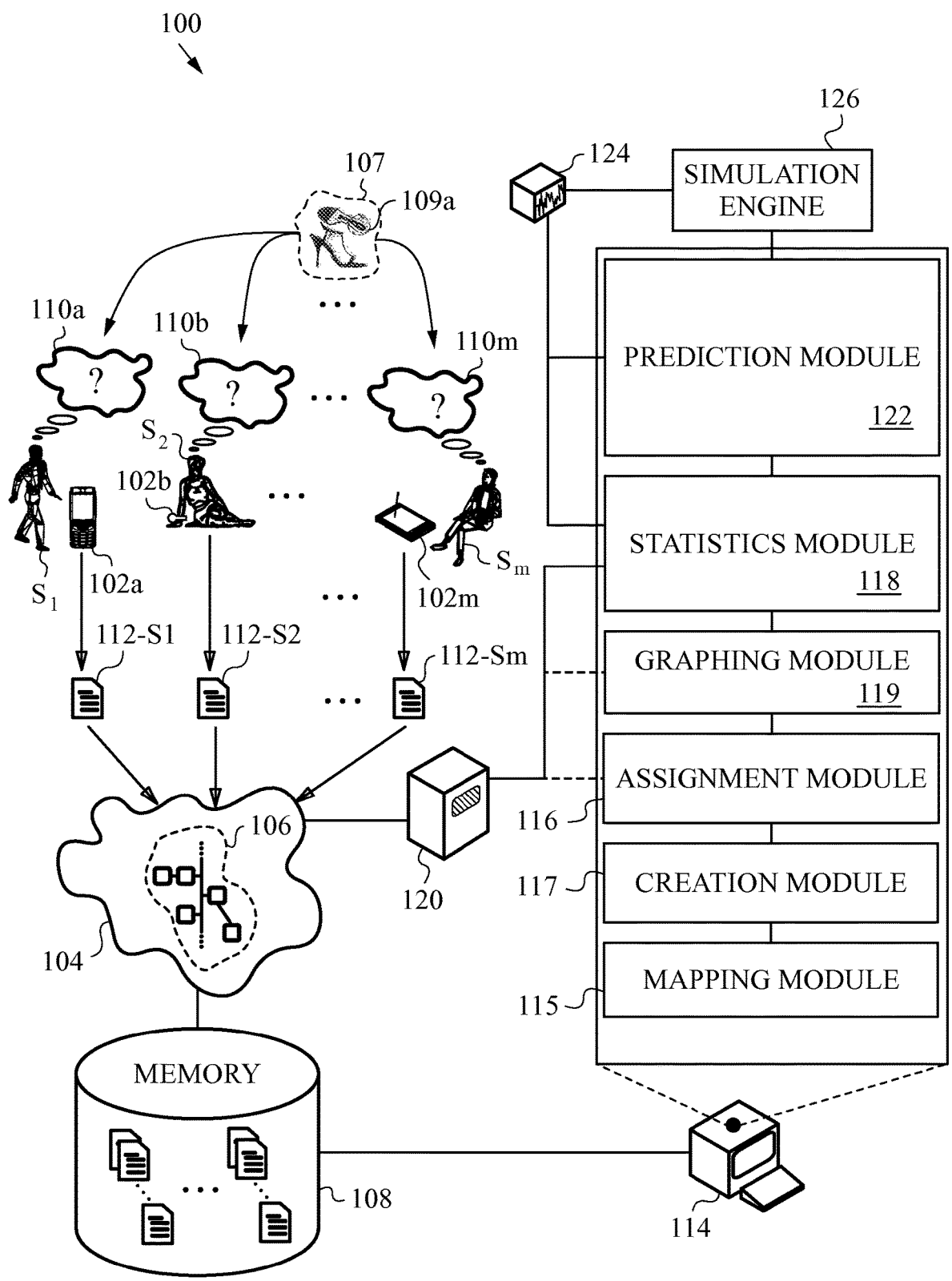
FIG. 2 is a diagram illustrating the most important parts and modules of a computer system according to the invention in a basic configuration.

Before describing the act of perturbing a subject's contextualization and detecting the effects of such perturbation it is important to review the foundations of a quantum representation on which the idea of tracking subject behaviors or, more generally, their measurable indications is based. To accomplish this we will first review a general apparatus. The main parts and modules of such an apparatus are embodied in a computer system 100 designed for tracking the behaviors of subjects is illustrated in FIG. 2. Computer system 100 is designed around a number of subjects $S_1, S_2, \ldots, S_m$. For convenience, subjects $S_1, S_2, \ldots, S_m$ will be enumerated with the aid of index i thus referring to subjects $S_i$, where i=1, 2, ..., m and m is the total number of subjects.

All subjects $S_i$ in the present embodiment are human beings. They may be selected here from a much larger group of many subjects that are not expressly shown. In the subsequent description some of these additional subjects that were not chosen will be introduced separately. In principle, subjects $S_i$ can embody any sentient beings other than humans, e.g., animals. However, the efficacy in applying the methods of invention will usually be highest when dealing with human subjects.

Subject $S_1$ has a networked device 102a, here embodied by a smartphone, to enable him or her to communicate data about them in a way that can be captured and processed. In this embodiment, smartphone 102a is connected to a network 104 that is highly efficient at capturing, classifying, sorting, and storing data as well as making it highly available. Thus, although subject $S_1$ could be known from their actions observed and reported in regular life, in the present case subject $S_1$ is known from their online presence and communications as documented on network 104.

Similarly, subject $S_2$ has a networked device 102b, embodied by a smart watch. Smart watch 102b enables subject $S_2$ to share personal data just like subject $S_1$. For this reason, watch 102b is also connected to network 104 to capture the data generated by subject $S_2$. Other subjects are similarly provisioned, with the last or m-th subject $S_m$ shown here deploying a tablet computer with a stylus as his networked device 102m. Tablet computer 102m is also connected to network 104 that captures data from subjects. The average practitioner will realize that any networked device can share some aspect of the subject's personal data. In fact, devices on the internet of things, including simple networked sensors that are carried, worn or otherwise coupled to some aspect of the subject's personal data (e.g., movement, state of health, or other physical or emotional parameter that is measurable by the networked sensor) are contemplated to belong to networked devices in the sense of the present invention.

Network 104 can be the Internet, the World Wide Web or any other wide area network (WAN) or local area network (LAN) that is private or public. Furthermore, some or all subjects $S_i$ may be members of a social group 106 that is hosted on network 104. Social group or social network 106 can include any online community such as Facebook, LinkedIn, Google+, MySpace, Instagram, Tumblr, YouTube or any number of other groups or networks in which subjects $S_i$ are active or passive participants. Additionally, documented online presence of subjects $S_i$ includes relationships with product sites such as Amazon.com, Walmart.com, bestbuy.com as well as affinity groups such as Groupon.com and even with shopping sites specialized by media type and purchasing behavior, such as Netflix.com, iTunes, Pandora and Spotify. Relationships from network 106 that is erected around an explicit social graph or friend/follower model are preferred due to the richness of relationship data that augments documented online presence of subjects $S_i$.

Computer system 100 has a memory 108 for storing measurable indications a, b that correspond to state vectors or just simply states $|S_i\rangle$ in internal spaces 110a, 110b, ..., 110m of subjects $S_i$ defined modulo an underlying proposition 107. In accordance with the present invention, measurable indications a, b are preferably chosen to be mutually exclusive indications. Mutually exclusive indications are actions, responses or still other indications that subjects $S_i$ cannot manifest simultaneously. For example, measurable indications a, b are mutually exclusive when they correspond to "YES"/"NO" type responses, choices, actions or any other measurable indications of which subjects $S_i$ can manifest just one at a time with respect to underlying proposition 107. Subjects $S_i$ also preferably report, either directly or indirectly (in indirect terms contained in their on-line communications) their measurable indications via their networked devices 102a, 102b, ..., 102m.

It should be duly noted that it is not a limitation of the quantum representation adopted herein to require that measurable indications come in pairs, such as measurable indications a, b in the present example. Measurable indications can span many values, as any person skilled in the art will recognize. It is also not a limitation that the values of such pairs exhibit discrete precipitation type; they may instead cover a continuous range. The reader is referred to the teachings contained in U.S. patent application Ser. No. 14/324,127 to review why the choice of measurable indications that precipitate as pairs of discrete values, and in particular as mutually exclusive pairs is advantageous.

In the first example, underlying proposition 107 is associated with an item that is instantiated by a specific object 109a. It is noted that specific object 109a is selected here in order to ground the rather intricate quantum-mechanical explanation to follow in a very concrete setting for purposes of better understanding and more practical teaching of the invention. Thus, underlying proposition 107 revolves around object 109a being a pair of shoes that subjects $S_i$ have been exposed to on their home log-in pages to network 104. For example, the log-in page could have been Yahoo News and shoes 109a were presented next to typical items such as Khardashians or Snookies.

The nature of any underlying proposition in the sense of the invention is that it is "about something". It is that "something that it's about" that leads to the contextualizations of the underlying proposition by subjects $S_i$ according to their frames of mind, apprehensions, conceptions, context rule(s) or, most generally put, their values. The "something that it's about" is generally one or more items that are either physical or non-physical. In the present example the item is instantiated by an object, namely shoes 109a. However, items can be any commonly perceived objects or even commonly perceived subjects or experiences.

For example, a legitimate item can be one of subjects $S_i$ from the point of view of any other subject. Still another permissible type or category of items includes non-physical or experiential goods such as commonly perceived experiences. The experience of watching a movie, flying a kite, meeting a subject, driving a car and so on are therefore legitimate items. It is important, however, that qualifying items be commonly perceived by subjects $S_i$.

By commonly perceived we specifically do not mean that they are contextualized according to the same value by all subjects $S_i$. Instead, commonly as used herein means that at least in principle all subjects $S_i$ are capable of apprehending the underlying proposition about the item in question. For example, if the item is the experiential good of driving a car, then it is a commonly perceived item for virtually all subjects $S_i$ that live in developed countries. On the other hand, if the experiential good is a religious conversion to a specific deity then, most likely, only subjects $S_i$ that belong to that religious group commonly perceive that item. It is on this common perceptual basis that inclusion of just any subjects in general for the purpose of tracking is usually not productive. For this reason, it is advantageous to carefully select or vet subjects $S_i$ that are known to commonly perceive the item(s) that are used in formulating the underlying proposition(s) before commencing any tracking, testing and/or simulating activities.

The term contextualization will be used herein to denote a process. It is the process that commences with a subject being exposed to or confronted with an underlying proposition. The subject is free to apprehend, perceive, understand, evaluate and/or value in any of the number of personal ways that the subject can select. This confrontation of any subject including the subjects we are interested in by the underlying proposition as well as that subject's choice about how or in accordance with what value to make sense of the underlying proposition will be referred to herein as a contextualization of the underlying proposition by that subject.

Typically, many different contextualizations of the same underlying proposition are available to any one of subjects $S_i$. Some of the available contextualizations are incompatible. These will later be represented by non-commuting quantum mechanical operators introduced by the quantum representation according to the invention. Some other available contextualizations are compatible. These, on the other hand, will later be represented by commuting quantum mechanical operators. Note that in some cases we may refer to the propositions as being incompatible. The reason for this ambiguity in the use of language is that quantum mechanics is rather difficult to translate directly into human language without any ambiguities. In fact, the Uncertainty Principle that we are invoking is the very definition of ambiguity of frame choice or "how to understand" or "how to take" a given proposition. Nevertheless, when referring to incompatible contextualizations, apprehensions, frames of mind, propositions, and more generally values, which is our preferred term whenever possible, we do mean that the quantum mechanical operators associated with these will be non-commuting rather than commuting. By the term non-commuting we mean that the commutator between these quantum mechanical operators is non-zero.

One of the main aspects of the present invention relates to enabling computer system 100 to track the behaviors of subjects $S_i$ that are generated in response to contextualizations. We are interested in behaviors generated irrespective of the type of contextualizations actually experienced by subjects. More precisely still, system 100 is designed to track measurable indications a, b that include any type of behavior, action, response or any other indication that can be measured or reported within the framework set up by computer system 100. From the point of view of the quantum representation, measurable indications are measurements. Measurements are the real-valued results that manifest or emerge as fact in response to quantum measurement. The nature of measurable indications generated as a result of contextualizations of underlying proposition 107 by subjects $S_i$ will be discussed in much more detail below.

In the present embodiment, measurable indications a, b are captured in data files 112-S1, 112-S2, . . . , 112-Sm that are generated by subjects $S_1, S_2, \ldots, S_m$. Conveniently, following socially acceptable standards, data files 112-S1, 112-S2, . . . , 112-Sm are shared by subjects $S_i$ with network 104 by transmission via their respective networked devices 102a, 102b, . . . , 102m. Network 104 either delivers data files 112-S1, 112-S2, . . . , 112-Sm to any authorized network requestor or channels it to memory 108 for archiving and/or later use. Memory 108 can be a mass storage device for archiving all activities on network 104, or a dedicated device of smaller capacity for tracking just the activities of some subjects of which subjects $S_i$ are a subset.

It should be pointed out that in principle any method or manner of obtaining the chosen measurable indications, i.e., either a or b, from subjects $S_i$ is acceptable. Thus, the measurable indications can be produced in response to direct questions posed to subjects $S_i$, a "push" of prompting message(s), or externally unprovoked self-reports that are conscious or even unconscious (e.g., when deploying a personal sensor as the networked device that reports on some body parameter such as, for example, heartbeat). Preferably, however, the measurable indications are delivered in data files 112-S1, 112-S2, . . . , 112-Sm generated by subjects $S_i$. This mode enables efficient collection, classification, sorting as well as reliable storage and retrieval from memory 108 of computer system 100. The advantage of the modern connected world is that large quantities of self-reported measurable indications of states $|S_i\rangle$ in internal spaces 110a, 110b, . . . , 110m are generated by subjects $S_i$ and shared, frequently even in real time, with network 104. This represents a massive improvement in terms of data collection time, data freshness and, of course, sheer quantity of reported data.

Subjects $S_i$ can either be aware or not aware of their respective measurable indications. For example, data files 112-S1, 112-S2, . . . , 112-Sm of subjects $S_i$ reporting of their responses, actions or other indications can be shared among subjects $S_i$ such that everyone is informed. This may happen upon request, e.g., because subjects $S_i$ are fiends in social network 106 and may have elected to be appraised of their friends' responses, actions and other indications such as parameters of their well-being (e.g., those measured by personal sensors mentioned above), or it may be unsolicited. The nature of the communications broadcasting the choices can be one-to-one, one-to-many or many-to-many.

In principle, any mode of communication between subjects $S_i$ is permissible including blind, one-directional transmission. For this reason, in the present situation any given subject can be referred to as the transmitting subject and another subject can be referred to as the receiving subject to more clearly indicate the direction of communication in any particular case. Note that broadcasts of responses, actions or other measurable indications from the subjects need not be carried via network 104 at all. They may occur via any medium, e.g., during a physical encounter between transmitting and receiving subjects or by the mere act of one subject observing the chosen response, action or other measurable indication of another subject. Indeed, as mentioned above, the method of the invention can be practiced in situations where no inter-subject communications take place at all and all subjects $S_i$ merely report their measurable indications via network 104.

When inter-subject communications takes place, the exposure of receiving subjects to broadcasts of transmitting subjects carrying any type of information about the transmitter's choice of measurable indication vis-à-vis underlying proposition 107 may take place online or offline (e.g., in real life). Preferably, however, all broadcasts are carried via network 104 or even within social network 106, if all transmitting and receiving subjects $S_i$ are members of network 106.

Computer system 100 is equipped with a separate computer or processor 114 for making a number of crucial assignments based on measurable indications a, b contained in data files 112-S1, 112-S2, . . . , 112-Sm of subjects $S_i$. For this reason, computer 114 is either connected to network 104 directly, or, preferably, it is connected to memory 108 from where it can retrieve data files 112-S1, 112-S2, . . . , 112-Sm at its own convenience. It is noted that the quantum representation underlying the present invention will perform best when large amounts of data are available. Therefore, it is preferred that computer 114 leave the task of storing and organizing data files 112-S1, 112-S2, . . . , 112-Sm as well as any relevant data files from other subjects to the resources of network 104 and memory 108, rather than deploying its own resources for this job.

Computer 114 has a mapping module 115 for finding an internal space or a values space that is shared by subjects $S_i$. Module 115 can be embodied by a simple non-quantum unit that compares records from network 104 and/or social network 106 to ascertain that subjects $S_i$ are friends or otherwise in some relationship to one another. Based on this relationship and/or just propositions over which subjects $S_i$ have interacted in the past, mapping module 115 can find the shared or common internal space that will henceforth be referred to herein as community values space. It is important that mapping module 115 confirm that the community values space is shared modulo underlying proposition 107 in particular.

The community values space corresponds to a regime or realm of shared excitements, interests, proclivities, beliefs, likes, dislikes and/or opinions over various items represented, among other, by objects, subjects or experiences (e.g., activities). For the sake of a simple example, all subjects $S_i$ that are candidates for the subset which can be considered as a group or community can be interested in shoes, sports, coffee, car racing, movies, dating and making money. In most practical applications, however, it will be sufficient to confirm that subjects $S_i$ are aware of the same items. This means that they perceive these items in the group or community values space common to the subset/group/community of subjects $S_i$. Of course, that certainly does not mean that all subjects $S_i$ will or are even likely to contextualize the underlying propositions about the items of which they are all aware in the same way. The meaning of this last statement will be explained in much more detail below.

Computer 114 is equipped with a creation module 117 that is connected to mapping module 115. Creation module 117 is designed for positing the selected subjects $S_i$ that belong to a group or community by virtue of sharing a community values space modulo proposition 107. The action of positing is connected with the quantum mechanical action associated with the application of creation operators. Also, annihilation operators are used for un-positing or removing subjects $S_i$ from consideration.

The creation and annihilation aspects of the operation of creation module 117 are required for formal positing of the state vectors (and in more robust representations of the density matrices) corresponding to quantized entities. These steps depend on whether the entity obeys the Fermi-Dirac anti-consensus statistics (F-D statistics) or the Bose-Einstein consensus statistics (B-E statistics) as well as several other considerations due to the quantum mechanical representa-tion. All of these aspects have been previously described in detail in U.S. patent application Ser. No. 14/324,127. They will be reviewed here to the extent required to contextualize the present invention.

Further, computer 114 has an assignment module 116 that is connected to creation module 117. Assignment module 116 is designed for the task of making certain assignments based on the quantum representations adopted by the instant invention. More precisely, assignment module is tasked with assigning to each one of the selected subjects $S_i$ discovered by mapping module 115 and posited by creation module 117 a subject state $|S_i\rangle$. All assigned subject states $|S_i\rangle$ reside in a group or community state space $\mathcal{H}^{(C)}$, which is the Hilbert space associated with the community values space.

Assignment module 116 is indicated as residing in computer 114, but in many embodiments it can be located in a separate processing unit altogether. This is mainly due to the nature of the assignments being made and the processing required. More precisely, assignments related to quantum mechanical representations are very computationally intensive for central processing units (CPUs) of regular computers. In many cases, units with graphic processing units (GPUs) are more suitable for implementing the linear algebra instructions associated with assignments dictated by the quantum model that assignment module 116 has to effectuate.

Computer system 100 has a graphing module 119 connected to assignment module 116. Computer 114 deploys graphing module 119 for placing subject states $|S_i\rangle$, as assigned by assignment module 116, on a graph or any construct that encodes the interconnections that exist between subjects $S_i$. In cases where the interconnections are tenuous, uncertain or even unknown, graphing module 119 may place subject states $|S_i\rangle$ in a disconnected context (i.e., on nodes/vertices without any connecting edges). Lack of interconnections indicates no inter-subject communications.

In cases where interconnections are known, e.g., from a social graph that interconnects subjects $S_i$, graphing module 119 places subject states $|S_i\rangle$ of subject states $S_i$ at the corresponded nodes or vertices of the social graph. In general, however, the mapping as understood herein reaches beyond the concept of one subject per vertex in a social graph setting—in this larger context the mapping is understood to be a surjective mapping. In other words, the mapping is onto the graph but not typically one-to-one. Graphs as defined herein include any type of structures that include interconnections, e.g., links or edges, between entities that may be related to one or more vertices, nodes or points. For example, the graph may be a social graph, a tree graph, a general interconnected diagram or chart (also see graph theory and category theory). In some embodiments described herein the chosen graph corresponds to a physical system, such as a lattice or other less-organized structures such as spin-glass. Various aspects of the graphing or mapping process including adjustments and simplifications (e.g., pruning) have been previously discussed in U.S. patent application Ser. No. 14/324,127. Therefore, only the aspects of graphing most relevant to the present invention and the below examples will be discussed herein.

Computer 114 also has a statistics module 118 connected to graphing module 119. Statistics module 118 is designed for estimating various fundamental quantum parameters of the graph model that lead to classical probabilities and/or large-scale phenomena and behaviors. In some embodiments statistics module 118 also estimates or computes classical probabilities. Most importantly, however, statistics module 118 estimates a degree of incompatibility between the values according to which subjects $S_i$ contextualize underlying propositions of interest in the social values space or rather in its quantum equivalent—community state space $\mathcal{H}^{(C)}$.

Computer 114 is further provisioned with a prediction module 122 that is in turn connected to statistics module 118. The quantum interactions between the various quantum states $|S_i\rangle$ imported onto the graph by graphing module 119 are used by prediction module 122 for predicting subject states $|S_i\rangle$ about underlying proposition 107. Prediction module 122 is connected to statistics module 118 in order to receive the estimated probabilities and value information. Of course, it also receives as input the data generated and prepared by the previous modules, including data about the graph generated by graphing module 119 based on still prior inputs from assignment module 116, creation module 117 and mapping module 115.

Prediction module 122 can reside in computer 114, as shown in this embodiment or it can be a separate unit. For reasons analogous to those affecting assignment module 116, prediction module 122 can benefit from being implemented in a GPU with associated hardware well known to those skilled in the art.

Computer system 100 has a network monitoring unit 120. Unit 120 monitors and tracks at the very least the network behaviors and communications of subjects $S_i$ in the identified group or community. Network monitoring unit 120 preferably monitors entire network 104 including members of specific social groups 106. When specific subjects $S_i$ are selected for tracking and for any subsequent model, simulation and/or prediction, they thus fall into a subset of all subjects tracked by monitoring unit 120. To be effective, unit 120 is preferably equipped with wire-rate data interception capabilities for rapid ingestion and processing. This enables unit 120 to capture and process data from data files 112 of large numbers of subjects connected to network 104 and discern large-scale patterns in nearly real-time.

Statistics module 118 is connected to network monitoring unit 120 to obtain from it behavior information for maintaining up-to-date its classical event probabilities as well as quantum parameters, especially including subject contextualizations. It is duly noted, that computer 104 can gather relevant information about the subjects on its own from archived data files 112 in memory 108. This approach is not preferred, however, due to concerns about data freshness and the additional computational burden placed on computer 104.

Computer system 100 has a random event mechanism 124 connected to both statistics module 118 and prediction module 122. From those modules, random event mechanism can be seeded with certain estimated quantum parameters as well as other statistical information, including classical probabilities to randomly generate events on the graph in accordance with those probabilities and statistical information. Advantageously, random event mechanism 124 is further connected to a simulation engine 126 to supply it with input data. In the present embodiment simulation engine 126 is also connected to prediction module 122 to be properly initialized in advance of any simulation runs. The output of simulation engine 126 can be delivered to other useful apparatus where it can serve as input to secondary applications such as large-scale tracking, modeling, simulation and/or prediction mechanisms for social or commercial purposes or to market analysis tools and online sales engines. Furthermore, simulation engine 126 is also connected to network monitoring unit 120 in this embodiment in order to aid unit 120 in its task of discerning patterns affecting subjects $S_i$ (as well as other subjects, as may be required) based on data passing through network 104.

Figure 3A:
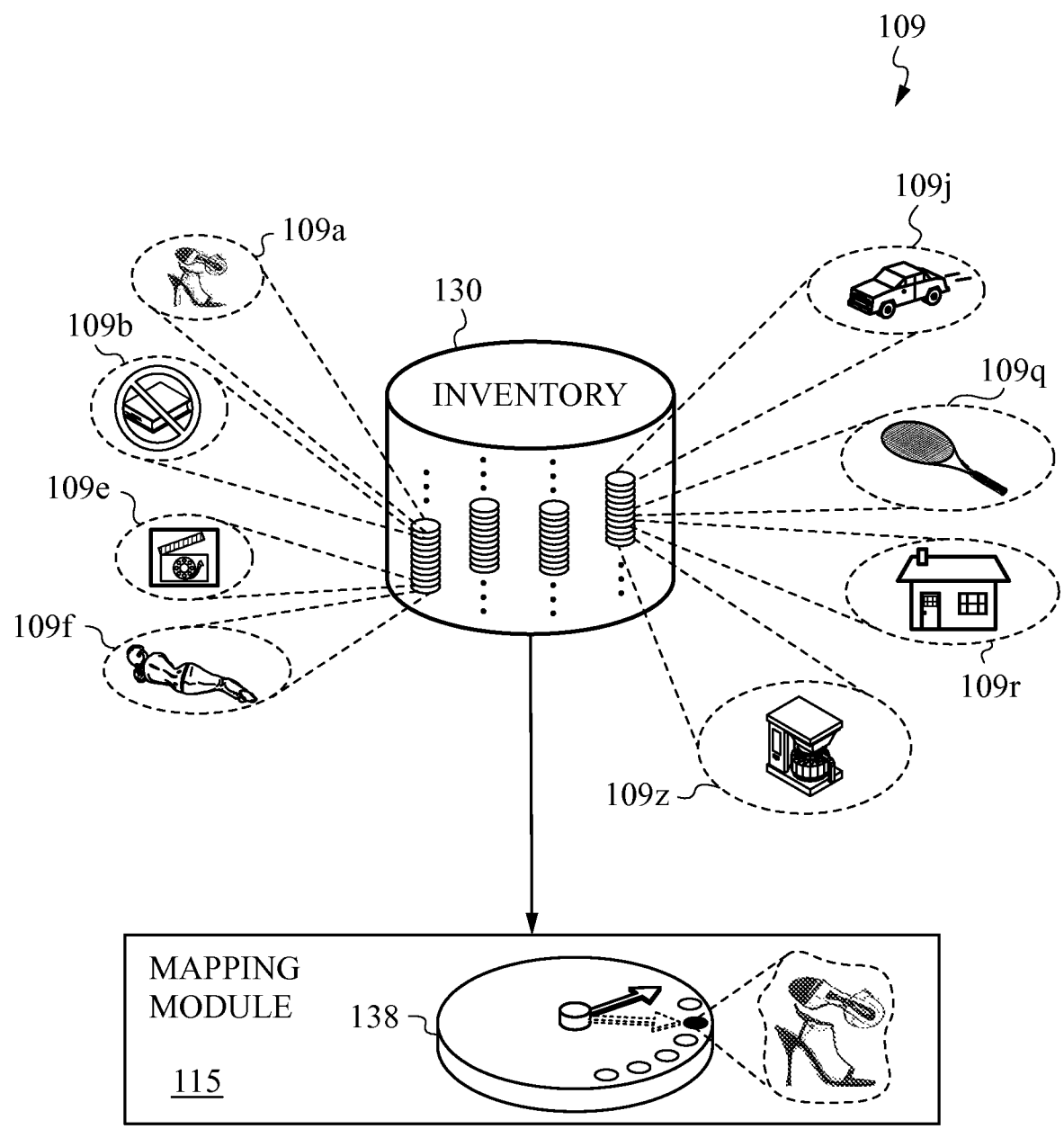
FIG. 3A is a diagram showing in more detail the mapping module of the computer system from FIG. 2 and the inventory store of relevant items.

We will now examine the operation of computer system 100 in incremental steps guided by the functions performed by the modules introduced in FIG. 2 and any requisite secondary resources. Our starting point is mapping module 115 in conjunction with an inventory store 130 to which it is connected as shown in FIG. 3A. Computer system 100 is designed to work with many underlying propositions 107 about different items 109. In other words, item 109a that is an object instantiated by the pair of shoes depicted in FIG. 2 is merely one exemplary object that is used for the purpose of a more clear and practical explanation of the present invention.

Meanwhile, inventory store 130 contains a large number of eligible items. As understood herein, items 109 include objects, subjects, experiences (aka experiential goods) and any other items that subjects $S_i$ can contextualize in their minds to yield underlying proposition 107. Preferably, a human curator familiar with human experience and specifically with the lives and cognitive expectations of subjects under consideration should review the final inventory of items 109. The curator should not include among items 109 any that do not register any response, i.e., those generating a null response among the subjects. Responses obtained in a context that is not of interest may be considered as mis-contextualized and the item that provokes them should be left out if their consideration is outside the scope of tracking. All null responses and mis-contextualizations should preferably be confirmed by prior encounters with the potentially irrelevant item by subjects $S_i$. The curator may be able to further understand the reasons for irrelevance and mis-contextualization to thus rule out the specific item from inventory store 130.

For example, a specific item 109b embodied by a book about ordinary and partial differential equations is shown as being deselected in FIG. 3A. The elimination of book 109b is affirmed by the human curator, who understands the human reasons for the book's lack of appeal. In the case at hand, all subjects reporting on network 104 are members of a group that does not consider the language of mathematics relevant to their lives. Thus, most of the time that book 109b is encountered by the subjects it evokes a null response as they are unlikely to register its existence. The possible exception is in the case of unanticipated contextualization, e.g., as a "heavy object" for purposes of "weighing something down". If the prediction does not want to take into account such mis-contextualization then book 109b should be left out. If, on the other hand, contextualization of textbooks as heavy objects were of interest in tracking, then book 109b should be kept in inventory store 130.

It is also possible to supplement or, under some circumstances even replace the vetting of items 109 by a human curator with a cross-check deploying network monitoring unit 120. That is because monitoring unit 120 is in charge of reviewing all data files 112 to track and monitor communications and behaviors of all subjects on network 104. Hence, it possesses the necessary information to at the very least supplement human insights about reactions to items 109 and their most common contextualizations. For example, despite the intuition of the human curator book 109b could have provoked a reaction and anticipated contextualization, e.g., as a study resource, by at least a few subjects. Such findings would be discovered by network monitoring unit 120 in reviewing data files 112. These findings should override the human curator's judgment in a purely data-driven approach to tracking. Such pragmatism is indeed recommended in the preferred embodiments of the present invention to ensure discovery of quantum effects and derivation of correspondent practical benefits from these findings.

After vetting by the human curator and corroboration by network monitoring unit 120, inventory store 130 will contain all items of interest to the subjects and presenting to them in contextualizations that are within the scope of tracking. For example, items 109*a*, 109*q*, 109*r* and 109*z* from store 130 all fall into the category of objects embodied here by shoes, a tennis racket, a house and a coffee maker. A subject 109*f* embodied by a possible romantic interest to one or more subjects $S_i$ to be confronted by proposition 107 is also shown. Further, store 130 contains many experiential goods of which two are shown. These are experiences 109*e*, 109*j* embodied by watching a movie and taking a ride in a sports car, respectively. Numerous other objects, subjects and experiences are kept within store 130 for building different types of underlying propositions 107.

In order to follow the next steps with reference to a concrete example to help ground the explanation, we consider shoes 109*a* that were chosen by mapping module 115 from among all vetted items 109 in inventory store 130. To make the choice module 115 has a selection mechanism 138. Mechanism 138 is any suitable apparatus for performing the selection among items 109 in store 130. It is noted that selection mechanism 138 can either be fully computer-implemented for picking items 109 in accordance with a computerized schedule or it can include an input mechanism that responds to human input. In other words, mechanism 138 can support automatic or human-initiated selection of items 109 for tracking of contextualizations under the quantum representation of the present invention.

Figure 3B:
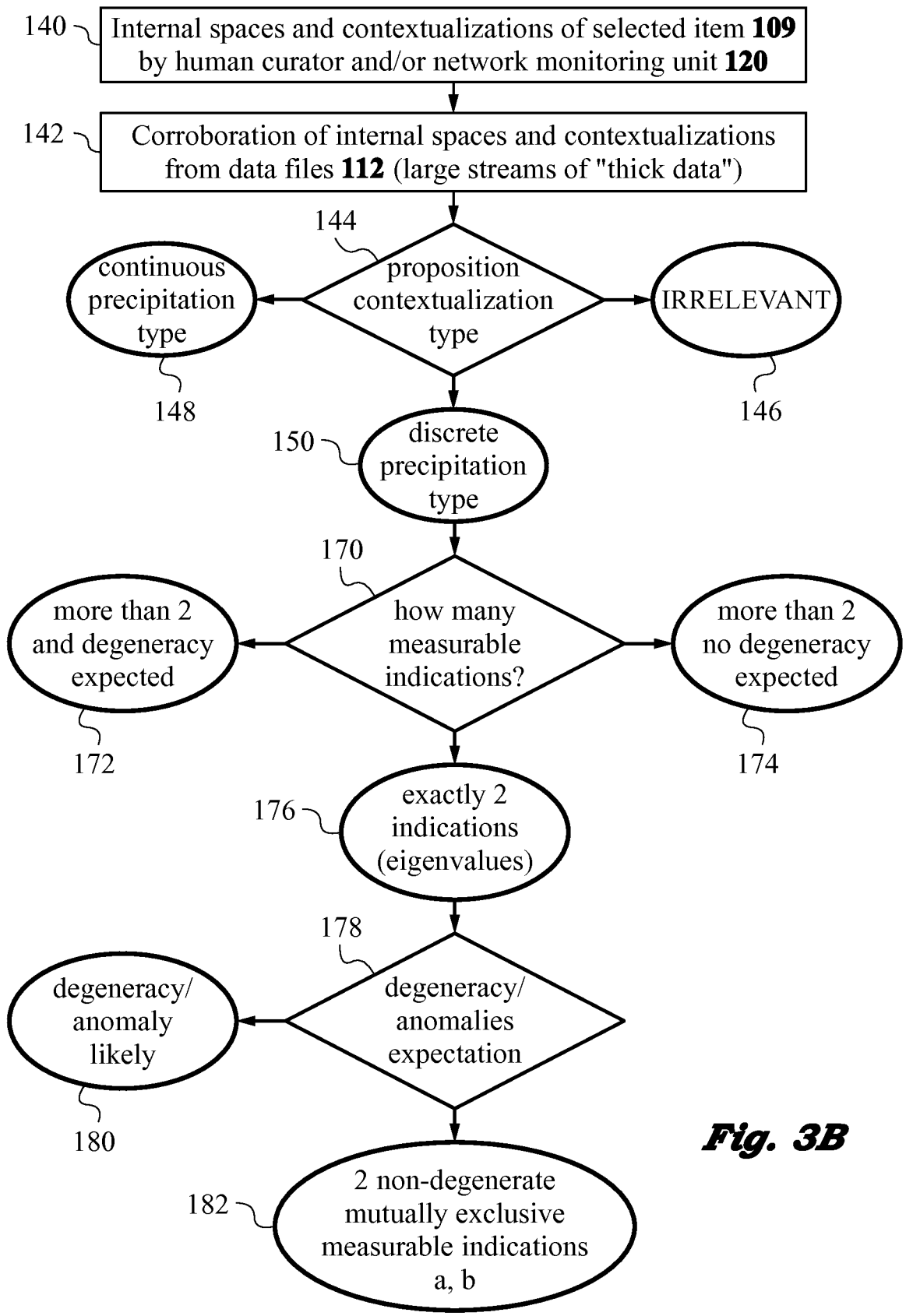
FIG. 3B is a flow diagram of several initial steps performed by the mapping module to generate a quantum representation.

FIG. 3B illustrates the steps performed by mapping module 115 in further examining the internal spaces 110*a*, 110*b*, . . . , 110*m* of subjects $S_i$ and their contextualizations. More precisely, mapping module 115 takes the first formal steps to treating these concepts in accordance with a quantum representation as adopted herein. Any specific quantum representation will apply in the community values space postulated to exist between subjects $S_i$. It should be remarked here that all steps performed to arrive at a quantum representation of subjects $S_i$ in their contextualizations of the underlying propositions about the item also apply to obtaining a quantum representation of any additional or separate subject(s). Such subject(s) may or may not share the same community values space but may nonetheless be of interest.

In a first step 140, mapping module 115 selects item 109 and presumes that item 109 registers in the community values space. The observed contextualizations of item 109 as found by network monitoring unit 120 and/or the human curator are also imported by mapping module 115. Obtaining a large amount of data at this pre-tracking or calibration stage is very advantageous.

In a second step 142, mapping module 115 corroborates the existence of the overall internal space, namely community values space and of the contextualizations by cross-checking data files 112. In performing step 142, mapping module 115 typically accesses memory 108 and archived data files 112. This allows mapping module 115 to look over "thick data", i.e., data files 112 that present a historically large stream of information that relates to item 109. In this manner the relevance of item 109 and hence its registration specifically in internal spaces 110*a*, 110*b*, . . . , 110*m* belonging to the select subjects $S_i$ forming the presumptive community or group can be further ascertained and more carefully quantified. For example, a number of occurrences of a response, a reference to or an action involving item 109 over time is counted. At this point, if item 109 has an ephemeral existence in the minds of the subjects then mapping module 115 could provide that information to the human user. Should prediction of fads not be of interest for the prediction or simulation, then the human user of computer system 100 could stop the process and induce the choice of a different item 109.

Assuming that item 109 remains of interest, then mapping module 115 proceeds to step three 144. Step 144 is important from the point of view of the quantum representation as it relates to the type of contextualization of underlying proposition 107 about item 109 by subjects $S_i$. We consider two precipitation types and a null result or "IRRELEVANT" designated by 146. Of course, the careful reader will have noticed that items 109 that induce a null response encoded here by "IRRELEVANT" 146 were previously eliminated. However, since step 144 determines the precipitation for each subject concerned, and some of the subjects may not register item 109 despite the fact that a large number of their peers do, it is necessary to retain the option of null outcome 146 in step 144.

The first precipitation type being considered herein is a continuous precipitation type 148. The second type is a discrete precipitation type 150. Although continuous precipitation type 148 certainly admits of a quantum representation and has been discussed in more detail in U.S. patent application Ser. No. 14/324,127 we will focus on discrete precipitation type 150 in the present discussion. That is because despite the fact that continuous precipitation type 148 can be used in apparatus and methods of the invention, it is more difficult to model it with graphs and the mathematical formalism is more involved. Furthermore, such continuous precipitation type 148 does not typically yield clearly discernible, mutually exclusive responses by subjects in their contextualizations (e.g., modulo underlying proposition 107 about shoes 109*a* in the present example). In other words, in the case of shoes 109*a* as an example, continuous precipitation type 148 in the contextualization of say "LIKE" could yield a wide spread in the degree of liking of shoes 109*a* for a multitude of reasons and considerations. Of course, a skilled artisan will be able to adopt the present teachings to continuous cases using standard tools known in the art.

In preferred embodiments of the invention we seek simple precipitation types corresponding to simple contextualizations of underlying proposition 107. In other words, we seek to confirm the community or group of subjects $S_i$ in whose minds or internal spaces 110*a*, 110*b*, . . . , 110*m* proposition 107 about shoes 109*a* induces discrete precipitation type 150. This precipitation type should apply individually to each subject making up such a group or community. Of course, subjects embedded in their normal lives cannot be tested for precipitation type entirely outside the context they inhabit. Some error may thus be present in the assessment of precipitation type for each subject. To the extent possible, such error can be kept low by reviewing previous precipitation types the subject under review exhibited with respect to similar propositions and ideally similar propositions about the same item. Further, a review of precipitation type by the human curator is advantageous to corroborate precipitation type.

It is further preferred that the contextualization be just in terms of a few mutually exclusive states and correspondent mutually exclusive responses or, more generally measurable indications that the subject can exhibit. Most preferably, the contextualization of underlying proposition 107 corresponds to discrete precipitation type 150 that manifests only two orthogonal internal states and associated mutually exclusive responses such as "YES" and "NO". In fact, for most of the present application we will be concerned with exactly such cases for reasons of clarity of explanation. Once again, review by the human curator is highly desirable in estimating the number of internal states.

Additionally, discrete precipitation type 150 into just two orthogonal states associated with two distinct eigenvalues corresponds to the physical example of spinors that we have already explored in the background section. Many mathematical and applied physics tools have been developed over the past decades to handle these entities. Thus, although more complex precipitation types and numerous orthogonal states can certainly be handled by the tools available to those skilled in the art (see, e.g., references on working in the energy or Hamiltonian eigen-basis of general systems), cases where subjects' internal states are mapped to two-level quantum systems are by far the most efficient. Also, two-level systems tend to keep the computational burden on computer system 100 within a reasonable range and do not require excessively large amounts of data files 112 to set up in practice. Two-level systems will also tend to keep the computational burden low even when the more robust descriptions of subject states in terms of correspondent density matrices have to be implemented.

For the above reasons we now continue with the case of discrete precipitation type 150 modulo proposition 107 about shoes 109a admitting of only discrete and orthogonal eigenstates. In other words, internal states $|S_i\rangle$ residing in internal spaces 110a, 110b, . . . , 110m decompose into superpositions of these few discrete and orthogonal eigenstates.

In this most preferred case, discrete precipitation type 150 induces subjects $S_i$ to contextualize underlying proposition 107 about shoes 109a in terms of just two mutually exclusive states manifesting in mutually exclusive responses such as "YES" and "NO". Thus, the manner in which subjects $S_i$ contextualize proposition 107 in this preferred two-level form can be mapped to quantum-mechanically well-understood entities such as simple spinors or qubits. However, before proceeding to the next step performed by mapping module 115 with subjects $S_i$ that do fall into the above preferred discrete precipitation type 150 with two eigenstates and two eigenvalues, it is important to ensure proper quantum behavior of the assigned states $|S_i\rangle$ in common values space replaced at this point by community state space $\mathcal{H}^{(C)}$, as will be appreciated by one skilled in the art.

We now turn our attention to step 170 in which mapping module 115 confirms the number of measurable indications or eigenvalues associated with discrete precipitation type 150 to be two (2), as selected for the most preferred case. We should briefly remark on the other possibilities that we are not discussing in detail. In case 172 more than two eigenvalues are expected and some of them are associated with different state vectors. This is a classic case of a quantum mechanical system with degeneracy. In other words, the system has several linearly independent state vectors that have the same eigenvalues or measurable indications. Those skilled in the art will recognize that this typical situation is encountered often when working in the "energy-basis" dictated by the Hamiltonian.

In case 174 more than two eigenvalues are expected and all of them are associated with different state vectors. Such systems can correspond to more complicated quantum entities including spin systems with more than two possible projections along the axis on which they precipitate (e.g., total spin 1 systems). Quantum mechanical systems that are more than two-level but non-degenerate are normally easier to track than systems with degeneracy. Those skilled in the art will recognize that cases 172 and 174 can be treated with available tools.

In the preferred embodiment of the instant invention, however, we concentrate on case 176 selected in step 170 in which there are only two eigenvalues or two measurable indications. In other words, we prefer to base the apparatus and methods of invention on the two-level system. As mentioned above, it is desirable for the human curator that understands subjects $S_i$ to review these findings to limit possible errors due to misjudgment of whether the precipitation is non-degenerate and really two-level. This is preferably done by reviewing historical data of subject responses, actions and any indications available (e.g., from data files 112 archived in memory 108) that are used by mapping module 115 in making the determinations. We thus arrive at a corroborated selection of subjects $S_i$ that apparently form a community or group and exhibit discrete precipitation with just two eigenvalues and whose states $|S_i\rangle$ in internal spaces 110a, 110b, . . . , 110m can therefore be assigned to two-level wave functions.

A final two-level system review step 178 may optionally be performed by mapping module 115. This step should only be undertaken when subjects $S_i$ can be considered based on all available data and, in the human curator's opinion, as largely independent of their social group and the overall environment. In other words, the level of quantum entanglement of subject states $|S_i\rangle$ with the environment and with each other is low as determined with standard tools. The reader is here referred to U.S. patent application Ser. No. 14/182,281, the references cited therein and further standard references discussing Bell's Inequality, Bell single-channel and multi-channel tests.

In human terms, low levels of entanglement are likely to apply to subjects that are extremely individualistic and formulate their own opinions without apparent influence by others within their community/group or outside of it. When such radically individualistic subjects are found, their further examination is advantageous to bound potential error in assignments of state vectors $|S_i\rangle$ and/or in the case of more rigorous procedures, any errors in the estimation of states $|S_i\rangle$ or more robust expressions formulated with the aid of density matrices.

Preferably, mapping module 115 should divide case 176 into sub-group 180 and sub-group 182. Sub-group 180 is reserved for subjects $S_i$ that despite having passed previous selections exhibit some anomalies or couplings. These are potentially due to inter subject entanglement and/or subject to environment entanglement. Subjects $S_i$ with states $|S_i\rangle$ manifesting substantial levels of entanglement and/or other anomalies that may cause degeneracy or other unforeseen issues should be put in sub-group 180. These subjects should be eliminated from being used in further prediction or simulation if only pure states are used. They may be retained, however, if a suitable density matrix representation is possible, as will be appreciated by those skilled in the art.

Meanwhile, sub-group 182 is reserved for confirmed well-behaved subjects $S_i$ whose states $|S_i\rangle$ reliably manifest in two-level, non-degenerate, measurable indications a and b modulo underlying proposition 107 about the chosen item 109 (or an item very similar to item 109) as confirmed by historical data. These subjects will be assigned two-level state vectors $|S_i\rangle$ by assignment module 116 as explained in more detail below. At this point the reader may again refer to U.S. patent application Ser. No. 14/182,281 that explains qubit-type state vector assignments in situations that center on individual subjects divorced from community effects.

In addition to selecting subjects $S_i$ that can be assigned to two-level states $|S_i\rangle$, mapping module 115 examines the community values space. In other words, module 115 also confirms that all subjects $S_i$ that have been qualified in the prior steps (found to exhibit the desired discrete, non-degenerate, two-level precipitation type with respect to proposition 107 about item 109a) really inhabit a group or community values space that can be represented by a single community state space $\mathcal{H}^{(C)}$. More information about this process, tensor product spaces and the requisite tools is found in U.S. patent application Ser. No. 14/324,127.

For the remaining portion of the present teachings, it will be assumed that all subjects $S_i$ are indeed found to be in sub-group 182 and thus justify assignment of state vectors or states $|S_i\rangle$ in community state space $\mathcal{H}^{(C)}$. Furthermore, it will also be assumed herein that all subjects $S_i$ are within the appropriate range of validity of the quantum representation for the underlying propositions under study and given the items that these propositions are about. This last point is preferably confirmed by mapping module 115 prior to handing off information about subjects $S_i$ to assignment module 116 for state assignment, as discussed below. For a more thorough treatment of issues relating to renormalization and other relevant considerations in the application of the quantum representation the reader is referred to U.S. patent application Ser. No. 14/504,435.

Figure 3C:
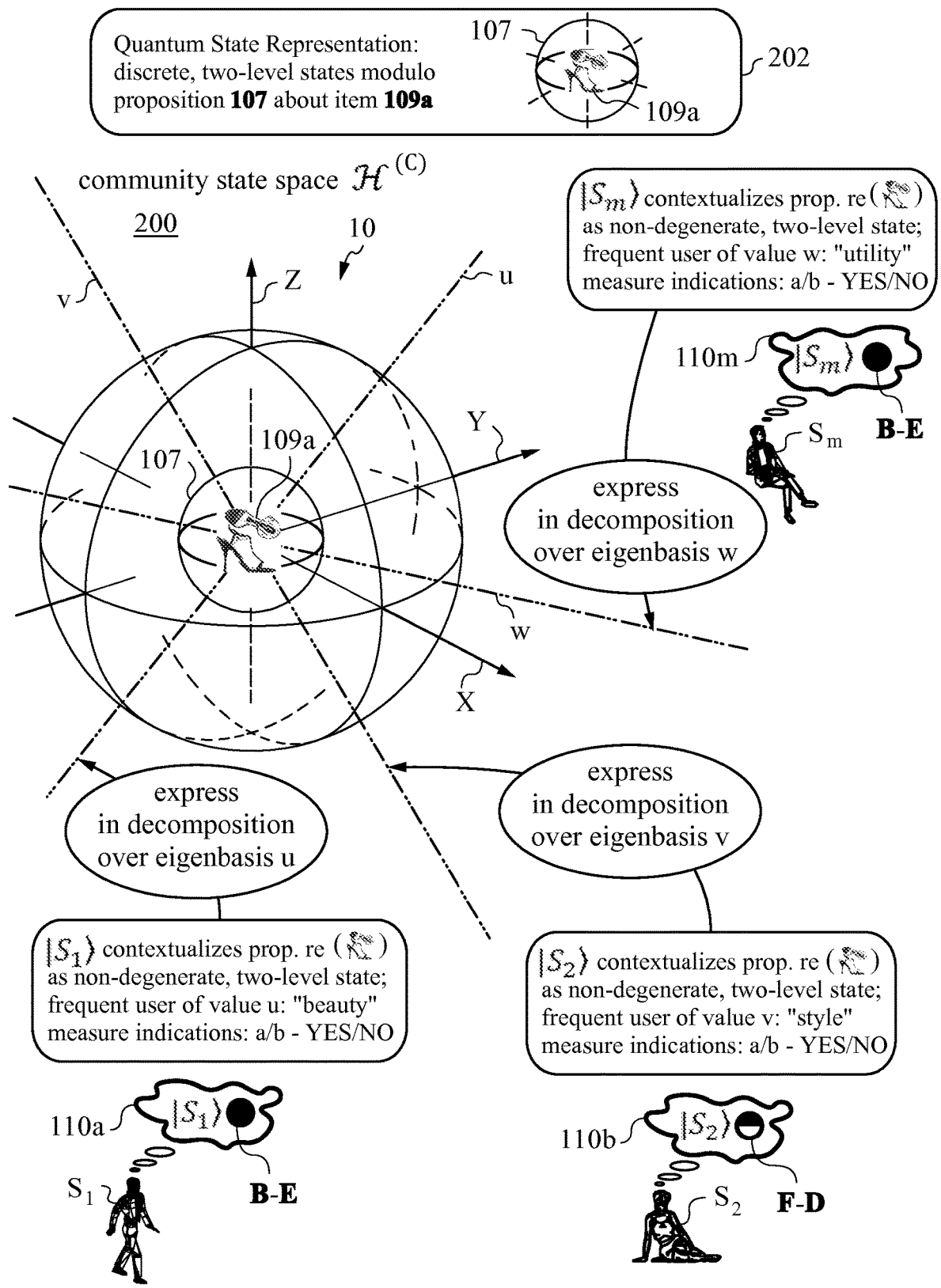
FIG. 3C is a diagram visualizing the operation of the assignment module in formally assigning quantum subject states $|S_i\rangle$ to subjects $S_i$ qualifying for quantum representation.

FIG. 3C is a diagram to help in visualizing the operations performed by creation module 117 and assignment module 116. This drawing figure focuses in particular on three selected test subjects $S_1$, $S_2$ and $S_m$ with their respective internal spaces 110a, 110b, and 110m posited in community values space 200. The last is represented quantum mechanically by community state space $\mathcal{H}^{(C)}$. An overall context 202 for the quantum representation is included at the top of FIG. 3C. Context 202 reminds us that in their quantum mechanical representation states $|S_i\rangle$ of all subjects $S_i$ behave as discrete, two-level systems based on the determinations made by mapping module 115 as described above. Each of those can be conveniently represented with the aid of Bloch sphere 10 as already introduced in the background section.

Creation module 117 formally posits or creates selected subjects $S_i$ that belong to the community by virtue of sharing community values space 200 modulo proposition 107. The action of positing is connected with the quantum mechanical action associated with the application of creation operators. Also, annihilation operators are used for un-positing or removing quantum states $|S_i\rangle$ of subjects $S_i$ from consideration. Just to recall the physics assumptions being used herein when creating and annihilating states, it is important to know what type of state is being created or annihilated. Symmetric wave functions are associated with elementary (gauge) and composite bosons. Bosons have a tendency to occupy the same quantum state under suitable conditions (e.g., low enough temperature and appropriate confinement parameters). The operators used to create and annihilate bosons are specific to them. Meanwhile, fermions do not occupy the same quantum state under any conditions and give rise to the Pauli Exclusion Principle. The operators used to create and annihilate fermions are specific to them as well.

Again, it may be difficult to discern such competitive dynamic modulo proposition 107 about the same pair of shoes 109a or the need for an anti-symmetric joint state from data files 112 and communications found in traffic propagating via network 104 and within social network 106. This is why creation module 117 has to review data files 112 as well as communications of test subjects $S_i$ containing indications exhibited in situations where both were present and were confronted by propositions as similar or close as possible to proposition 107 about shoes 109a. The prevalence of "big data" as well as "thick data" that subjects produce in self-reports is again very helpful. The human curator that understands the lives of test subjects $S_i$ should preferably exercise their intuition in reviewing and approving the proposed F-D anti-consensus statistic or B-E consensus statistic based on data from pairs of subjects $S_i$ modulo proposition 107 about shoes 109a.

Once all subjects $S_i$ have their statistics determined to be either B-E consensus or F-D anti-consensus creation module 117 can properly posit them in community values space 200 as quantum states $|S_i\rangle$. All subject states $|S_i\rangle$ corresponding to subjects $S_i$ exhibiting B-E consensus statistic are created by bosonic creation operator $\hat{a}^\dagger$. All subject states $|C_k\rangle$ corresponding to subjects $S_i$ exhibiting F-D anti-consensus statistic are created by fermionic creation operator $\hat{c}^\dagger$. All subjects states $|S_i\rangle$ irrespective of statistics are posited in shared community values space 200 represented by community state space $\mathcal{H}^{(C)}$.

Assignment module 116 is the one that formally associates the quantum representation to all subjects $S_i$. This is shown explicitly only for the three states $|S_1\rangle$, $|S_2\rangle$, $|S_m\rangle$ corresponding to internal spaces 110a, 110b, 110m of three select subjects $S_1$, $S_2$, $S_m$ in FIG. 3C for reasons of clarity. In the present drawing figure we see subject $S_i$ with internal state 110a already assigned to a two-level quantum state vector or simply state $|S_1\rangle$ with a B-E marking. The marking serves to remind us that subject $S_1$ exhibits B-E consensus statistic with respect to other subjects $S_i$ when contextualizing proposition 107 about shoes 109a. Furthermore, based on historical data in data files 112-S1 stored in memory 108, mapping module 115 has determined that the most likely value applied by subject $S_1$ in contextualization of proposition 107 about item 109, i.e., shoes 109a in the present example, concerns their "beauty". Since the precipitation type of subject state $|S_1\rangle$ is two-level the two possible measurable indications a, b map to a "YES" indication and a "NO" indication.

Given all available information about subject $S_1$, assignment module 116 estimates and expresses state $|S_1\rangle$ in a decomposition in the u-basis which corresponds to value "beauty". Of course, if available assignment module 116 uses the most recent measurement. State "UP" along u is taken as the eigenstate in which subject $S_1$ finds shoes 109a beautiful with the associated eigenvalue or measurable indication being "YES". State "DOWN" along u is taken as the eigenstate in which subject $S_1$ finds shoes 109a not beautiful with the associated eigenvalue or measurable indication being "NO". The measurable indications a, b in this case are two mutually exclusive responses "YES" and "NO".

Meanwhile, subject $S_2$ with internal state 110b is assigned their discrete, two-level estimated state $|S_2\rangle$ with an F-D marking. The latter serves to remind us that subject $S_2$ exhibits F-D anti-consensus statistic with respect to other subjects $S_i$ when contextualizing proposition 107. In this case, mapping module 115 has determined that the most common value applied by subject $S_2$ in contextualizing proposition 107 about shoes 109a (or any sufficiently similar contextualization, as noted above) concerns their "style". Thus, in any measurement the a or "YES" indication indicates that subject $S_2$ judges shoes 109a to be stylish. The corresponding eigenstate is taken "UP" along v. The b or "NO" indication indicates that subject $S_2$ judges shoes 109a to not be stylish. The corresponding eigenstate is taken "DOWN" along v.

State $|S_2\rangle$ estimated for subject $S_2$ by assignment module 116 is posited to also reside in the same Hilbert space as state $|S_1\rangle$ of subject $S_1$, namely in community state space $\mathcal{H}^{(C)}$. Belonging to the same values space 200 can be confirmed in finding evidence from contemporaneous and historical data files 112-S1, 112-S2 of subjects $S_1$ and $S_2$ (see FIG. 2). Mentions or even discussion of items similar as well as specifically item 109a is an indication of contextualizing in shared values space 200.

Subject $S_m$ with internal state 110m is also assigned their discrete, two-level estimated or measured state $|S_m\rangle$ by assignment module 116 with a B-E marking designating consensus statistic with respect to other subjects $S_i$ when contextualizing proposition 107. In the case of subject $S_m$, mapping module 115 determined that the most common value applied by subject $S_m$ in contextualizing proposition 107 about shoes 109a (or any sufficiently similar contextualization, as noted above) concerns their "utility". Thus, in any measurement the a or "YES" indication indicates that subject $S_m$ judges shoes 109a to be useful. The corresponding eigenstate is taken "UP" along w. The b or "NO" indication indicates that subject $S_m$ judges shoes 109a to not be useful. The corresponding eigenstate is taken "DOWN" along w. Thus decomposed in the w-eigenbasis state $|S_m\rangle$ of subject $S_m$ is processed and finally placed in community state space $\mathcal{H}^{(C)}$.

Proceeding in this manner, assignment module 116 assigns community subject states $|S_i\rangle$ that are posited in community state space $\mathcal{H}^{(C)}$ to each one of subjects $S_i$ along with their B-E or F-D consensus statistics. This is done based on the best available and most recent information from data files 112 as well as communications gleaned from network 104. To ensure data freshness, assignment module 116 is preferably connected to network monitoring unit 120. The latter can provide most up-to-date information about subjects $S_i$ to allow assignment module 116 to assign the best possible estimates of states $|S_i\rangle$ based on measurements of similar propositions or even to assign the measured states if recent measurement of the proposition at hand is available for the given subjects. This should always be done as part of pre-calibration at the start of a tracking run or else a prediction or simulation run. A person skilled in the art may consider the actions of assignment module 116 to represent assignment of estimates and may indicate this by an additional notational convenience. In some cases a "hat" or an "over-bar" are used. In order to avoid undue notational rigor we will not use such notation herein and simply caution the practitioner that the assigned state vectors as well as matrix operators we will derive below from the already introduced eigenbases are estimates.

A person skilled in the art will note that, depending on the embodiment, the distribution of functions between modules 115, 117 and 116 and even network monitoring unit 120 can be adjusted. Irrespective of the division of tasks, these modules need to share information to ensure that the most accurate possible quantum representation is achieved.

In general, measurable indications a, b transcend the set of just mutually exclusive responses that can be articulated in data files 112-S1 or otherwise transmitted by a medium carrying any communications generated by subject $S_1$. Such indications can include actions, choices between non-communicable internal responses, as well as any other choices that subject $S_1$ can make internally but is unable to communicate about externally. Because such "internal" choices are difficult to track, unless community subject $S_1$ is under direct observation by another human that understands them, they may not be of practical use in the present invention.

On the other hand, mutually exclusive responses that can be easily articulated by subject $S_1$ are suitable in the context of the present invention. The actual decomposition into the corresponding eigenvectors or eigenstates and eigenvalues that correspond to the measurable indications a, b, as well as the associated complex coefficients, probabilities and other aspects of the well-known quantum formalism will not be discussed herein. These aspects have been previously explained in great detail in U.S. patent application Ser. No. 14/324,127 to which the reader is referred for corresponding information.

It is important to realize that the assignment by assignment module 116 of state $|S_1\rangle$ to first community subject $S_1$ will most often be an estimate. Of course, it is not an estimate in the case of confirmed and very recent measurement. Measurement occurs when subject $S_1$ has just yielded one of the measurable indications, which corresponds to an eigenvalue $\lambda_i$ that associates with an eigenvector in that eigenbasis. At that point, assignment module 116 simply sets state $|S_1\rangle$ equal to that eigenvector. The estimate of state $|S_1\rangle$ is valid for underlying proposition 107 about shoes 109a. The estimate reflects the contextualization by subject $S_1$ at a certain time and will generally change as the state of subject $S_1$ evolves with time. The same is true for the measured state since all states evolve (only eigenvalues observed during quantum measurements represent facts that are immutable records of which a history can be made).

Updates to the estimates and prior measurements of all quantum states are preferably derived from contextualizations that have been actually measured within a time period substantially shorter than or less than a decoherence time. Since no contextualizations are identical, even if only due to temporal evolution of the state, similar contextualizations should be used in estimating states whenever available. In other words, estimates based on propositions about items that are similar to proposition 107 about shoes 109a should be used. This strategy allows assignment module 116 to always have access to an up-to-date estimated or measured state vector.

Quantum states modulo certain propositions may exhibit very slow evolution on human time scales, e.g., on the order of months, years or even decades. States with very long decoherence times are advantageous because they do not require frequent updates after obtaining a good first estimate or preferably even a measurement. For states that evolve more quickly, frequent updates will be required to continuously maintain fresh states. Contextualizations modulo some propositions may evolve so rapidly on human time scales that keeping up-to-date estimates or measurements may be challenging. For example the change in state from "fight" to "flight" modulo an underlying proposition 107 about item 109 instantiated by a wild tiger (or item 109b instantiated by the book covering ordinary and partial differential equations) can evolve on the order of split seconds. Therefore, in considering any particular proposition data and estimated state freshness may be crucial for some tracking activities while barely at all for others. A review of estimates, measurements and their freshness by the human curator is thus recommended before commencing any tracking processes and even more so before attempting any prediction or simulation runs.

Preferably, network monitoring unit 120 curates what we will consider herein to be estimated quantum probabilities $p_a$, $p_b$ for the corresponding measurable indications a, b of all quantum states $|S_i\rangle$. Of course, a human expert curator or other agent informed about the human meaning of the information available in network 104 about subjects $S_i$ should be involved in setting the parameters on unit 120. The expert human curator should also verify the measurement in case the derivation of measurable indications actually generated is elusive or not clear from data files 112-Si. Such review by an expert human curator will ensure proper derivation of estimated quantum probabilities $p_a$, $p_b$. Appropriate human experts may include psychiatrists, psychologists, counselors and social workers with relevant experience.

In some embodiments assignment module 116 may itself be connected to network 104 such that it has access to documented online presence and all data generated by test subjects $S_i$ in real time. Assignment module 116 can then monitor the state and online actions of subjects $S_i$ without having to rely on archived data from memory 108. Of course, when assignment module 116 resides in a typical local device such as computer 114, this may only be practicable for tracking a few very specific subjects or when tracking subjects that are members of a relatively small social group 106 or other small subgroups of subjects with known affiliations.

In the present example, contextualization of proposition 107 about shoes 109a by any one of subjects $S_i$ that exhibits the two-level, non-degenerate precipitation type is taken to exhibit two of the most typical opposite responses, namely "YES" and "NO". In general, however, mutually exclusive measurable indications or responses can also be opposites such as "high" and "low", "left" and "right", "buy" and "sell", "near" and "far", and so on. Proposition 107 may evoke actions or feelings that cannot be manifested simultaneously, such as liking and disliking the same item at the same time, or performing and not performing some physical action, such as buying and not buying an item at the same time. Frequently, situations in which two or more mutually exclusive responses are considered to simultaneously exist lead to nonsensical or paradoxical conclusions. Thus, in a more general sense mutually exclusive responses in the sense of the invention are such that the postulation of their contemporaneous existence would lead to logical inconsistencies and/or disagreements with fact. This does not mean that any one of subjects $S_i$ may not internally experience such conflicts, but it does mean that they cannot act them out in practice (i.e., you can't buy and not buy shoes 109a at the exact same time).

Sometimes, after exposure to proposition 107 any one of subjects $S_i$ reacts in an unanticipated way and no legitimate response can be obtained in the contextualization of proposition 107. The quality of tracking will be affected by such "non-results". Under these circumstances devoting resources to assigning and monitoring of subject state $|S_i\rangle$ and monitoring of their expectation value becomes an unnecessary expenditure. Such non-response can be accounted for by classical null response probability $p_{null}$, and as also indicated in prior teachings (see U.S. patent application Ser. Nos. 14/182,281 and 14/224,041). In some cases, non-results or spurious responses can be due to being outside the range of validity for the quantum representation of the specific subject. This issue is renormalization-related and has been previously addressed in U.S. patent application Ser. No. 14/504,435. In a preferred embodiment, as mentioned above, mapping module 115 confirms the range of validity to eliminate form consideration subjects $S_i$ whose states that may exhibit renormalization-related issues.

In preferred embodiments of computer system 100 and methods of the present invention, it is preferable to remove non-responsive subjects $S_i$ after a certain amount of time corroborated by the human curator. The amount of time should be long in comparison with the decoherence time. Therefore, any subject observed to generate "non-results" for a comparatively long time is removed from community state space $\mathcal{H}^{(C)}$ by action with a corresponding annihilation operator. This is tantamount to removing the subject from tracking. This action is also referred to as annihilation in the field of quantum field theory. It is here executed in analogy to its action in a field theory by the application of fermionic or bosonic annihilation operator $\hat{c}$ or $\hat{a}$ in creation module 117. The type of annihilation operator depends on whether subject state exhibited B-E consensus or F-D anticonsensus statistic during its original creation.

Figure 3D:
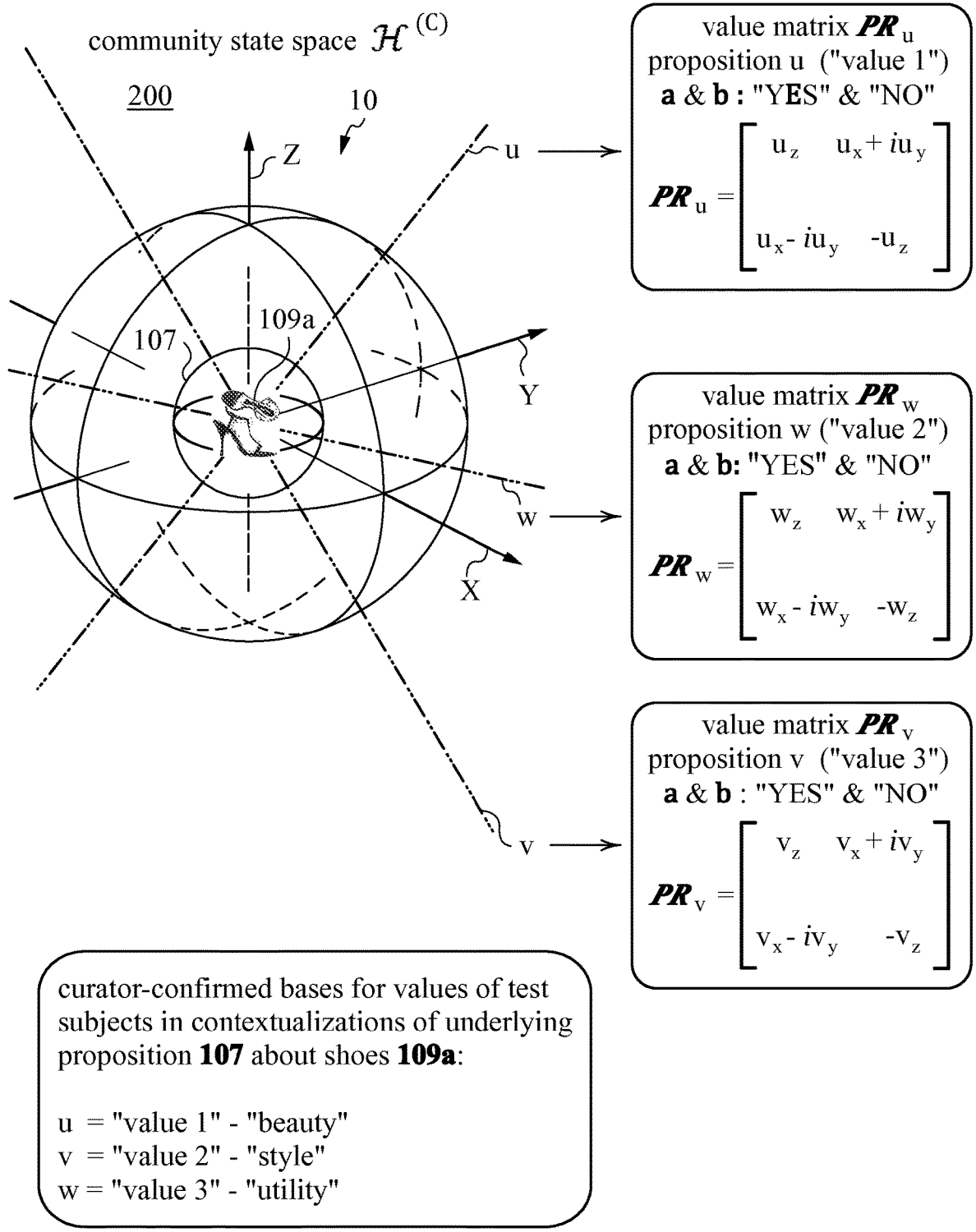
FIG. 3D is a diagram that illustrates the derivation of value matrices PR for three specific subject values used in contextualizations by test subjects of an underlying proposition about a specific item.

FIG. 3D illustrates another important function performed by assignment module 116. This function is to convert into quantum representation subject values (not to be confused with numeric values—here we mean human values or judgment criteria). The values we mean here are those that subjects $S_i$ apply in their contextualizations, apprehensions, frames of mind, judgments and/or assessments. FIG. 3D continues with the same example, namely the one focused on subjects $S_1$, $S_2$ and $S_m$. Instead of reviewing the quantum states, however, assignment module 116 now trains on the eigenvectors that make up the u-, v- and w-eigenbases. These eigenbases are associated with contextualizations of the underlying proposition using the values of "beauty", "style" and "utility", respectively.

Figure 1B:
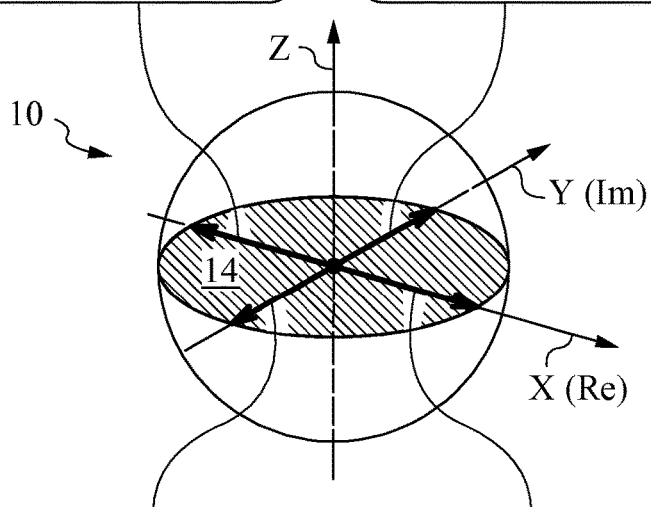
FIG. 1B (Prior Art) is a diagram illustrating the set of orthogonal basis vectors in the complex plane of the qubit shown in FIG. 1A.
Figure 1C:
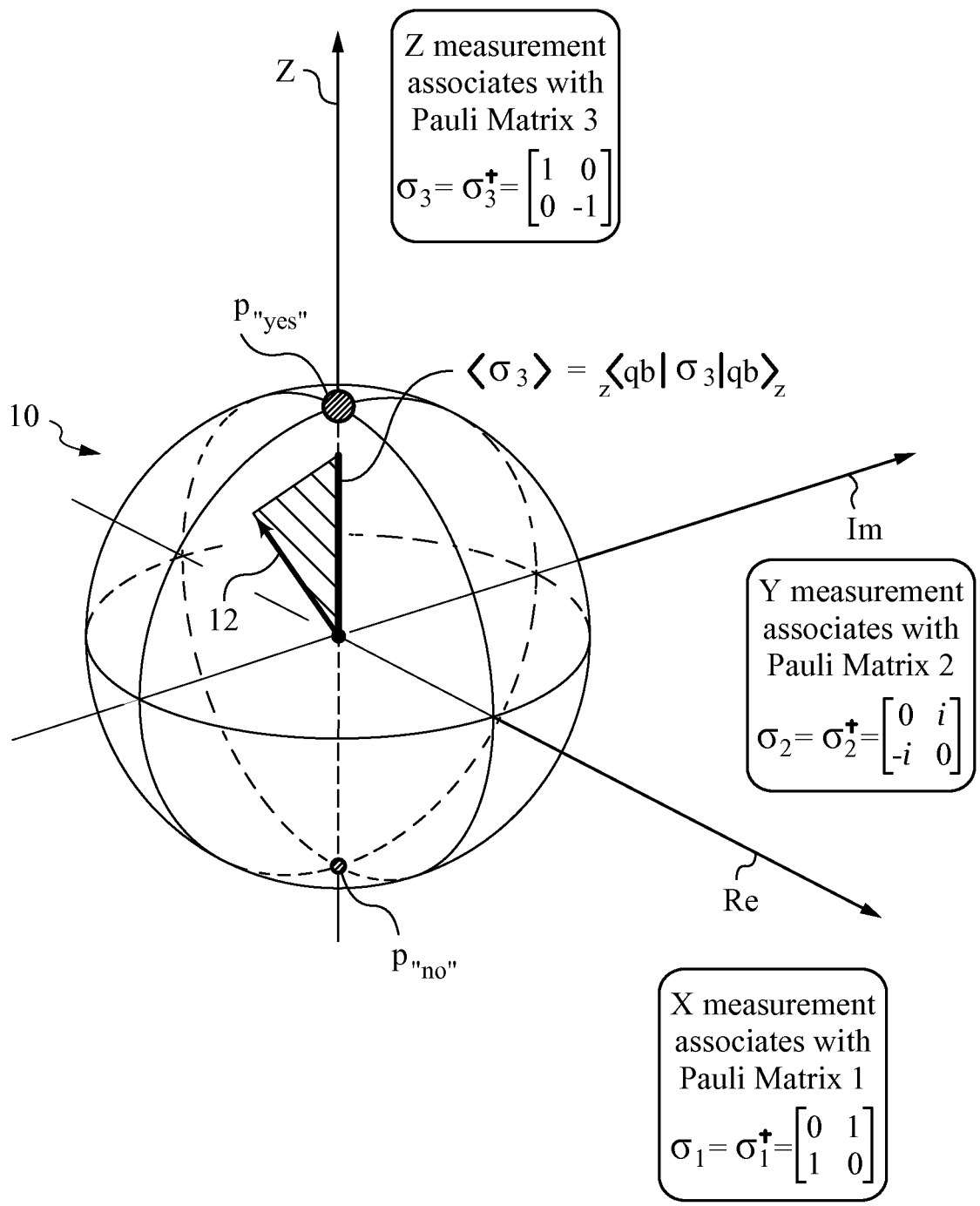
FIG. 1C (Prior Art) is a diagram illustrating the qubit of FIG. 1A in more detail and the three Pauli matrices associated with measurements.
Figure 1D:
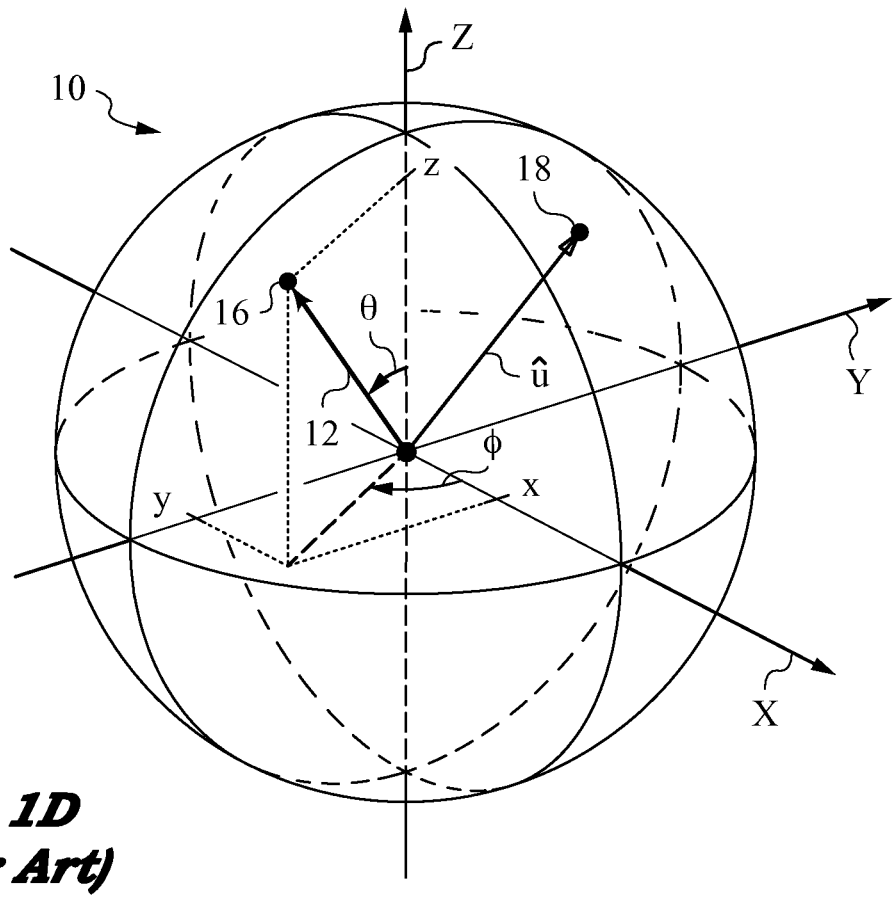
FIG. 1D (Prior Art) is a diagram illustrating the polar representation of the qubit of FIG. 1A.

As we know from standard quantum mechanics, since states $|S_i\rangle$ are two-level they can be spectrally decomposed in bases with two eigenvectors. The spectral decompositions of states $|S_1\rangle$, $|S_2\rangle$, $|S_m\rangle$ belonging to subjects $S_1$, $S_2$ and $S_m$ as shown in FIG. 3C have already introduced the u-, v- and w-eigenbases. Each of these three eigenbases has two eigenvectors that are not explicitly drawn here (see, e.g., FIGS. 1A & 1B and corresponding description in the background section). In other words, the eigenvectors in this example come in pairs. There is one "UP" and one "DOWN" eigenvector in each of the three eigenbases. Equivalently put, we have eigenvectors that are parallel and anti-parallel with the u, v and w rays shown in FIGS. 3C & 3D.

By convention already introduced above, we take "UP" eigenvectors to mean that the subject is experiencing a state of positive judgment in that value (contextualization yields positive value judgment). Therefore, the "UP" eigenvector is associated with the first eigenvalue $\lambda_1$ that we take to stand for the "YES" measurable indication a. The "DOWN" eigenvectors mean the state of negative judgment in that value. Hence, the second eigenvalue $\lambda_2$ that goes with the "DOWN" eigenvector is taken to stand for "NO" measurable indication b.

In the quantum representation of contextualizations as implemented by assignment module 116 the eigenvector pairs describe the different values that subjects may deploy. Subjects $S_i$ can contextualize proposition 107 with any chosen value described by the eigenvector pairs but they can only choose one at a time. In fact, in many applications of the present apparatus and methods it is advantageous to obtain measurable indications a, b (or eigenvalues $\lambda_1$, $\lambda_2$) from many subjects $S_i$ in at least two different eigenvector bases or, equivalently, in two different contextualizations.

Based on the rules of linear algebra, subject states $|S_i\rangle$ forming the quantum representation of subjects $S_i$ modulo underlying proposition 107 can be expressed in any contextualization or using any of the available values. This is ensured by the spectral decomposition theorem. We have already used this theorem above in FIG. 3C for subject state decompositions in terms of eigenvectors. To wit, we have expressed subject state $|S_1\rangle$ of subject $S_1$ in the u-basis, subject state $|S_2\rangle$ of subject $S_2$ in the v-basis, and subject state $|S_m\rangle$ of subject $S_m$ in the w-basis.

In FIG. 3D we proceed further and introduce value matrices $PR_j$ whose eigenvectors are the very eigenvectors we have already deployed. Conveniently, we thus express the different bases or eigenbases with corresponding value matrices $PR_j$ that have these eigenvectors in their eigenbases. Value matrices $PR_j$ represent quantum mechanical operators (Hermitian matrices). In the case of our two-level systems are related to the Pauli matrices already introduced in the Background section.

The quantum mechanical prescription for deriving the proper operator or "beauty" value matrix $PR_u$ is based on knowledge of the unit vector $\hat{u}$ along ray u. The derivation has already been presented in the background section in Eq. 13. To accomplish this task, we decompose unit vector $\hat{u}$ into its x-, y- and z-components. We also deploy the three Pauli matrices $\sigma_1, \sigma_2, \sigma_3$. By standard procedure, we then derive value matrix $PR_u$ as follows:

$$PR_u = \hat{u} \cdot \overline{\sigma} = u_x\sigma_1 + u_y\sigma_2 + u_z\sigma_3. \quad \text{Eq. 18a}$$

The same procedure yields the two remaining value matrices $PR_v$, $PR_w$ that, in our quantum representation, stand for contextualizations using the values of "style" and "beauty", respectively. Once the decompositions of unit vectors $\hat{v}, \hat{w}$ along rays v, w are known, these are expressed as follows:

$$PR_v = \hat{v} \cdot \overline{\sigma} = v_x\sigma_1 + v_y\sigma_2 + v_z\sigma_3, \text{ and} \quad \text{Eq. 18b}$$

$$PR_w = \hat{w} \cdot \overline{\sigma} = w_x\sigma_1 + w_y\sigma_2 + w_z\sigma_3. \quad \text{Eq. 18c}$$

All three value matrices $PR_u$, $PR_v$, $PR_w$ obtained from these equations are shown in FIG. 3D in association with their corresponding rays u, v and w.

Figure 1E:
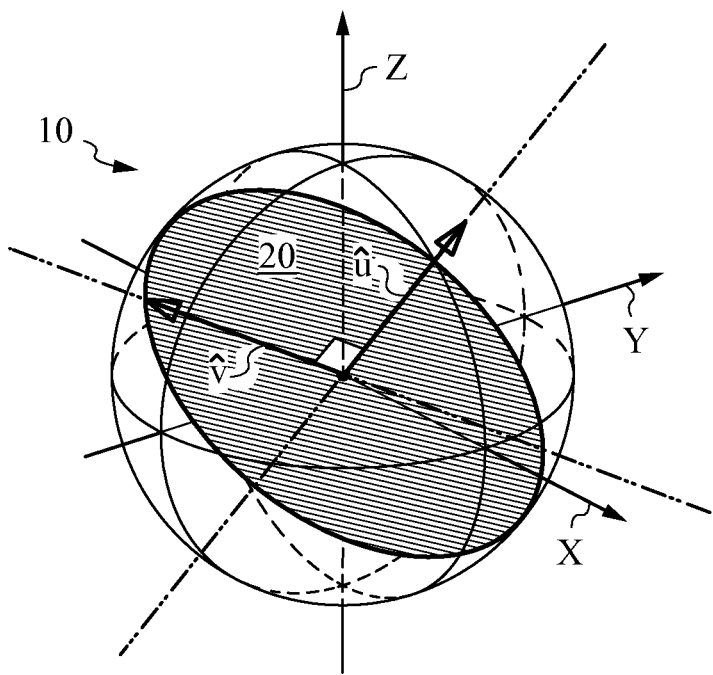
FIG. 1E (Prior Art) is a diagram illustrating the plane orthogonal to a state vector in an eigenstate along the u-axis (indicated by unit vector û).
Figure 1F:
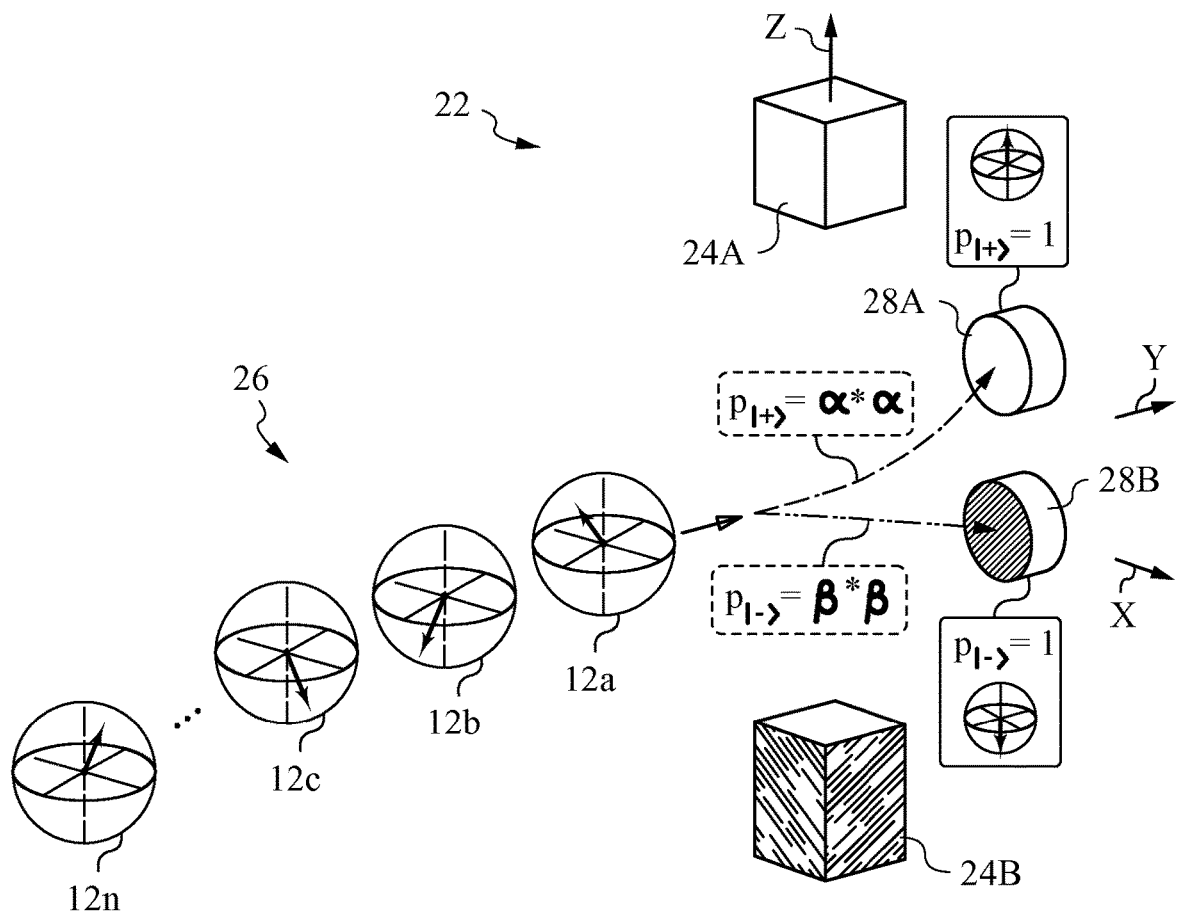
FIG. 1F (Prior Art) is a diagram illustrating a simple measuring apparatus for measuring two-state quantum systems such as electron spins (spinors).
Figure 1G:
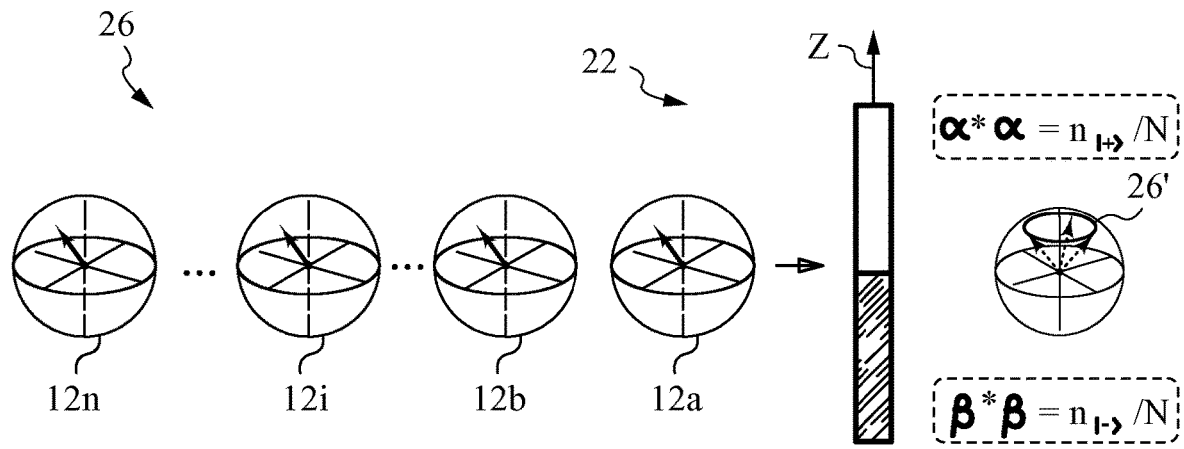
FIG. 1G (Prior Art) is a diagram illustrating the fundamental limitations to finding the state vector of an identically prepared ensemble of spinors with single-axis measurements.

Per standard rules of quantum mechanics, we take value matrices $PR_j$ to act on or be applied to subject states $|S_i\rangle$ to yield eigenvalues $\lambda_k$ associated with measurable indications modulo underlying proposition 107 as exhibited by subjects $S_i$. The eigenvalues, of course, stand for the "YES" and "NO" measurable indications. The practitioner is here reminded that prior to the application of the corresponding value matrix the subject state should be expressed in the eigenbasis of that value matrix. In the case of values represented with value matrices $PR_u$, $PR_v$, $PR_w$ we are clearly not dealing with eigenvector bases that are completely orthogonal (see FIG. 1E and discussion of the Uncertainty Principle in the Background section). Thus, contextualizations with these values are not completely incompatible. However, they are far from compatible, since u-, v- and w-produce clearly different unit vectors.

In some embodiments it will be advantageous to select two or more different eigenvector bases (depending on dimensionality of state space $\mathcal{H}^{(C)}$ represented by two or more value matrices $PR_j$ that are non-commuting and thus subject to the Heisenberg Uncertainty relation. Measurements obtained over test subjects $S_i$ contextualizing with incompatible values as encoded by such non-commuting value matrices $PR_j$ will be useful in further explorations and in constructing views for classical representations. The measurable indications obtained when contextualizing with such non-commuting value matrices $PR_j$ cannot have simultaneous reality. In other words, they cannot be measured/observed in any one of subjects $S_i$ at the same time.

Armed with the quantum mechanical representation thus mapped, many computations and estimations can be undertaken. The reader is referred to the co-pending application Ser. Nos. 14/182,281; 14/224,041 and 14/324,127 for further teachings about the extension of the present quantum representation to simple measurements. Those teachings also encompass computation of outcome probabilities in various bases with respect to different propositions typically presented to just one or two subjects. The teachings partly rely on trying to minimize the effects from interactions between the environment and the state that stands in for the subject of interest. It is also assumed for the purposes of those teachings that the states are reasonably pure allowing us to build up our intuition without having to move to the density matrix representation of subject states.

In the present invention we will continue building on the intuition from simple situations of reasonably pure states. That is because teachings based on pure states are easily translated by those skilled in the art to the more complex situations in which, e.g., several pure states are possible for a single subject. Given that the density matrix is thus obtained from probabilities of two or more pure states, as already shown in the Background section, a person skilled in the art will be able to adapt these teachings to construct requisite density matrices. Thus, more complicated situations in which subject states are mixtures and entanglement between subjects exists can be properly accounted for based on the teachings of the present quantum representation.

Figure 4:
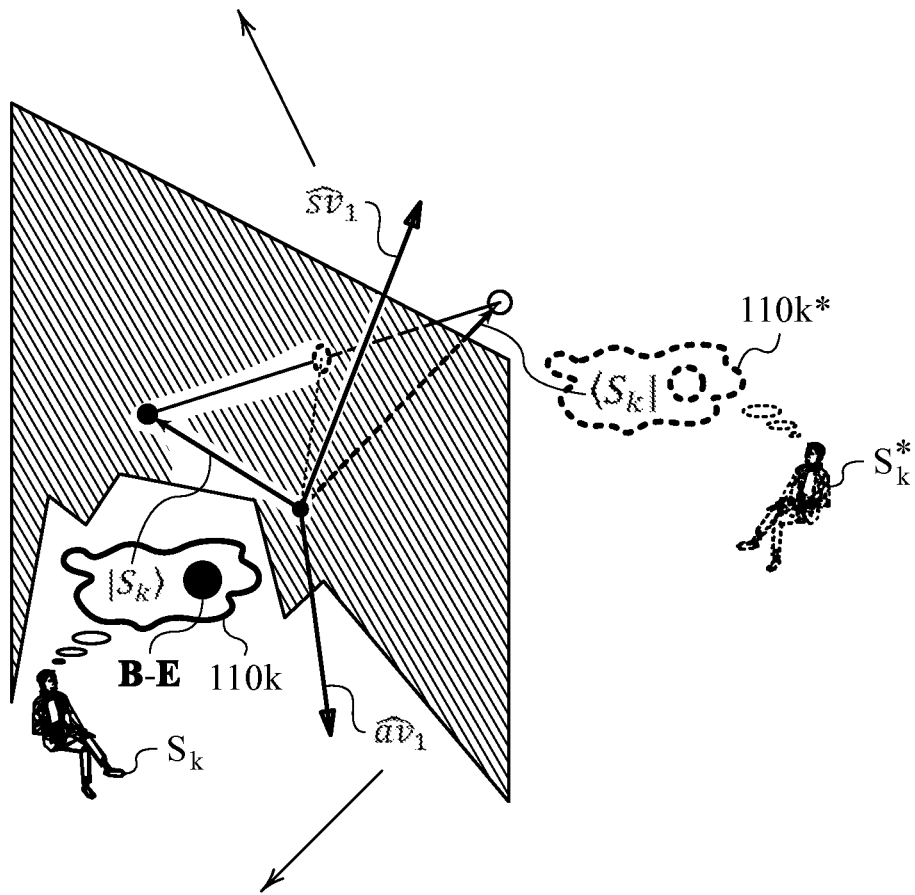
FIG. 4 is a diagram to aid in the visualization of the computation of a quantum mechanical expectation value.

In order to better understand important aspects of the invention we now refer to FIG. 4 to review the computation of an expectation value for a measurement. Here we see a single subject $S_k$ with a pure state $|S_k\rangle$ representing their internal state 110k at some initial time $t_o$. A reasonably pure quantum state representation for subject $S_k$ has been confirmed by mapping module 115 (see FIG. 2). The state fits the description of discrete and two-level modulo a preparatory proposition 107' about item 109e. In this example item 109e happens to be an experience and more particularly still and experiential good embodied by a movie. Overall context 202 for the quantum representation valid in this example is included at the top of FIG. 4.

Creation module 117 (see FIG. 2) is informed by historical data (possibly further corroborated by a human curator) about the consensus type of subject $S_k$. In this exemplary case, the nature of subject $S_k$ modulo preparatory proposition 107' about movie 109e is B-E consensus type, or more simply put consensus seeking. Thus, creation module 117 has used a bosonic creation operator to posit state $|S_k\rangle$, as duly marked in FIG. 4.

The most commonly adopted contextualization practiced by subject $S_k$ in considering preparatory proposition 107' about movie 109e is gleaned from "thick data" available on network 104 (potentially in social network 106 if subject $S_k$ is a member). In the present example, this most commonly adopted contextualization is encapsulated by the concept of "entertainment value". In other words, subject $S_k$ typically apprehends proposition 107' presenting movie 109e as an opportunity to be entertained.

Once again, it is the job of assignment module 116 (see FIG. 2), appraised of information about subject $S_k$ to formally translate subject state 110k under the "entertainment value" contextualization into quantum representation. First, the value used in the contextualization is presented in the form of a subject value matrix $PR_V$. Since the system is two-level, subject value matrix $PR_V$ has two eigenvectors $|sv_1\rangle, |sv_2\rangle$ and two corresponding eigenvalues $\lambda_1, \lambda_2$. In the present example, eigenvector $|sv_1\rangle$ is taken for "entertaining" with corresponding eigenvalue $\lambda_1$ standing for the measurable indication that subject $S_k$ yields when entertained. In our example, this measurable indication will be also referred to by $\lambda_1$ to simplify the notation. Furthermore, it will be counted as a response of: $\lambda_1$="YES" response for "entertainment value". Second eigenvector $|sv_2\rangle$ is taken for "not entertaining" with corresponding eigenvalue $\lambda_2$ standing for the measurable indication that subject $S_k$ yields when not entertained. This negative measurable indication referred to by $\lambda_2$ is counted as a response of: $\lambda_2$="NO" response for "entertainment value". Finally, in keeping with the above convention, the complex coefficients for the spectral decomposition of subject state $|S_k\rangle$ in the basis offered by subject value matrix $PR_V$ are represented by the familiar $\alpha$, $\beta$. This means that assignment module 116 outputs the manifestly Hermitian subject value matrix $PR_V$:

$$PR_V = \begin{vmatrix} V_x & V_x + iV_y \\ V_x - iV_y & -V_x \end{vmatrix}, \quad \text{Eq. 19}$$

where capital V (rather than lower-case we were using before) now stands for the corresponding ray in Hilbert space. Also, assignment module 116 outputs subject state $|S_k\rangle$ decomposed in the eigenbasis of subject value matrix $PR_V$:

$$|S_k\rangle_V = \alpha_V |sv_1\rangle_V + \beta_V |sv_2\rangle_V, \quad \text{Eq. 20a}$$

where we use the capital V subscripts to remind ourselves that the quantum representation is in the eigenbasis of subject value matrix $PR_V$.

Given this decomposition we will expect that a measurement using the contextualization expressed with subject value matrix $PR_V$ will yield the following probabilities for "YES" and "NO" measurable indications or responses of subject $S_k$ encoded in eigenvalues $\lambda_1$, $\lambda_2$:

$p_{"YES"} = \alpha_V^* \alpha_V$ (probability of observing subject $S_k$ manifest eigenvalue $\lambda_1$);

$p_{"NO"} = \beta_V^* \beta_V$ (probability of observing subject $S_k$ manifest eigenvalue $\lambda_2$).

At this point "thick" data about subject $S_k$ is used by assignment module 116 to estimate the complex coefficients and the probabilities. Advantageously, the deployment of the invention in network 104 captures large amounts of "thick" and recent data to help in estimating these coefficients and probabilities. In some cases the estimate may be very good, e.g., when based on a recent measurement. For example, there may exist a recent record, e.g., in a data file 112 (see FIG. 2) of subject $S_k$ effectively stating: "I find movie 109$e$ to be of excellent entertainment value". In this case the decomposition is simple and consists only of the first eigenvector $|sv_1\rangle_V$ with $p_{"YES"}=p_{|sv_1\rangle}=\alpha_V=1$ ($p_{"no"}=p_{|sv_2\rangle}=\beta_V=0$). In the opposite case, where subject $S_k$ effectively stated: "I find movie 109$e$ to be of no entertainment value" we again obtain an excellent estimate. Namely, the decomposition consists only of the second eigenvector $|sv_2\rangle_V$ with $p_{"NO"}=\beta_V=1$ ($p_{"YES"}=\alpha_V=0$). The reason why even such measurements should be treated as estimates is due to temporal evolution and decoherence effects that set in with the passage of time. This is also the reason why fresh data is of utmost importance for propositions whose evaluation by a human mind changes quickly with time.

Assignment module 116 can also assign a mixed state for subject $S_k$ in case he or she is known to exhibit a less common but still often deployed alternative contextualization. For example, in a simple case subject $S_k$ may be known from historical records to deploy the alternative contextualization of "educational value" with respect to proposition 107' about movie 109$e$. For the sake of the present example, the probability that subject $S_k$ actually adopts this alternative contextualization is 10%. This is expressed with an alternative subject value matrix $PR_{AV}$.

Given this information, module 116 produces an estimate of subject state $|S_k\rangle$ decomposed in the eigenbasis of alternative subject value matrix $PR_{AV}$:

$$|S_k\rangle_{AV} = \alpha_{AV} |av_1\rangle_{AV} + \beta_{AV} |av_2\rangle_{AV}, \quad \text{Eq. 20b}$$

with the subscript AV denoting that the quantum representation is in the eigenbasis of alternative subject value matrix $PR_{AV}$.

Given that subject $S_k$ may have some probability of being in a pure state in the eigenbasis of $PR_{AV}$, the two pure states can be combined. The correct quantum mechanical prescription has already been provided in the Background section (see Eq. 15) and leads to the following density operator for our example:

$$\hat{\rho} = \Sigma_i p_i |\psi_i\rangle\langle\psi_i| = (0.9)|S_k\rangle_{VV}\langle S_k| + (0.1)|S_k\rangle_{AV\,AV}\langle S_k|. \quad \text{Eq. 21}$$

The $p_i$'s in this case represent the relative probabilities (summing to one in order to preserve the normalization condition discussed above) that subject $S_k$ will apply contextualization "entertainment value" and "educational value", respectively. In our example the probability of subject state $|S_k\rangle_V$ is 90% (0.9) since contextualization with alternative subject value matrix $PR_{AV}$ and hence of $|S_k\rangle_{AV}$ has a likelihood of 10% (0.1). In any particular case, these probabilities are computed from the historical records about subject $S_k$ and may be further corroborated/vetted by the human curator.

In a preferred embodiment, proposition 107' is presented to subject $S_k$ on the screen of their networked device (see FIG. 2 for a few non-limiting examples of networked devices). Alternatively, it is presented to them in any convenient way capable of displaying enough information about movie 109$e$ to register as viable proposition. Indeed, the presentation can even be in person—i.e., presentation of proposition 107' about movie 109$e$ is made during a real life encounter with another subject or by some proxy, mechanism or message including written and/or drawn information (e.g., an advertisement).

FIG. 4 illustrates subject state $|S_k\rangle$ and its dual bra vector state $\langle S_k|$. This drawing indicates by unit vector $\widehat{sv}_1$ the "entertaining" eigenvector in the most commonly adopted contextualization of "entertainment value" expressed by subject value matrix $PR_V$. The drawing further shows by unit vector $\widehat{av}_1$ the "educational" eigenvector in the alternative contextualization of "educational value". Per our quantum representation we postulate that at the time subject $S_k$'s state $|S_k\rangle$ is measured and collapses to either of these two eigenvectors the corresponding eigenvalue manifests. Specifically, collapse of $|S_k\rangle$ to $|sv_1\rangle$ will coincide with subject $S_k$ manifesting $\lambda_1$="YES" meaning "yes movie 109$e$ is entertaining". The collapse of $|S_k\rangle$ to $|av_1\rangle$ will coincide with subject $S_k$ manifesting $\lambda_1$="YES" meaning "yes movie 109$e$ is educational". Also in agreement with the quantum representation, the probability of collapse will start at zero at initial time $t_o$ and will keep increasing for as long as preparatory proposition 107' is being apprehended by subject $S_k$.

Eigenvectors $\widehat{sv}_2$, $\widehat{av}_2$ representing the state $|S_k\rangle$ of subject $S_k$ at the moment of measuring eigenvalues $\lambda_2$="NO" for "no movie 109$e$ is not entertaining" and $\lambda_2$="NO" for "no movie 109e is not educational" are omitted for reasons of clarity. Also note that in the case of the mixture discussed above, subject $S_k$ is only expected to have its state $|S_k\rangle$ be one of eigenvectors $\widehat{sv}_1$ and $\widehat{av}_1$. Differently put, subject $S_k$ is expected to be in one of the "YES"-eigenstates, but we do not know (based on a classical probability for relative probabilities in the mixture) which one. In other words, we have 90/10 chances for subject $S_k$ adopting the "entertainment value" or "educational value" contextualization modulo preparatory proposition 107' about movie 109e. In either case, subject $S_k$ is expected to yield the measurable indication "YES".

Since we can already tell in our own capacity as curators of human experience that it is hard to judge the same movie 109e in contextualizations based on "entertainment value" and based on "educational value" simultaneously, we expect that matrices $PR_V$ and $PR_{AV}$ will not commute. As a result, the fact that eigenvectors $\widehat{sv}_1$ and $\widehat{av}_1$ are not aligned is not surprising. In practice, the relative orientation of these eigenvectors should be confirmed not just by the human curator but also by reviewing large numbers of measurements and deploying the rules of commutator algebra well known to those skilled in the art.

The expectation value of subject's $S_k$ judgment of movie 109e in the "entertainment value" basis (measured by applying subject value matrix $PR_V$) is obtained by taking the regular prescription (see Eq. 10a). That prescription involves ket subject state $|S\rangle$, its complex conjugated dual bra $\langle S|$ and subject value matrix $PR_V$. Similarly, we can also obtain the expectation value of subject's $S_k$ judgment of movie 109e in the "educational value" basis (measured by applying alternative subject value matrix $PR_{AV}$). The same prescription holds and calls for subject state $|S\rangle$, its bra $\langle S_k|$ and now alternative subject value matrix $PR_{AV}$ instead of subject value matrix $PR_V$.

Just from a cautious geometrical intuition built from examining FIG. 4, we see that these expectation values will be very different. We state this fact more formally by using the expectation value formula explicitly as follows:

$$\langle S|PR_V|S\rangle \neq \langle S|PR_{AV}|S\rangle, \text{ or}$$

$$\langle PR_V\rangle_{|S\rangle} \neq \langle PR_{AV}\rangle_{|S\rangle}. \qquad \text{Eq. 22}$$

In practice, the range of expectation value (given our +1 and −1 eigenvalues) will be between +1 and −1. From a simple visual inspection of the geometry (the reader is yet again cautioned that FIG. 4 is a Bloch-related representation) we see the projection for $\langle PR_V\rangle_{|S\rangle}$ to be close to about 0.75, while $\langle PR_{AV}\rangle_{|S\rangle}$ appears to be close to 0.

In FIG. 4 subject $S_k$ is indicated with internal state 110k and their internal complex-conjugated state 110k*. Both the state and its complex-conjugate are about movie 109e at center of preparatory proposition 107'. As we have previously seen in U.S. application Ser. No. 14/324,127, the evolution along some orbit can always take internal state 110k to internal complex-conjugated state 110k*. In a sense, these two states are "reflections" of each other. We thus posit subject $S_k$ and a "mirror image" subject $S_k$ namely subject $S_k$*. Subject $S_k$* can be thought of as the same subject $S_k$ after some amount of evolution. Subject $S_k$* can also be thought of as a completely different subject that currently contextualizes movie 109e but whose ket state (the non complex-conjugated state) is represented by internal state 110k*. In other words, the |notional⟩ state or ket state of subject $S_k$* is in fact the bra state or the ⟨counter-notional| state of subject $S_k$.

This "flipping" between bras and kets can be understood as a change in mind about movie 109e from the point of view of a "party" represented by subject $S_k$ to the point of view of a "counter-party" represented by subject $S_k$*. In the vernacular, such opposite thinking about the same underlying proposition may express itself as: 1) "yes the movie is entertaining to me" and 2) "yes the movie is entertaining to others". Differently put, this pair of complex-conjugate internal states can be associated with a "party" and a "counter-party" mentality. They both certainly "see eye to eye". They also agree on judging movie 109e in the same contextualization of "entertainment value" but still are distinct in the sense that one would act like a "viewer" or "consumer" of movie 109e and the other like a "promoter" or "producer" of movie 109e.

We are presently interested in situations that start with a group of subjects that are similar. We understand similar subjects to be those that use or exhibit the same and known contextualization of the underlying proposition under review. Moreover, these subjects also exhibit a known but not necessarily the same measurable indication in the known contextualization that they have chosen. What we wish to track, ascertain or detect are situations in which the addition or injection of another subject into the group of subjects causes a perturbation. The perturbation affects the contextualization of the underlying proposition that is adopted by the subjects in the group. More specifically still, the subject being added is chosen on the grounds that he or she is likely going to be found disruptive by the group because the injected subject exhibits an anti-consensus statistic modulo the underlying proposition. This disruptive effect due to the F-D anti-consensus statistic modulo the underlying will manifest in provoking discord with any F-D anti-consensus statistic subjects already members of the group. In addition, the injected subject may sway the contextualization adopted by subjects exhibiting the B-E consensus statistic when the disruptive subject is found important or in any way hold sway with the group.

In order to better understand the mechanism responsible for the perturbation to the contextualization practiced by the group, we will first review several concepts related to the spin statistics theorem. The spin statistics as applied in the quantum representation of the present invention designate consensus type. Questions of fractional statistics and more advanced issues are not addressed herein but the reader is referred to standard texts on Quantum Field Theory for corresponding treatment. The reader will also find some introductory teachings on the subject in U.S. patent application Ser. No. 14/224,041 and in U.S. patent application Ser. No. 14/324,127.

Figure 5A:
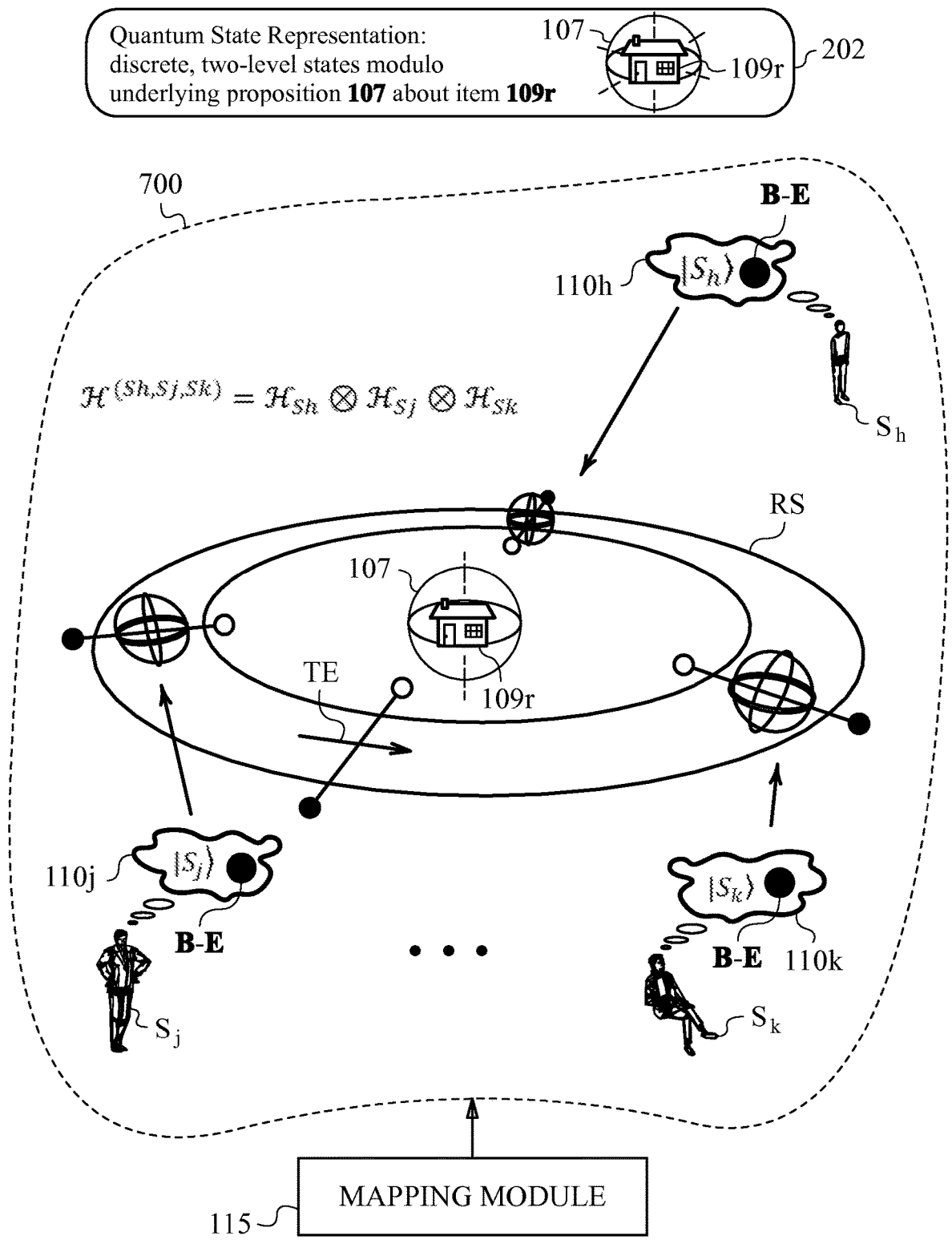
FIG. 5A is a diagram illustrating a group of selected subjects exhibiting B-E consensus statistics.
Figure 5B:
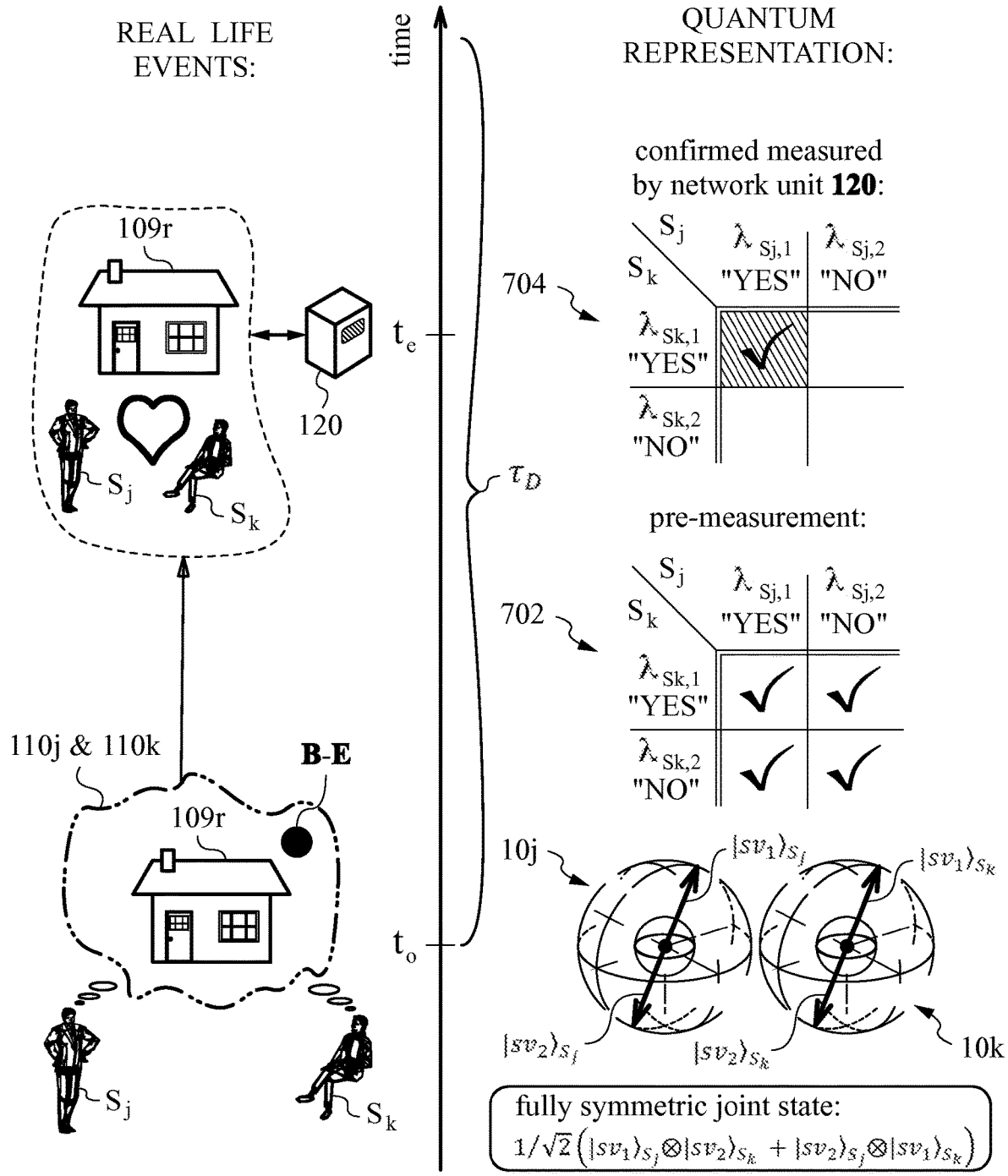
FIG. 5B is a diagram depicting possible measurement results given a joint symmetric state between two of the B-E consensus subjects picked from the group of FIG. 5A.
Figure 5C:
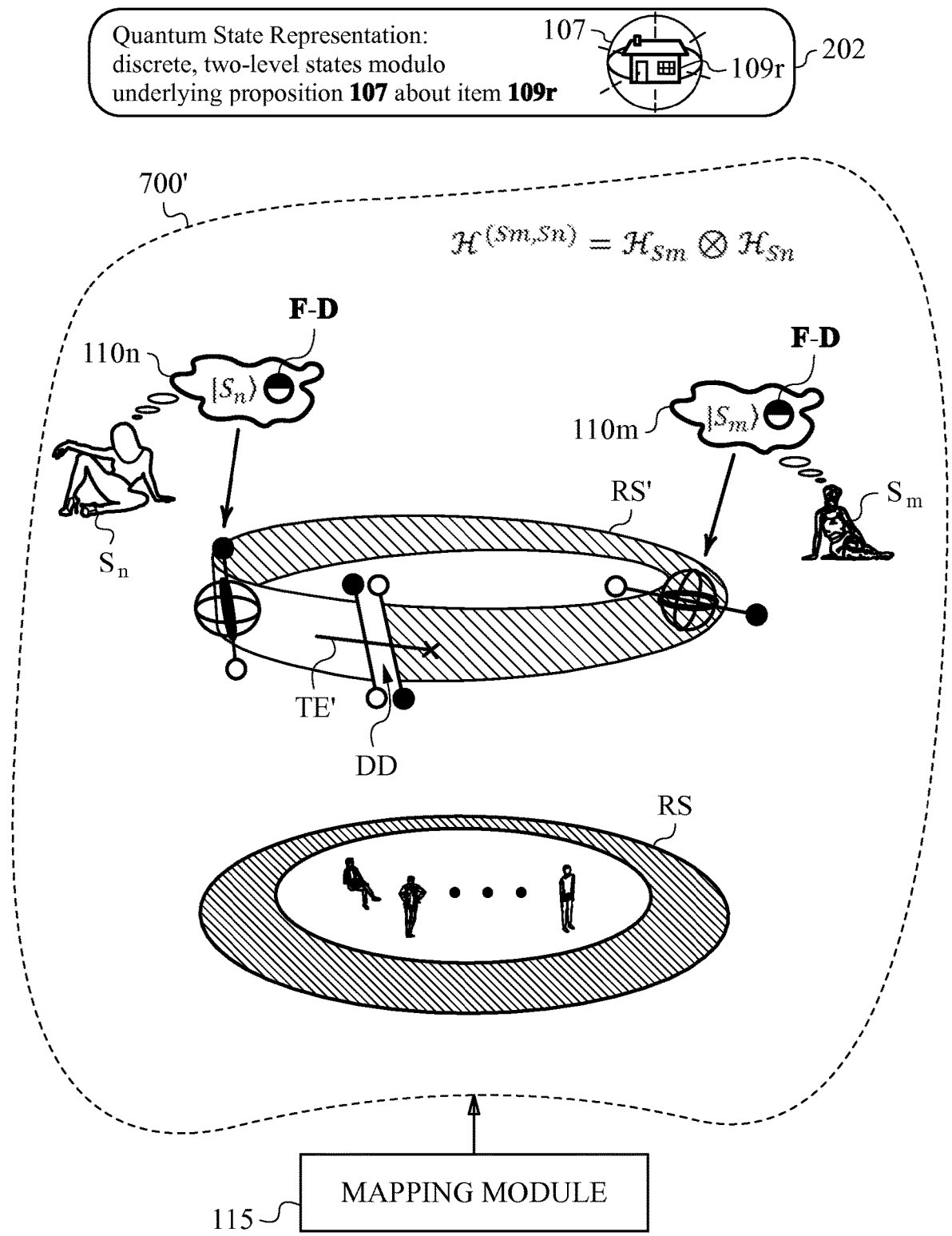
FIG. 5C is a diagram illustrating a group of selected subjects exhibiting B-E consensus statistics and two subjects exhibiting F-D anti-consensus statistics.

In the present we will refer to diagrams in FIGS. 5A-C that illustrate an application of joint quantum states in accordance with the invention. The example builds on the previous embodiments and hence uses the same reference numerals for analogous parts whenever practicable. The computer system that implements the invention is analogous to computer system 100 (see FIG. 2). The additional important aspect that ensure system 100 properly implements aspects related to joint quantum states are called out expressly in FIGS. 5A-D. The example application used to explain the invention is concrete in order to provide a more thorough and clear teaching of the invention. It is not to be construed as a limitation on the myriads of situations where joint quantum states come into play.

FIG. 5A shows a group 700 of subjects selected by mapping module 115 from among all available subjects $S_i$ in computer system 100 (see FIG. 2). In this example three subjects, namely subjects $S_h$, $S_j$ and $S_k$ are explicitly called out for explanatory purposes. Further, context 202 is generated by presentation of underlying proposition 107 about item 109$r$ that is an object (rather than a subject or experience) embodied by a house (see also FIG. 3A). As before, the quantum representation is simple because all subjects selected into group 700 by mapping module 115 when under measurement precipitate as discrete, two-level states modulo underlying proposition 107 about house 109$r$. In addition, all subjects that are members of group 700 in this example manifest the B-E consensus statistic modulo proposition 107 about house 109$r$. The consensus is preferably tracked by creation module 117 (see FIG. 2) that is charged of formally producing the quantum representation and applying the corresponding creation (and annihilation) operators that posit the states.

We use a Riemann surface RS as a visualization aid to illustrate the importance of the B-E consensus statistic on the example of subjects $S_h$, $S_j$ and $S_k$. Specifically, the way in which subjects $S_h$, $S_j$, $S_k$ apprehend underlying proposition 107 in their internal spaces 110$h$, 110$j$, 110$k$ is encoded per our quantum representation in subject states $|S_h\rangle$, $|S_j\rangle$, $|S_k\rangle$ as assigned in assignment module 116 along with their consensus types used during formal state creation by creation module 117 (see FIG. 2). In contrast to a number of previously considered cases, when dealing with subjects $S_h$, $S_j$, $S_k$ as members of group 700 where subjects are aware of each other confronting the same underlying proposition 107 their consensus type becomes crucial.

The group situation differs from conditions under which the subjects confront underlying proposition 107 individually and independently of each other, e.g., in private settings. Such isolated conditions can involve private online sessions in which each subject's thoughts and choices are not open to inspection by other subjects. It is advantageous to enforce such situations in many of the previous teachings when specifically attempting to limit inter-subject exposure and possible interactions in order to minimize any possible effects due to joint quantum states. To recall, in those cases each subject was considered a fully individuated entity free from influence by others and thus the consensus type did not play a role. This, of course, does not apply to underlying proposition 107 itself since it is the very interaction of interest.

Of course, as already noted previously, even in very isolated and private situations where the subjects are free individuals some of them may still feel a bias or pressure from another subject or group(s) of subjects that are not present. These cases may reflect, among other, peer pressure and influences on the individual by subjects making up their social environment. Most common are effects of parents on children, spouses on each other, political parties on their constituents, religious entities on followers and charismatic figures on their audience to mention just a few. Consensus type would clearly have to be included in those cases to account for joint states. In other words, consensus type was irrelevant for as long as each subject was acting independently and was reasonably free of bias from other subject(s) and/or other aspects of their environment capable of exerting an influence on their state through entanglement. It is under such conditions that we were justified in considering subject states to be reasonably pure and representing them by state vectors (although density matrices would still be required for mixed states, as previously discussed).

Now, however, we are dealing with group 700 in which all subjects, and specifically the three we have chosen for explanatory purposes, know about each other and influence each other while confronting underlying proposition 107. Of course, just because the subjects are in group 700 does not necessarily mean that they will all assume a joint state modulo proposition 107. For example, when manifestation of a measurable indication by any subject in group 700 does not have any influence on any other subject in group 700 it is likely that the state of that subject can be considered in isolation (it is separable). In the limiting case all of the subjects are assigned individuated states, as before. In intermediate cases, group 700 may need to be separated into sub-groups where each is treated as required by its consensus type. Those skilled in the art will be familiar with the methods for breaking up groups and treating them in accordance with their statistics (i.e., statistics-based symmetrization and anti-symmetrization of sub-groups using appropriate linear algebra tools, e.g., Slater determinants).

In the subsequent teachings we are interested in conditions under which all subjects in group 700 affect each other and we just have one group to consider. In other words, all subjects in group 700 are affected by choices or measurable indications generated by any subject that is a member of group 700. Still differently put, we are interested in conditions where there is an interdependency between all of the subjects of group 700 in the context of underlying proposition 107.

The interdependency modulo proposition 107 about house 109$r$ is ensured by the very nature of proposition 107. Namely, house 109$r$ at the core of proposition 107 is for rent. In reality, only a small subset of subjects in group 700, maybe just one will be able to rent house 109$r$ at any given time. This is a situation where the resource constraint of underlying proposition 107 imposed by item 109$r$ enforces interdependency. Just to make sure, it is preferred that the human curator be involved in ascertaining that subjects of group 700 are truly interested in proposition 107 about renting house 109$r$. In other words, house 109$r$ truly registers as a limited resource in internal spaces 110 of all subjects in group 700 and all are seriously interested in renting it.

Evidence for B-E consensus statistic modulo proposition 107 exists for any two subjects if, for example, according to data files 112-Sj, 112-Sk, communications in network 104, social network 106 and corroboration from human curator, subjects $S_j$, $S_k$ exhibit conscious agreement or consensus when considering house 109$r$ in the same contextualization. For example, they both judge house 109$r$ in the known contextualization of "rentability". Moreover, each one of them is fine with the other one judging house 109$r$ to be a "YES" or a "NO" in that known contextualization (the a being the "YES" indication and the b being the "NO" indication). Such lack of strife with respect to each other over house 109$r$ should be the case even when only one house 109$r$ is available to them and only one of them is able to act on their judgment of "YES" and rent house 109$r$.

In practice, it may be difficult to discern that subjects $S_j$, $S_k$ are inclined to produce such cooperative or symmetric state modulo the exact same proposition 107 from data files 112 and communications found in traffic in network 104 and within social network 106. This is why creation module 117 has to review data files 112 as well as communications of subjects $S_j$, $S_k$ containing indications exhibited in situations where both were present and modulo propositions as close as possible to proposition 107 about house 109$r$. The prevalence of "big data" as well as "thick data" that subjects produce in self-reports is very useful in this task. Furthermore, the human curator that understands the lives of both subjects $S_j$, $S_k$ can help in reviewing and approving the proposed B-E consensus statistic for each subject modulo rental proposition 107 about house 109r. The same process is repeated for all subjects in group 700 to ensure that we are justified in treating group 700 as one entity (without breaking it up into sub-groups, as mentioned above).

A person skilled in the art will note that any underlying proposition 107 that generates constraints such as limited availability, perceived status, perceived desirability, exclusivity, necessity for survival, necessity for fulfillment and/or any other mechanisms is likely to require joint subject states. More specifically, when the constraints generate conditions under which bidding, competition, strife and/or other similar group dynamics among subjects of group 700 can manifest they produce a situation in which the quantum representation of subjects in group 700 is likely to require a joint state. The joint state of B-E consensus type subjects will reflect their ability to share the limited resource here being the item embodied by house 109r at the core of underlying proposition 107. In other words, as we will see in more detail below, joint states among B-E consensus subject admit of joint state solutions in which a pair or a larger number of the subjects, or even all of the subjects, find a way to share the resource at the center of underlying proposition 107.

Again, it is possible that certain subjects in group 700 may not care about proposition 107. In other words, they may be superficial participants. For example, some subjects may not be true bidders and thus do not warrant inclusion in the joint state. That is why the human curator familiar with subjects under the given conditions should confirm the final selection of subjects that need to be represented by the joint quantum state.

We return to our exemplary case where all subject in group 700 are genuinely interested in underlying proposition 107 to rent house 109r. Moreover, they are all confirmed to exhibit the B-E consensus dynamic modulo proposition 107 about renting house 109r. The B-E consensus statistic is explicitly indicated for the three select subjects $S_h$, $S_j$, $S_k$ in group 700 along with their states $|S_h\rangle$, $|S_j\rangle$, $|S_k\rangle$. To consider subject states $|S_h\rangle$, $|S_j\rangle$, $|S_k\rangle$ jointly we need to introduce a tensor space $\mathcal{H}^{(Sh,Sj,Sk)} = \mathcal{H}_{Sh} \otimes \mathcal{H}_{Sj} \otimes \mathcal{H}_{Sk}$ that can hold any joint state that these three exemplary subject states may yield. In other words, any tensor state $|S_h\rangle \otimes |S_j\rangle \otimes |S_k\rangle$ that is among subjects $S_h$, $S_j$, $S_k$ modulo proposition 107 has to be in tensor space $\mathcal{H}^{(Sh,Sj,Sk)}$.

Knowledge of consensus statistics B-E among subjects $S_h$, $S_j$, $S_k$ modulo proposition 107 tells us something upfront. Namely, whatever joint state obtains it must be symmetric according to the physical principles behind the quantum representation adopted herein. Thus, components of any legitimate joint state $\Phi = |S_h\rangle \otimes |S_j\rangle \otimes |S_k\rangle$ for B-E consensus subjects $S_h$, $S_j$, $S_k$ will interchange with a "+" sign. Differently put, a symmetric joint state has to be in the symmetric subspace of $\mathcal{H}^{(Sh,Sj,Sk)}$. That is because permissible joint states given B-E consensus statistics can also be thought of as confined to unitary evolution on Riemann surface RS. Surface RS is "flat" meaning that it has no twists or obstructions that would produce a flip or sign change in a state confined to unitary evolution along surface RS. All quantum states evolving along RS will do so without flipping. For better visualization, the lack of impediment in evolution along this orbit due to the absence of flipping is indicated by arrow TE in FIG. 5A.

For still better visualization, the lack of any flip is indicated by the black and white dots that "travel" with the quantum mechanical state representations visualized by "balls" as they evolve in a unitary manner along Riemann surface RS. There is clearly no impediment to the co-existence of subject states $|S_h\rangle$, $|S_j\rangle$, $|S_k\rangle$ in Hilbert space $\mathcal{H}^{(Sh,Sj,Sk)}$ if they were to "roll over each other" and occupy the same quantum state somewhere along surface RS vis-à-vis proposition 107 about house 109r. All other subjects that are not explicitly shown can be accommodated in such a symmetric joint state, even if all could judge house 109r as "YES" in the "rentable" context 202 while only one of them can rent it (e.g., due to obviously limited availability). Notably, in such symmetric joint state two or more subjects could even attempt to rent same house 109r together. (Those skilled in the art will recognize that in more complicated situations Riemann surface RS could present an integral number of flips thus still ensuring no sign change upon interchange of any component states. This would satisfy the B-E consensus condition yielding a symmetric joint state. The subject of spin statistics is profound and the reader is referred to the literature on quantum field theory cited in the background section for a more complete treatment of the underlying physical principles and mathematical tools.)

To further our understanding of symmetric joint states we concentrate on just two subjects, namely subjects $S_j$, $S_k$ from group 700, as shown in FIG. 5B. Reducing group 700 to just two subjects $S_j$, $S_k$ vastly simplifies the formalism yet contains all the insights to permit skilled artisans to extend the application of the present invention to groups ranging from just one to many member subjects. A person skilled in the art will also familiar with tools of linear algebra and methods of partitioning possible joint states of many indistinguishable entities designed for such applications in the field of applied physics (e.g., appropriately symmetrized states expressed with the aid of matrices and Young diagrams). A particularly well-presented set of introductory teachings is found in Chapter IX on the identity of particles as presented in L. D. Landau and E. M. Lifshitz, "Quantum Mechanics (Non-relativistic Theory)", Institute of Physical Problems, USSR Academy of Sciences, Butterworth Heinemann, $3^{rd}$ Edition, 1962.

The diagram in FIG. 5B depicts the quantum representation of real life events involving subjects $S_j$, $S_k$. Salient aspects of the corresponding quantum representation are shown on the right of a time line 300. Similarly, salient aspects of real life events involving subjects $S_j$, $S_k$ are shown on the left of time line 300. Real life events and the quantum representation are temporally synced. Time increases in the up direction.

At the top of FIG. 5B we see the general expression for a symmetric joint state containing the aforementioned "+" sign between tensor products of component states for subjects $S_j$, $S_k$. The states or vector components associating to these individual subjects $S_j$, $S_k$ are tracked by corresponding subscripts. As already hinted above, person skilled in the art will be aware that we are treating subjects as "indistinguishable" particles at this point in our quantum representation. The tensor space is based on the V-basis decomposition for each subject per "rentability" contextualization. Just to repeat, this is because of the known use of subject value matrix $PR_V$ by both subjects $S_j$, $S_k$ in contextualizing underlying proposition 107 about house 109r in terms of "rentability". The known contextualization in the case of each one of subjects $S_j$, $S_k$ has two eigenvalues corresponding to measurable indications "YES" and "NO".

The difference here is that we are now dealing with a joint symmetric state. This joint state inhabits tensor space $\mathcal{H}^{(Sh,Sj,Sk)}$ or rather its symmetric subspace. We use subscript SYM-V to remind ourselves of the fact that the space is a symmetric tensor space. In other words, the symmetric joint state between subjects $S_j$, $S_k$ takes on the general form expressed by $\Phi=|S_j\rangle \otimes |S_k\rangle = |S_j \otimes S_k\rangle_{SYM\text{-}V}$. The SYM-V subscript is also used on the complex coefficients alpha and beta to remind us that they are used in this decomposition of a symmetric joint quantum state.

The measurable indications collected in collapsing or measuring the joint state will come in pairs. Clearly, all possibilities will be covered with measurable indication pairs including: "YES", "YES"; "YES", "NO"; "NO", "YES" and "NO", "NO" for subjects $S_j$, $S_k$, respectively.

Recall, however, that due to the indistinguishable nature of subject states in the quantum representation adopted herein, it is not possible to label which state corresponds to which subject at initial time $t_o$. Only after the measurement is performed at a later time will we know how the subjects chose their "YES" and "NO" eigenvalues.

The additional point in this embodiment is that prior to entering the joint state the individual measurable indications for each subject are known. In other words, we know or can at the very least estimate from history and/or any other available data as discussed above, the measurable indications of subjects $S_j$, $S_k$ while still individuated. Again, since data modulo exact house 109r is likely unavailable (unless both subjects $S_j$, $S_k$, while not yet knowing that they are both potential bidders for renting house 109r expressed their measurable indications online or in real life and system 100 managed to collect these indications). In most cases data including opinions and even, if available, measured indications generated by subjects $S_j$, $S_k$ about comparable houses and propositions can be used.

We now start at an initial time $t_o$ at the bottom of time line 300. We consider real life events on the left and quantum representations on the right of time line 300. At initial time $t_o$ subjects $S_j$, $S_k$ realize that they are both confronting underlying proposition 107 about renting house 109r. This fact is indicated for illustration purposes only in a common internal space 110j & 110k. Their discovery of the fact may take place in real life or online within system 100 (see FIG. 2). The further fact that both subjects $S_j$, $S_k$ are B-E consensus type modulo proposition 107 about renting house 109r is also indicated in common internal space 110j & 110k.

On the right side of time line 300 we see a quantum representation of symmetric joint state $|S_j \otimes S_k\rangle_{SYM\text{-}V}$ that subjects $S_j$, $S_k$ contextualizing in terms of "rentability" can assume. This symmetric joint state is spectrally decomposed in eigenvectors $|sv_1\rangle$ and $|sv_2\rangle$ of subject value matrix $PR_V$ for each subject. The superposition is expressed as:

$$\Phi = |S_j \otimes S_k\rangle_{SYM\text{-}V} = 1/\sqrt{2}(|sv_1\rangle_{S_j} \otimes |sv_2\rangle_{S_k} + |sv_2\rangle_{S_j} \otimes |sv_1\rangle_{S_k}).$$

Eq. 23

For reasons of simplicity and clarity of explanation this expression presumes that subjects $S_j$, $S_k$ are the only two in group 700 confronted jointly by underlying proposition 107 about renting house 109r. It further presumes that subjects $S_j$, $S_k$ are not affected in their joint state by anything other than each other and proposition 107. In practical situations such entanglement may not be complete and other environmental effects may need to be taken into account. A person skilled in the art will know how to treat such imperfection when representing subjects $S_j$, $S_k$ with the aid of the well-known density matrix formalism.

In the present example subjects $S_j$, $S_k$ entangle with negligible environmental influences. Two Bloch spheres 10j, 10k illustrating their individual states with eigenvectors $|sv_1\rangle_{S_j}$, $|sv_2\rangle_{S_j}$ for subject $S_j$ in Bloch sphere 10j and $|sv_1\rangle_{S_k}$, $|sv_2\rangle_{S_k}$ for subject $S_k$ are shown to help in the visualization. Although shown separately, the reader is again cautioned that in joint states involving indistinguishable entities it is not possible to attach labels to these entities in advance of measurement.

The confrontation of subjects $S_j$, $S_k$ with house 109r where underlying proposition 107 concerns rent to thus induce the contextualization "rentability" and result in the joint state is not open-ended. Generation of the joint state and its persistence is bounded in time. Once achieved at initial time $t_o$ the joint state will have a tendency to decohere or dissociate with the passage of time. Based on physical rules on which the present quantum representation is based, the persistence of the joint state is associated with a decoherence time $\tau_D$ for subjects $S_j$, $S_k$. Preferably, this time is estimated by system 100 and further corroborated by the human curator.

In vernacular terms, decoherence time $\tau_D$ is directly related to how long, once in the joint state, subjects $S_j$, $S_k$ can remain in it. For example, to a skilled sales artisan versed with making sales it is known that once a couple or a larger group of subjects has been brought to the right collective state (herein joint state) any sales deal (herein measurement) has to be closed quickly (a.k.a. "striking while the iron is hot") or the opportunity will evaporate. In the quantum representation adopted herein, we specify that ideally much less time than one decoherence time $\tau_D$ should elapse between confirming that the joint state has been obtained and measuring the joint state to obtain any desired eigenvalues. As more and more decoherence times $\tau_D$ expire, the probability of subjects $S_j$, $S_k$ persisting in joint state typically keeps decaying exponentially.

FIG. 5B indicates that an event time $t_e$ at which measurement is made and measurable indications are obtained from subjects $S_j$, $S_k$ is well within a single decoherence time $\tau_D$ after initial time $t_o$. Thus, the measurement due to confrontation of subjects $S_j$, $S_k$ with underlying proposition 107 about renting house 109r is very likely made while subjects $S_j$, $S_k$ are in the joint state. For the present purposes, we will proceed under the assumption that the measurement or "collapse" of the wave function does indeed happen from the joint state. In the event that it does not, e.g., the state decoheres prior to measurement, then the subjects $S_j$, $S_k$ can be treated separately. Preferably, their new states should be established prior to doing so. The practitioner should refer here to the previous teachings on individual states.

At the time of event $t_e$ the symmetric joint state between subjects $S_j$, $S_k$ encodes for realization of all possible permutation of measurable indications from these two subjects. In other words, the symmetric joint state of Eq. 23 includes probabilities for measurable indications "YES" or "NO" from subject $S_j$ and "YES" or "NO" from subject $S_k$. The reader is encouraged to convince him or herself of this fact by computing $|\Phi|^2$.

In accordance with the quantum representation adopted herein, the measurable indications for subjects $S_j$, $S_k$ are equated to the eigenvalues that go with the eigenvectors in the tensor space. To keep better track, we take eigenvalues $\lambda_{Sj,1}$, $\lambda_{Sj,2}$ as those for subject $S_j$ ("YES", "NO" from subject $S_j$) and $\lambda_{Sk,1}$, $\lambda_{Sk,2}$ as those for subject $S_k$ ("YES", "NO" from subject $S_k$). They are all shown in a pre-measurement table 702 on the quantum representation side of time line 300 in FIG. 5B.

Table 702 reflects all possibilities before measurement or prior to event time $t_e$. We see that subjects $S_j$, $S_k$ could both yield the measurable indication "YES" meaning that they both want to rent house 109r. They could also both yield the measurable indication "NO" meaning that neither wants to rent house 109r. Finally, they could also manifest the two cases in which one or the other wants to rent ("YES" from one) and the other one does not want to rent ("NO"). Rather than computing these probabilities expressly, the fact that all of these outcomes are possible is indicated by check marks.

At event time $t_e$ a measurement is made and pre-measurement table 702 is no longer applicable. A post-measurement table 704 now reflects that in the present case the result was that both subjects $S_j$, $S_k$ yielded the measurable indication "YES" meaning that they both want to rent house 109r. On the real life events side of time line 300 this is reflected by subjects $S_j$, $S_k$ both agreeing and deciding to move in together into house 109r in hopes of living in joint harmony. Their ability to collapse into the same state was inherent in the symmetric joint state that they were able to assume as B-E consensus type subjects modulo proposition 107.

According to the invention, the step of collecting measurable indications $\lambda_{Sj,1}$, $\lambda_{Sj,2}$ for subject $S_j$ and $\lambda_{Sk,1}$, $\lambda_{Sk,2}$ for $S_k$ is performed by network monitoring unit 120. In the present case, this means that unit 120 has access to information generated by the subjects in question; here subjects $S_j$, $S_k$. For example, unit 120 belongs to a system that monitors transactions such as rentals and sales of real estate including house 109r. Examples of such systems are well known in the art of real estate brokerage and include systems built around the likes of Multiple Listing Services (MLS) and closed transaction records.

FIG. 5C shows another group 700' of subjects selected by mapping module 115 from among all available subjects $S_i$ in computer system 100 (see FIG. 2). In this example just two subjects, namely subjects $S_m$, $S_n$ are explicitly called out for explanatory purposes. Context 202 is again generated by underlying proposition 107 about house 109r. As before, the quantum representation is simple because all subjects selected into group 700' by mapping module 115 when under measurement precipitate as discrete, two-level states modulo underlying proposition 107 about house 109r. In addition, all subjects that are members of group 700' other than subjects $S_m$, $S_n$ manifest the B-E consensus statistic modulo proposition 107 about house 109r. These subjects could range in number from one to many and they are generally represented by Riemann Surface RS that has no twist (or has an integral twist).

Meanwhile, subjects $S_m$, $S_n$ exhibit the F-D anti-consensus statistic. In deploying Riemann surface RS' as a visualization aid we see the importance of the F-D anti-consensus statistic on the example of subjects $S_m$, $S_n$ in group 700'. Specifically, the way in which subjects $S_m$, $S_n$ apprehend underlying proposition 107 in their internal spaces 110m, 110n is encoded per our quantum representation in subject states $|S_m\rangle$, $|S_n\rangle$ as assigned in assignment module 116 along with their consensus types used during formal state creation by creation module 117 (see FIG. 2). In contrast subjects manifesting the B-E consensus type, the F-D anti-consensus of subjects $S_m$, $S_n$ in group 700' results in a fundamentally different situation.

In terms of the quantum representation subject states $|S_m\rangle$, $|S_n\rangle$ inhabit tensor space $\mathcal{H}^{(Sm,Sn)}=\mathcal{H}_{Sm} \otimes \mathcal{H}_{Sn}$ that cannot support a joint state in which both are evolving without impediment on the same Riemann surface RS'. That is because a quantum state cannot exhibit unitary evolution on Riemann surface RS' that evolves without producing a disruption due to the flip or sign change necessitated by the half-integral twist. This impediment is indicated by arrow TE' in FIG. 5C. The fact that there is an obstacle is also visually indicated by discontinuity DD in Riemann surface RS' for states $|S_m\rangle$, $|S_n\rangle$.

The strictly pedagogical visualization is reinforced by the black and white dots that "travel" with the quantum mechanical state representations visualized by the "balls". The dots indicate that the half-integral twist in Riemann surface RS' prevents the two states from being identical after completing one cycle or loop in travelling along RS'. States $|S_m\rangle$, $|S_n\rangle$ cannot "roll over each other" when confined to travel along surface RS' after just a single cycle. They thus cannot occupy the same quantum state somewhere along surface RS' vis-à-vis proposition 107 about house 109r without impediment. In fact, they turn into their opposites after one cycle! This is a fundamental structural impediment to the co-existence of subject states $|S_m\rangle$, $|S_n\rangle$ in Hilbert space $\mathcal{H}^{(Sm,Sn)}$ while occupying the same quantum state vis-à-vis proposition 107 about house 109r. Their joint state cannot be symmetric under this condition. The consequence, also called the Pauli Exclusion Principle, is that subjects $S_m$, $S_n$ exhibiting F-D anti-consensus statistic must occupy different states. A joint state composed of such F-D anti-consensus subjects has to be anti-symmetric. This is in analogy to fermions whose joint states are anti-symmetric.

We return to our exemplary case where subjects $S_m$, $S_n$ of group 700' are genuinely interested in underlying proposition 107 about house 109r. Their known contextualization of underlying proposition 107 about house 109r concerns "rentability". Moreover, they are confirmed to exhibit the F-D anti-consensus dynamic modulo proposition 107 about renting house 109r. The F-D anti-consensus statistic is explicitly indicated for these subjects along with their states $|S_m\rangle$, $|S_n\rangle$. To consider subject states $|S_m\rangle$, $|S_n\rangle$ jointly we introduced tensor space $\mathcal{H}^{(Sm,Sn)}=\mathcal{H}_{Sm} \otimes \mathcal{H}_{Sn}$. This space can hold any joint state that these two exemplary subject states may yield. In other words, any tensor state $|S_m\rangle \otimes |S_n\rangle$ that is among subjects $S_m$, $S_n$ modulo proposition 107 has to be in tensor space $\mathcal{H}^{(Sm,Sn)}$.

Knowledge of anti-consensus statistics F-D among subjects $S_m$, $S_n$ modulo proposition 107 tells us that whatever joint state obtains it must be anti-symmetric. Components of any legitimate joint state $\Psi=|S_m\rangle \otimes |S_n\rangle$ for F-D anti-consensus subjects $S_m$, $S_n$ will interchange with a "−" sign. An anti-symmetric joint state resides in the anti-symmetric subspace of $\mathcal{H}^{(Sm,Sn)}$.

Again, it may be difficult to discern such competitive dynamic among subjects $S_m$, $S_n$ modulo underlying proposition 107 about house 109r or the need for an anti-symmetric joint state from data files 112 and communications found in traffic propagating via network 104 and within social network 106. Therefore creation module 117 has to review data files 112 as well as any communications originated by and/or passed between subjects $S_m$, $S_n$ and containing indications exhibited in situations where both were present and were confronted by propositions as close as possible to proposition 107 about house 109r. The prevalence of "big data" as well as "thick data" that subjects produce in self-reports is again very helpful. The human curator that understands the lives of both subjects $S_m$, $S_n$ should preferably exercise their intuition in reviewing and approving the proposed F-D anti-consensus statistic for each subject modulo proposition 107 about house 109r.

All subjects exhibiting the B-E consensus statistic and generally represented by Riemann surface RS in FIG. 5C are assigned to symmetric state(s). It is duly noted that all B-E subjects may need to be represented by some partition of sub-groups and their symmetric states rather than a single symmetric state. A person skilled in the art will be familiar with the methods for handling such partitioning or factorization. This applies both to group 700 and to group 700' (see L. D. Landau and E. M. Lifshitz, "Quantum Mechanics (Non-relativistic Theory)" op. cit.).

No outcome state in the symmetric subspace is excluded or unavailable to B-E consensus subjects embedded within group 700' even when another B-E consensus subject collapses to it. In fact, as is known from physics on which the present quantum representation is based, B-E entities show a propensity to bunch under appropriate conditions (e.g., low energy/temperature). In other words, B-E consensus subjects are prone to falling into the exact same state. They tend to follower or conformist behaviors. Riemann surface RS can therefore also be taken to stand for a possible large sub-group of subjects that can all assume the same state of mutual agreement. This is exactly the opposite of the F-D anti-consensus subjects. No conditions will induce these kinds of subjects to fall into the same state and thus yield the same measurable indication. They tend to disruptive behaviors, especially in the presence of other F-D anti-consensus subject(s) vying for the same state modulo underlying proposition 107.

The reader is cautioned against extending this reasoning unduly in light of the physical basis of the present quantum representation. Under certain conditions a pair and more generally an even number of F-D anti-consensus subjects may join into a single composite (composite boson). Such composite behaves just like a boson from a point sufficiently far removed from underlying proposition 107 around which the composite precipitated. This means, for example, that a pair of F-D anti-consensus subjects may form a composite that exhibits the B-E consensus statistic beyond proposition 107. The physical basis for this behavior is found, e.g., in the formation of Cooper pairs or BCS pairs responsible for superconductivity at low temperatures. It is preferred that the human curator be involved in assessing the potential for the formation of composite B-E consensus entities from individual F-D anti-consensus subjects. In the following we presume that the situations are not conducive to the formation of composite bosons.

Figure 5D:
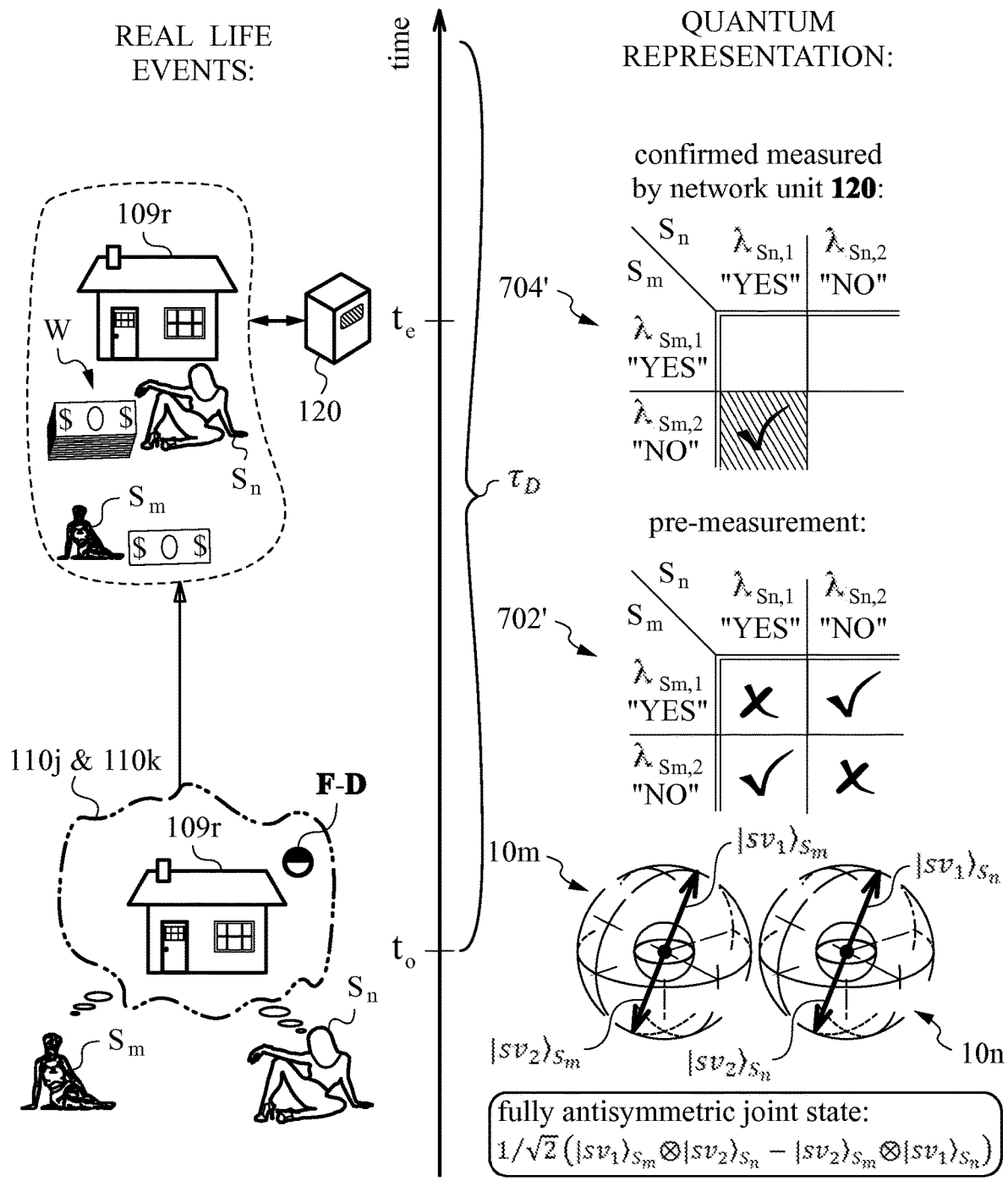
FIG. 5D is a diagram depicting possible measurement results given a joint anti-symmetric state between the two F-D anti-consensus subjects from the group of FIG. 5C.

To examine the anti-symmetric state available to F-D anti-consensus subjects $S_m$, $S_n$ of group 700' we consult the diagram in FIG. 5D. This figure illustrates the quantum representation of real life events involving subjects $S_m$, $S_n$. Salient aspects of the corresponding quantum representation are shown on the right of time line 300. Similarly, salient aspects of real life events involving subjects $S_m$, $S_n$ are shown on the left of time line 300. Real life events and the quantum representation are temporally synced. Time increases in the up direction.

At the top of FIG. 5D we see the general expression for an anti-symmetric joint state containing the aforementioned "−" sign between tensor products of component states for subjects $S_m$, $S_n$. The states or vector components associating to these individual subjects $S_m$, $S_n$ are tagged by corresponding subscripts. We are continuing to treat subjects as "indistinguishable" particles in this representation. The tensor space is based on the V-basis decomposition for each subject per "rentability" contextualization. This is because of the known use of subject value matrix $PR_V$ by both subjects $S_m$, $S_n$ in contextualizing underlying proposition 107 about house 109r in terms of "rentability". The known contextualization in the case of each one of subjects $S_m$, $S_n$ has two eigenvalues corresponding to measurable indications "YES" and "NO".

The joint state inhabits anti-symmetric subspace of tensor space $\mathcal{H}^{(Sm,Sn)}$. We use subscript ASM-V to remind ourselves of the fact that the space is an anti-symmetric tensor space. In other words, the anti-symmetric joint state between subjects $S_m$, $S_n$ takes on the general form expressed by $\Psi = |S_j\rangle \otimes |S_k\rangle = |S_j \otimes S_k\rangle_{ASM-V}$. The ASM-V subscript is also used on the complex coefficients alpha and beta to remind us that they are used in this decomposition of the anti-symmetric joint quantum state.

The measurable indications collected in collapsing or measuring anti-symmetric joint state $\Psi$ will come in pairs. Unlike in the case of the symmetric joint state $\Phi$, not all of the possibilities will be covered this time. The only measurable indication pairs will include: "YES", "NO" and "NO", "YES" for subjects $S_m$, $S_n$, respectively. Recall, however, that the indistinguishable nature of subject states in this quantum representation precludes labeling of subjects at initial time $t_o$. Only after the measurement is performed at a later time will we know how the subjects chose their "YES" and "NO" eigenvalues.

Once again, prior to entering the joint state the individual measurable indications for each subject are known. We know or can at the very least estimate from history and/or any other available data as discussed above, the measurable indications of subjects $S_m$, $S_n$ while still individuated. Since data modulo exact house 109r is likely unavailable (unless both subjects $S_m$, $S_n$, while not yet knowing that they are both potential bidders for renting house 109r expressed their measurable indications online or in real life and system 100 managed to collect these indications). In most cases data including opinions and even, if available, measured indications generated by subjects $S_m$, $S_n$ about comparable houses and propositions can be used.

We now start at an initial time $t_o$ at the bottom of time line 300. We consider real life events on the left and quantum representations on the right of time line 300. At initial time $t_o$ subjects $S_m$, $S_n$ realize that they are both confronting underlying proposition 107 about house 109r in common contextualization of "rentability". This is illustrated with a common internal space 110m & 110n. Their discovery of the fact may take place in real life or online within system 100 (see FIG. 2). The further fact that both subjects $S_m$, $S_n$ are F-D anti-consensus type modulo proposition 107 about renting house 109r is also indicated in common internal space 110m & 110n.

On the right side of time line 300 we see a quantum representation of anti-symmetric joint state $|S_j \otimes S_k\rangle_{ASM-V}$ that subjects $S_m$, $S_n$ exhibiting "rentability" as their contextualization can assume. This anti-symmetric joint state is decomposed in eigenvectors $|sv_1\rangle$ and $|sv_2\rangle$ of subject value matrix $PR_V$ for each subject. The superposition is expressed as:

$$\Psi = |S_m \otimes S_n\rangle_{ASM-V} = 1/\sqrt{2}(|sv_1\rangle_{S_m} \otimes |sv_2\rangle_{S_n} - |sv_2\rangle_{S_m} \otimes |sv_1\rangle_{S_n}). \qquad \text{Eq. 24}$$

This expression presumes that subjects $S_m$, $S_n$ are the only two in group 700' confronted jointly by underlying proposition 107 about renting house 109r. It further presumes that subjects $S_m$, $S_n$ are not affected in their joint state by anything other than each other and proposition 107. As in the case of B-E consensus subjects discussed previously, such entanglement may not be complete and other environmental effects may need to be taken into account. A person skilled in the art will know how to deploy the density matrix formalism to account for such imperfections. In the present example subjects $S_m$, $S_n$ entangle with negligible environmental influences. Bloch spheres 10m, 10n for individual states with eigenvectors $|sv_1\rangle_{S_m}$, $|sv_2\rangle_{S_m}$ for subject $S_m$ and $|sv_1\rangle_{S_n}$, $|sv_2\rangle_{S_n}$ for subject $S_n$ are shown as an aid.

The confrontation of subjects $S_m$, $S_n$ with underlying proposition 107 about house 109r in the "rentability" context will not result in a permanent joint state $\Psi$. Its persistence is bounded in time, just as in the case of the symmetric joint state $\Phi$. The durability of state $\Psi$ depends on decoherence time $\tau_D$ for subjects $S_m$, $S_n$. As above, this time for subjects $S_m$, $S_n$ is preferably estimated by system 100 and further corroborated by the human curator.

FIG. 5D indicates that an event time $t_e$ at which measurement is made and measurable indications are obtained from subjects $S_m$, $S_n$ is within a single decoherence time $\tau_D$ after initial time $t_o$, as was the case for B-E type subjects $S_j$, $S_k$ shown in FIG. 5B. Thus, the measurement due to confrontation of subjects $S_j$, $S_k$ with underlying proposition 107 about renting house 109r is very likely made while subjects $S_m$, $S_n$ are in their joint state $\Psi$; i.e., the measurement or "collapse" happens to joint wave function $\Psi$. In the event that it does not, e.g., the state decoheres prior to measurement, then subjects $S_m$, $S_n$, and more precisely their quantum states can be treated separately, as discussed above.

At the time of event $t_e$ the anti-symmetric joint state $\Psi$ between subjects $S_m$, $S_n$ encodes for realization of just two possible permutations of measurable indications from the subjects. In other words, the anti-symmetric joint state of Eq. 24 admits of only two possible pairs of measurable indications. The first is a "YES" from subject $S_m$ with a contemporaneous "NO" from subject $S_n$. The second is a "NO" from subject $S_m$ and a "YES" from subject $S_n$. There is no possibility for subjects $S_m$, $S_n$ agreeing on either "YES" or "NO" contained in joint state $\Psi$. The reader is encouraged to compare $|\Psi|^2$ with $|\Phi|^2$ to better understand this fundamentally different set of possibilities between symmetric and anti-symmetric wave functions.

The present quantum representation equates measurable indications for subjects $S_m$, $S_n$ with the eigenvalues that go with the eigenvectors in tensor space $\mathcal{H}^{(Sm,Sn)}$. As before, we take eigenvalues $\lambda_{Sm,1}$, $\lambda_{Sm,2}$ as those for subject $S_m$ ("YES", "NO" from subject $S_m$) and $\lambda_{Sn,1}$, $\lambda_{Sn,2}$ as those for subject $S_n$ ("YES", "NO" from subject $S_n$). They are all shown in a pre-measurement table 702' on the quantum representation side of time line 300 in FIG. 5D.

Table 702' reflects all possibilities before measurement or prior to event time $t_e$. We see that subjects $S_m$, $S_n$ could never both yield the measurable indication "YES" meaning that they both want to rent house 109r. The same is true of measurable indication "NO". The cross marks on the diagonal entries of table 702' indicate this fact. Subjects $S_m$, $S_n$ can only manifest the two cases in which one or the other wants to rent ("YES" from one) and the other one does not want to rent ("NO"). The probabilities are not expressly computed. The possible outcomes are instead indicated by check marks in table 702'.

At event time $t_e$ measurable indications are collected from subjects $S_m$, $S_n$ by network monitoring unit 120. At this point, pre-measurement table 702' no longer applies due to wave function "collapse". A post-measurement table 704' now reflects that in the present case the result was that subject $S_n$ yielded the measurable indication "YES" and subject $S_m$ yielded the measurable indication "NO".

In the particular case at hand, the subjects assumed the two different states modulo proposition 107 after exhibiting strife typical of two competing F-D anti-consensus subjects. In other words, the measurable indications were not merely responses of "YES" and "NO". Instead, subject $S_n$ has exhibited eigenvalue $\lambda_{Sn,1}$ in terms of a real-valued parameter W indicating that they want to rent house 109r. Meanwhile, subject $S_m$ yielded eigenvalue $\lambda_{Sm,2}$ also in terms of real-value parameter W. This produced a competitive bidding situation typical of a winner and loser type dynamic.

On the real life events side of time line 300 the competition is reflected by subjects $S_m$, $S_n$ expressing their measurable indications in differing amounts of money, which embodies the real-valued parameter W in the present example. As has been addressed in U.S. patent application Ser. No. 14/504,435, measurable indications in the quantum representation of the invention can generally be expressed by means of any suitable real-valued parameter W or quantity. The latter can be denominated in a physical quantity or some socially accepted quantity accepted by the subjects in question. Convenient socially accepted real-valued parameters include money as used herein. Indeed, the presentation of more money W by subject $S_n$ is a legitimate step in a competitive bidding for rent of house 109r between F-D anti-consensus subjects $S_m$, $S_n$. This process assures that only one will rent house 109r, thus proving out the F-D anti-consensus dynamic.

Of course, in the simple two-level case subjects $S_m$, $S_n$ could have manifested their F-D anti-consensus modulo proposition 107 by one saying "YES" and renting house 109r and the other one saying "NO" and not renting it. The "YES" and "NO" would here be the mutually exclusive responses in accordance with the quantum representation. In fact, the subject that is a "NO" may not even articulate their eigenvalue under some conditions. This lack of eigenvalue may sometimes obscure the F-D anti-consensus type of subjects modulo a proposition. The human curator should be involve in such cases to discern where lack of measurable indications should not be mistakenly taken to indicate the B-E consensus statistic.

The simple "YES", "NO" discrete two-level precipitation type of subjects $S_m$, $S_n$ is easiest to handle. In fact, such simple cases lend themselves to the use of qubits. The present invention can, however, be extended to cases with many more levels and even to continuous cases (see FIG. 3B). In such cases many different eigenvalues can be manifested by subjects $S_m$, $S_n$. These different eigenvalues can be discrete or they can reside within a continuous range. Differing amounts of money W in which eigenvalues $\lambda_{Sn,1}$, $\lambda_{Sm,2}$ manifest in the present example qualify as legitimate members of a range of discrete values. The skilled artisan is reminded that different eigenvalues typically associate with different eigenvectors (see degeneracy and related topics for completeness).

The actual collection of measurable indications is performed by network monitoring unit 120 that has access to information generated by subjects $S_m$, $S_n$. Unit 120 may yet again belong to a system that monitors transactions such as rentals and sales of real estate including house 109r. Alternatively, unit 120 can be a dedicated component of computer system 100 (see FIG. 2) into which the landlord inputs the outcome of the bidding. Of course, this information can be used in later tracking, detecting perturbations and/or simulation runs involving subjects $S_m$, $S_n$.

In view of the above it will be appreciated that perturbations to group dynamics can be caused by the injection into the group of as few as one F-D anti-consensus subject modulo a given underlying proposition 107. There are several mechanisms that can result in the perturbation. The first mechanism may involve the formation of anti-symmetric joint states $\Psi$ with other F-D anti-consensus subject(s) already in the group. This mechanism will exclude certain outcomes in principle due to the Pauli Exclusion Principle (refer to table 702' of FIG. 5D). The second mechanism is due to the injected F-D anti-consensus subject neutralizing another F-D subject in the group through the formation of a composite boson. The third mechanism is due to the F-D anti-consensus subject contextualizing underlying proposition 107 differently from all the subjects in the group. Such differently-minded F-D subject can perturb the contextualization deployed by the entire group if the group is influenced by the injected F-D subject. This will hold if the injected F-D subject is recognized as important by subjects in the group and shares their differing contextualization with the group.

It is duly noted that injection of a vocal and socially important B-E consensus subject into a group can also produce perturbation. A B-E subject can voice their differing contextualization of underlying proposition 107 and, given certain conditions, perturb the contextualization of the entire group. Still, larger disruption is usually achieved by adding F-D anti-consensus subjects rather than B-E types. The latter, in many cases are likely to just join all the previous B-E types in a state of mutual agreement.

Given the above, we remain interested in the perturbation due to injection of F-D anti-consensus subject(s) into the group. Of course, it is possible that the injected F-D anti-consensus subject produces no perturbation at all. It is also possible that other mechanism(s) either related to spin statistics (e.g., fractional statistics) of the group or the overall environment and/or ranges of validity (e.g., phase transitions) of the quantum representation will contribute to the perturbation. Because of the possibility of other more highly complex mechanisms in addition to the three mentioned above to generate the overall perturbation it is most practical to simply study the perturbation based on its effects. In other words, by comparing known measurable indications obtained in the known contextualizations from subjects prior to F-D subject injection with subsequent measurable indications obtained after injection.

Figure 6:
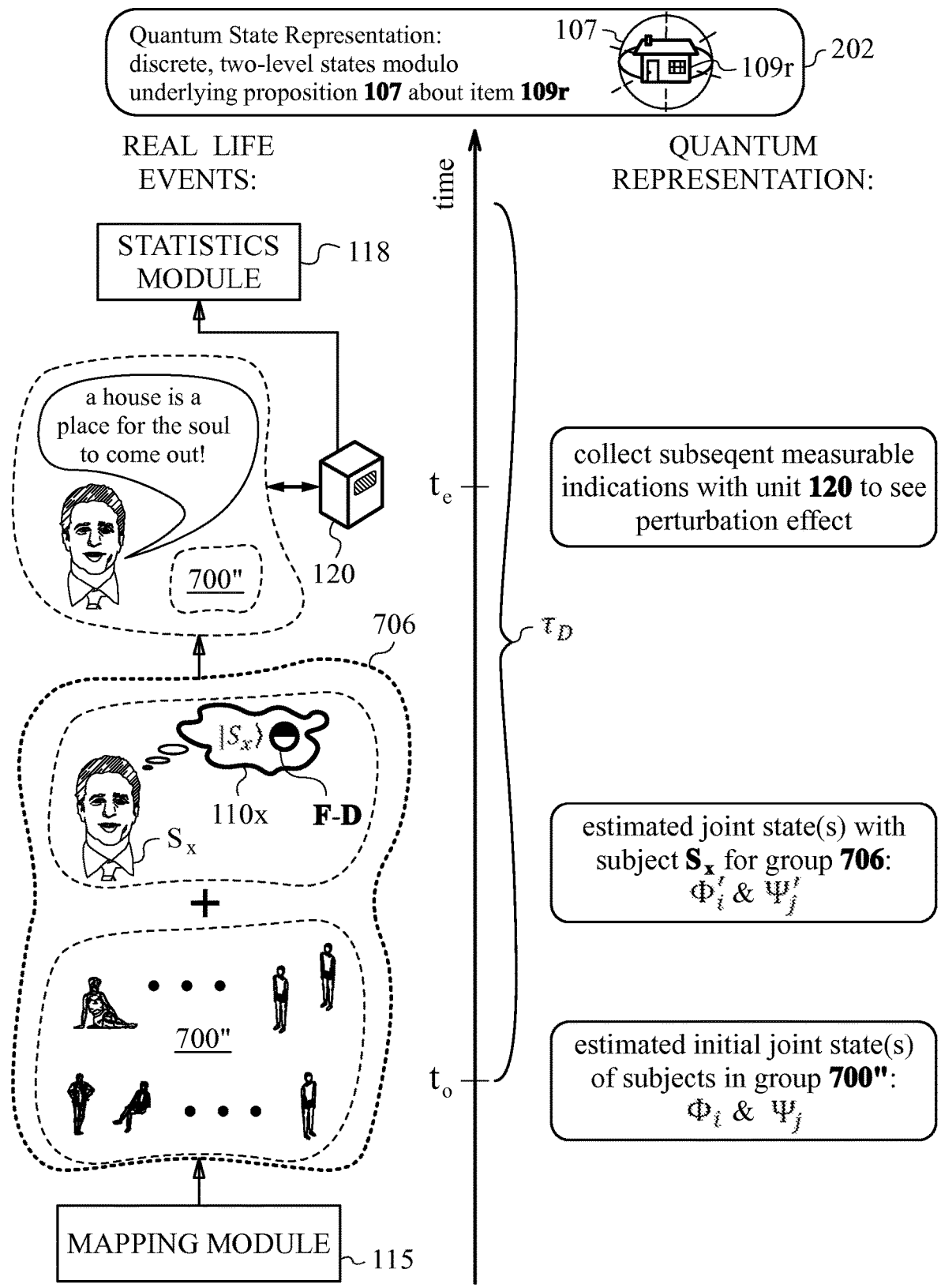
FIG. 6 is a diagram illustrating the perturbation introduced into a group by injection of a disruptive subject exhibiting the F-D anti-consensus statistic.

FIG. 6 illustrates an exemplary situation in which an F-D anti-consensus subject $S_x$ is added or injected into a group 700" comprised of B-E consensus subjects and F-D anti-consensus subjects. F-D anti-consensus subject $S_x$ is indicated as such in their internal space 110x along with their quantum state $|S_x\rangle$ for illustrative purposes. The new group that subsumes subject $S_x$ and former group 700" is designated by reference numeral 706. Note that mapping module 115 is in charge of selecting group 700" and subject $S_x$ to be injected. The addition or injection occurs at an initial time $t_o$ on time line 300.

The act of injection into group 706 can be performed by direct introduction via network 104, social network 106 or even in real life (e.g., at an event) of disruptive subject $S_x$. In the interpretation adopted herein, subject $S_x$ qualifies as disruptive because they exhibit an F-D anti-consensus statistic modulo the underlying proposition that provides context 202, as indicated at the top of FIG. 6. In advantageous embodiments disruptive subject $S_x$ is a leader recognized by group 700" of subjects selected by mapping module 115. A leader, in the sense of the present invention, is to be understood broadly as a subject that is noticeable to group 706 (700") such that their injection affects group 706. For example, disruptive subject $S_x$ can be a leader in a known endeavor and may include a sports figure, a celebrity, a media personage, an opinion leader, a thought leader, a market leader, a political leader or a spiritual leader.

In certain embodiments computer system 100 may have specific resources, e.g., visualization component(s) and/or venue scheduling coordination functions, for injecting disruptive subject $S_x$ into group 706 in the most "natural way". Whatever the injection mechanism used by computer system 100, it has to perform its task in a manner that ensures that group 700" accepts the disruptive subject as part of the new group 706. The reason for this is that the perturbation we are interested in herein results when group 706 actually recognizes or becomes convinced that disruptive subject $S_x$ is one of its members.

On the quantum representation side of time line 300 we note that estimates of joint states of subjects in group 700" are made at initial time $t_o$. Since group 700" in this example has both F-D and B-E type subjects the estimates include symmetric and anti-symmetric wave functions. Symmetric ones are designated by $\Phi_i$ (where i=1 ... m, and m is the total number of symmetric wave functions) and anti-symmetric ones are designated by $\Psi_j$ (where j=1 ... n, and n is the total number of anti-symmetric wave functions).

As noted above, a person skilled in the art will know the proper symmetrization, anti-symmetrization and factoring procedures to posit all wave functions $\Phi_i$ and $\Psi_j$ that need to be considered. Good estimates will generally be obtained for small groups whose subjects are well characterized from "thick data". On the other hand, when group 700" is large and/or not enough "thick data" is available in network 104 and/or social network 106 about its member subjects (see FIG. 2) then the estimates are likely to be rough or even very rough.

The injection of F-D subject $S_x$ causes a re-evaluation of the estimated states to obtain new estimated states $\Phi_i'$ and $\Psi_j'$. It is duly noted that the number of states of either type (symmetric and anti-symmetric) can change at this stage.

To illustrate several of the possible mechanisms for perturbation, we note that subject $S_x$ in known to practice a disparate contextualization of underlying proposition 107 about house 109r. In other words, subject $S_x$ does not view underlying proposition 107 about house 109r in the known contextualization of "rentability" used by subjects of group 700". Instead, subject $S_x$, is a sensitive person and believes in contextualizing by "spirituality".

This most likely contextualization of underlying proposition 107 about house 109r by "spirituality" practiced by subject $S_x$ is not compatible in the Heisenberg sense with the "rentability" contextualization expressed with subject value matrix $PR_V$. The "spirituality" contextualization is expressed with a secondary subject value matrix $PR_{SV}$ whose eigenvectors are orthogonal to those of subject value matrix $PR_V$. Although it is clear that contextualizing by "spirituality" and by "rentability" typically cannot be applied simultaneously in agreement with the Heisenberg sense of non-commutability, the relationship should nevertheless be confirmed. In other words, commutator algebra should be used to obtain the best possible estimate of the relationship between subject value matrix $PR_V$ and secondary subject value matrix $PR_{SV}$.

Subject $S_x$ may affect group 706 via several of the mechanisms mentioned above. These include swaying members of group 700" to adopt his contextualization of "spirituality" modulo underlying proposition 107. In the present example, subject $S_x$ holds sway or influence with subjects of group 700" due to their prominence in religious life. For this reason, subject $S_x$ is capable of being disruptive on a large scale. At a public rally taking place at an event time $t_o$ within a single decoherence time $\tau_D$ for group 706 we find subject $S_x$ voicing their belief to group 700".

At or after the speech, network monitoring unit 120 uses its access to information about all subjects in group 706, i.e., the subjects in group 700" and disruptive subject $S_x$. Specifically, unit 120 collects from group 706 as many subsequent measurable indications as available. The exact manner in which unit 120 performs this function may be the same as it used in the past to collect the now known measurable indications from subjects of group 700". In other words, the subsequent measurable indications are collected clearly after injecting disruptive subject $S_x$ and upon re-confronting the subject(s) of group 706 with underlying proposition 107 about house 109r (not shown in FIG. 6). Thus collected subsequent measurable indications can be compared with the known measurable indications valid at initial time $t_o$ to determine the effects of perturbation.

In the preferred embodiment statistics module 118 is connected to unit 120. Module 118 reviews known and subsequent measurable indications to detect the perturbation to the known contextualization of "rentability". The known contextualization of "rentability" was, of course, the original one adopted modulo underlying proposition 107 about house 109r by subjects in group 700". Furthermore, the subjects in group 700" originally exhibited known measurable indications in the known contextualization of "rentability". This means that they were originally described by eigenvectors of subject value matrix $PR_V$ assigned by assignment module 116 (see FIG. 2). These eigenvectors were confirmed by eigenvalues representing the known measurable indications previously collected from the subjects picked into group 700" by mapping module 115. Under these circumstances, the perturbation in group 706 due to disruptive subject $S_x$ can be detected by statistics module 118 from the comparison of initial and known eigenvalues and the newly collected subsequent eigenvalues in a rather straightforward manner.

In case the speech of disruptive subject $S_x$ is maximally effective it influences all subjects in group 706 to switch from contextualization by "rentability" to contextualization by "spirituality". This means that the states of all subjects in group 706 become eigenvectors of secondary subject value matrix $PR_{SV}$. These eigenvectors are not the same as those of subject value matrix $PR_V$. In fact, they are possibly even completely orthogonal (ensure confirmation by commutator algebra) to those of subject value matrix $PR_V$. Thus, according to the quantum representation, subsequent measurable indications that are extracted from subjects in group 706 in the original contextualization of "rentability" should be different. Indeed, if subject value matrices $PR_V$ and $PR_{SV}$ were found to not commute at all (yielding the largest commutator value possible), the eigenvalues in contextualization by "rentability" should become entirely random. In other words, all subjects in group 706 will exhibit in the comparison made by statistics module 118 a 50%/50% chance of again picking their previous known measurable indication in the known contextualization.

Preferably, statistics module 118 proceeds further and estimates a change in the quantum representation of group 706 due to the perturbation created by disruptive subject $S_x$ that exhibits the F-D anti-consensus statistic. If the commutator of subject value matrices $PR_V$ and $PR_{SV}$ was previously determined then this step will be easily implemented by those skilled in the art. In the process of estimating the change in the quantum representation it is desirable to present group 706 with at least one additional proposition after event time $t_e$ (not shown in FIG. 6).

It is particularly advantageous to select any given additional proposition to be incompatible with underlying proposition 107 in the quantum sense. Most effective, is any additional proposition that induces in group 706 secondary subject value matrix $PR_{SV}$ that stands for contextualization by "spirituality". This is true, of course, if secondary subject value matrix $PR_{SV}$ was indeed confirmed by commutator algebra to be incompatible with subject value matrix $PR_V$. Otherwise, secondary subject value matrix should be appropriately selected with the aid of commutator algebra.

The additional proposition should induce the incompatible contextualization. Thus, subjects will yield their measurable indications as eigenvalues of secondary subject value matrix $PR_{SV}$. They will judge house 109r in the context of "spirituality". To ensure that this is true, the eigenvalues should preferably be collected in conjunction with questions asking the subjects to articulate their contextualization. Clear identification of their measurable indications or eigenvalues in the new contextualization by "spirituality" will corroborate that the disruptive subject $S_x$ has successfully swayed the subjects to adopt eigenvectors of secondary subject value matrix $PR_{SV}$ as their new states.

The methods and systems of invention extend beyond perturbing known contextualizations practiced by groups of subjects. They include tracking, detecting and simulating the effects of such perturbations to contextualizations exhibited or experienced by subjects. Furthermore, in many practical cases a more complete quantum representation of all subjects is deployed by assignment module 117 with density matrices. These will enable the practitioner to detect, track and simulate perturbations when subject states are mixed. On the other hand, in the case of reasonably pure states the state vector representation used throughout the teachings for clarity of explanation can be retained.

In the preferred embodiment of the invention, disruptive subject $S_x$ exhibiting the F-D anti-consensus statistic modulo underlying proposition 107 is introduced or exposed to group 700" within network 104. Doing this allows the practitioner to make effective use of the resources of system 100. These include any visualization components (e.g., screens) and other apparatus facilitating presentations to groups and/or online social introductions. Alternatively, disruptive subject $S_x$ exhibiting the F-D anti-consensus statistic modulo underlying proposition 107 is introduced or exposed to the group is real life, i.e., at an event held at a certain venue and specified time.

A computer system according to the invention is designed for detecting the perturbation to known contextualization of underlying propositions. Underlying proposition 107, as already indicated above, is typically about item 109 that includes one or more subjects, objects and/or experiences. Some of the more typical items are contained in inventory 130 shown in FIG. 3A and discussed above. That list, however, is not exhaustive and should not be construed as limiting on the present invention.

In some embodiments of the invention, the disruptive subject can be selected by computer system 100 using a specific selection mechanism and/or any one or more of its modules instead of mapping module 115. This could include any of the modules that make random selection(s), e.g., random event mechanism 124. Such random choice of disruptive subject can be useful in simulations rather than any specific determinations of perturbation to selected groups of subjects. For example, the stability of a group under injection of various types of disruptive subject(s) can be examined in this manner.

It will be evident to a person skilled in the art that the present invention admits of various other embodiments. Therefore, its scope should be judged by the claims and their legal equivalents.

The invention claimed is:

1. A computer implemented method of detecting a perturbation to a known contextualization of an underlying proposition about an item, said method comprising:

a) selecting, using a mapping module of a computer system, (i) a group of at least one subject exhibiting said known contextualization and a known measurable indication in said known contextualization of said underlying proposition about said item and (ii) a disruptive subject exhibiting an anti-consensus statistic modulo said underlying proposition about said item;

b) performing by an assignment module of said computer system the steps of (i) assigning a subject state $|S\rangle$ associated with an internal state of each of said at least one subject and said disruptive subject related to said underlying proposition, (ii) assigning a subject value matrix $PR_V$ used by said group in said known contextualization, where an eigenvalue of said subject value matrix $PR_V$ corresponds to said known measurable indication, and (iii) estimating joint states of subjects in said group related to said underlying proposition based said subject state $|S\rangle$ assigned;

c) injecting into said group said disruptive subject exhibiting said anti-consensus statistic modulo said underlying proposition about said item in a manner that ensures said group accepts said disruptive subject as a member of said group, d) collecting, using a network monitoring unit configured to capture and process data from data files of large numbers of subjects connected to a network, at least one subsequent measurable indication from said group after said step of injecting said disruptive subject and upon re-confronting said group with said underlying proposition;

e) performing, by said assignment module of said computer system, a re-evaluation of the estimated joint states of subjects in said group related to said underlying proposition to obtain new estimated states; and f) performing, by a statistics module of said computer system, an analysis of said known and said at least one subsequent measurable indications to detect said perturbation to said known contextualization of said underlying proposition about said item, wherein said subject state of said group, said subject state of said at least one subject, said disruptive subject, said estimated joint states, said known contextualization, said known measurable indication, and said at least one subsequent measurable indication are each in a quantum representation.

2. The computer implemented method of claim 1, further comprising the step of detecting by a statistics module said perturbation to said known contextualization of said underlying proposition about said item by said group through comparing said known measurable indication with said at least one subsequent measurable indication.

3. The computer implemented method of claim 2, further comprising estimating by said statistics module a change in said quantum representation of said group due to said perturbation.

4. The computer implemented method of claim 3, wherein said quantum representation comprises a density matrix.

5. The computer implemented method of claim 3, wherein said step of estimating further includes presenting at least one additional proposition about said item to said group.

6. The computer implemented method of claim 5, wherein said at least one additional proposition about said item is chosen to be incompatible with said underlying proposition about said item such that it induces in said group a secondary subject value matrix $PR_{V'}$ that does not commute with said subject value matrix $PR_V$.

7. The computer implemented method of claim 1, wherein said disruptive subject exhibiting said anti-consensus statistic modulo said underlying proposition about said item is exposed to said group within said network.

8. The computer implemented method of claim 1, wherein said disruptive subject exhibiting said anti-consensus statistic modulo said underlying proposition about said item is exposed to said group in real life.

9. The computer implemented method of claim 1, wherein said item is selected from the group consisting of a subject, an object and an experience.

10. A computer system for detecting a perturbation to a known contextualization of an underlying proposition about an item, said computer system comprising:

a) a mapping module for selecting (i) a group of at least one subject exhibiting said known contextualization of said underlying proposition about said item and a known measurable indication in said known contextualization and (ii) a disruptive subject exhibiting an anti-consensus statistic modulo said underlying proposition about said item;

b) an assignment module for performing the steps of (i) assigning a subject state $|S\rangle$ associated with an internal state of each of said at least one subject and said disruptive subject related to said underlying proposition, (ii) assigning a subject value matrix $PR_V$ used by said group in said known contextualization, where an eigenvalue of said subject value matrix $PR_V$ corresponds to said known measurable indication, (iii) estimating joint states of subjects in said group related to said underlying proposition based said subject state $|S\rangle$ assigned, and (iv) re-evaluating the estimated joint states of subjects in said group related to said underlying proposition to obtain new estimated states;

c) an injection mechanism for injecting into said group said disruptive subject exhibiting said anti-consensus statistic modulo said underlying proposition about said item in a manner that ensures said group accepts said disruptive subject as a member of said group;

d) a network monitoring unit configured to capture and process data from data files of large numbers of subjects connected to a network for collecting at least one subsequent measurable indication in response to said underlying proposition from said group after said disruptive subject exhibiting said anti-consensus statistic is injected into said group and upon said group being re-confronted with said underlying proposition; and e) a statistics module for performing an analysis of said known and said at least one subsequent measurable indications to detect said perturbation to said known contextualization of said underlying proposition about said item, wherein said subject state of said group, said subject state of said at least one subject, said disruptive subject, said estimated joint states, said known contextualization, said known measurable indication, and said at least one subsequent measurable indication are each in a quantum representation.

11. The computer system of claim 10, further comprising a statistics module for detecting said perturbation to said known contextualization of said underlying proposition about said item by said group through comparing said known measurable indication with said at least one subsequent measurable indication.

12. The computer system of claim 10, wherein said disruptive subject exhibiting said anti-consensus statistic modulo said underlying proposition is selected from a set of leaders recognized by said group.

13. The computer system of claim 12, wherein said set of leaders is selected from the group consisting of sports figures, celebrities, media personages, opinion leaders, thought leaders, market leaders, political leaders and spiritual leaders.

14. The computer system of claim further comprising said network and wherein said disruptive subject exhibiting said anti-consensus statistic modulo said underlying proposition is exposed to said group within said network.

15. The computer system of claim 14, wherein said network is selected from the group consisting of the Internet, the World Wide Web, a Wide Area Network (WAN) and a Local Area Network (LAN).

16. The computer system of claim 14, wherein said group comprises members of a social group.

17. The computer system of claim 16, wherein said social group is selected from any one or more of the group of social networks consisting of Facebook, LinkedIn, Google+, MySpace, Instagram, Tumblr, YouTube.

18. The computer system of claim 16, wherein said social group manifests an affiliation with one or more product sites selected from the group consisting of Amazon.com, Walmart.com, bestbuy.com, Groupon.com, Netflix.com, iTunes, Pandora and Spotify.

19. The computer system of claim 10, wherein said item is selected from the group consisting of a subject, an object and an experience.

20. An apparatus comprising:
a mapping circuit configured to (a) select a group of at least one subject exhibiting (i) a known contextualization of an underlying proposition about an item and (ii) a known measurable indication in said known contextualization and (b) a disruptive subject exhibiting an anti-consensus statistic modulo said underlying proposition about said item;

an assignment circuit configured to (i) assign a subject state $|S\rangle$ associated with an internal state of each of said at least one subject and said disruptive subject related to said underlying proposition, (ii) assign a subject value matrix $PR_V$ used by said group in said known contextualization, wherein an eigenvalue of said subject value matrix $PR_V$ corresponds to said known measurable indication, (iii) estimate joint states of subjects in said group related to said underlying proposition based said subject state $|S\rangle$ assigned, and (iv) re-evaluate the estimated joint states of subjects in said group related to said underlying proposition to obtain new estimated states;

a network monitoring circuit configured to capture and process data from data files of large numbers of subjects connected to a network for collecting at least one subsequent measurable indication in response to said underlying proposition from said group after said disruptive subject exhibiting said anti-consensus statistic is injected into said group in a manner that ensures said group accepts said disruptive subject as a member of said group; and a statistics module configured to analyze said known and said at least one subsequent measurable indications to detect a perturbation to said known contextualization of said underlying proposition about said item, wherein (a) said group, said subject state of said at least one subject, said subject state of said disruptive subject, said estimated joint states, said known contextualization, said known measurable indication, and said at least one subsequent measurable indication are each in a quantum representation.

* * * * *